(12) United States Patent
Watts et al.

(10) Patent No.: US 10,277,778 B2
(45) Date of Patent: Apr. 30, 2019

(54) AUDIT LOGGING FOR A SECURE, SCALABLE AND FLEXIBLE INTERNET FAX ARCHITECTURE

(71) Applicant: EC Data Systems Inc., Englewood, CO (US)

(72) Inventors: Christian M. Watts, Aurora, CO (US); Edward D. Shephard, Golden, CO (US)

(73) Assignee: EC Data Systems Inc., Englewood, CO (US)

( * ) Notice: Subject to any disclaimer, the term of this patent is extended or adjusted under 35 U.S.C. 154(b) by 33 days.

(21) Appl. No.: 15/433,171

(22) Filed: Feb. 15, 2017

(65) Prior Publication Data

US 2017/0230544 A1    Aug. 10, 2017

Related U.S. Application Data

(63) Continuation-in-part of application No. 14/313,851, filed on Jun. 24, 2014.

(51) Int. Cl.
*H04M 7/00* (2006.01)
*H04N 1/00* (2006.01)
(Continued)

(52) U.S. Cl.
CPC .......... *H04N 1/4426* (2013.01); *H04L 51/24* (2013.01); *H04L 51/36* (2013.01); *H04M 7/0024* (2013.01);
(Continued)

(58) Field of Classification Search
CPC ............... H04N 1/32411; H04N 1/324; H04N 1/32406; H04N 2201/3202
See application file for complete search history.

(56) References Cited

U.S. PATENT DOCUMENTS

| 4,106,060 A | 8/1978 | Chapman |
| 4,130,885 A | 12/1978 | Dennis |

(Continued)

FOREIGN PATENT DOCUMENTS

| EP | 0 609 016 | 8/1994 |
| GB | 2 024 561 | 1/1980 |

(Continued)

OTHER PUBLICATIONS

Final Rejection for U.S. Appl. No. 14/313,851 dated Feb. 6, 2018.

(Continued)

*Primary Examiner* — Nicholas Pachol
(74) *Attorney, Agent, or Firm* — Hamilton, DeSanctis & Cha LLP

(57) ABSTRACT

Methods and systems for an auditing infrastructure for an Internet fax service architecture are provided. According to one embodiment, information regarding an event, associated with a component of the Internet fax service architecture, that is to be logged, is received by a centralized audit logging module of the Internet fax service architecture. The component may be a web server, an email server, a fax server, a notification server or an imaging system. The information is utilized by the centralized audit logging module to determine specific parameters within the Internet fax service architecture to be logged. Finally, the event, including the information and the specific parameters, is recorded by the centralized audit logging module to an audit log associated with the Internet fax service architecture in a standardized format.

15 Claims, 34 Drawing Sheets

(51) Int. Cl.
*H04N 1/32* (2006.01)
*H04N 1/44* (2006.01)
*H04L 12/58* (2006.01)
*H04L 29/06* (2006.01)

(52) U.S. Cl.
CPC .......... *H04N 1/001* (2013.01); *H04N 1/0022* (2013.01); *H04N 1/00212* (2013.01); *H04N 1/32411* (2013.01); *H04N 1/32416* (2013.01); *H04N 1/32422* (2013.01); *H04L 51/066* (2013.01); *H04L 63/083* (2013.01); *H04M 2203/657* (2013.01); *H04N 2201/0093* (2013.01); *H04N 2201/3202* (2013.01); *H04N 2201/3209* (2013.01); *H04N 2201/3221* (2013.01)

(56) References Cited

U.S. PATENT DOCUMENTS

| | | | |
|---|---|---|---|
| 4,289,930 | A | 9/1981 | Connolly et al. |
| 4,405,829 | A | 9/1983 | Rivest et al. |
| 4,532,588 | A | 7/1985 | Foster |
| 4,571,699 | A | 2/1986 | Herzog et al. |
| 4,713,780 | A | 12/1987 | Schultz et al. |
| 4,754,428 | A | 6/1988 | Schultz et al. |
| 4,816,653 | A | 3/1989 | Anderl et al. |
| 4,837,798 | A | 6/1989 | Cohen et al. |
| 4,853,961 | A | 8/1989 | Pastor |
| 4,918,722 | A | 4/1990 | Duehren et al. |
| 4,941,170 | A | 7/1990 | Herbst |
| 5,008,814 | A | 4/1991 | Mathur |
| 5,033,079 | A | 7/1991 | Catron et al. |
| 5,047,918 | A | 9/1991 | Schwartz et al. |
| 5,054,096 | A | 10/1991 | Beizer |
| 5,065,427 | A | 11/1991 | Godbole |
| 5,068,797 | A | 11/1991 | Sansone et al. |
| 5,068,888 | A | 11/1991 | Scherk et al. |
| 5,091,790 | A | 2/1992 | Silverberg |
| 5,105,184 | A | 4/1992 | Pirani et al. |
| 5,113,430 | A | 5/1992 | Richardson et al. |
| 5,115,326 | A | 5/1992 | Burgess et al. |
| 5,127,003 | A | 6/1992 | Doll, Jr. et al. |
| 5,167,011 | A | 11/1992 | Priest |
| 5,175,762 | A | 12/1992 | Kochis et al. |
| 5,193,110 | A | 3/1993 | Jones et al. |
| 5,195,085 | A | 3/1993 | Bertsch et al. |
| 5,224,156 | A | 6/1993 | Fuller et al. |
| 5,227,893 | A | 7/1993 | Ell |
| 5,241,594 | A | 8/1993 | Kung |
| 5,247,591 | A | 9/1993 | Baran |
| 5,247,661 | A | 9/1993 | Hager et al. |
| 5,255,312 | A | 10/1993 | Koshiishi |
| 5,257,112 | A | 10/1993 | Okada |
| 5,267,047 | A | 11/1993 | Argenta et al. |
| 5,267,301 | A | 11/1993 | Nishii |
| 5,274,635 | A | 12/1993 | Rahman et al. |
| 5,276,869 | A | 1/1994 | Forrest et al. |
| 5,283,887 | A | 2/1994 | Zachery |
| 5,289,371 | A | 2/1994 | Cho |
| 5,289,472 | A | 2/1994 | Cho |
| 5,291,302 | A | 3/1994 | Gordon et al. |
| 5,291,546 | A | 3/1994 | Giler et al. |
| 5,293,250 | A | 3/1994 | Okumura et al. |
| 5,296,934 | A | 3/1994 | Iwaki et al. |
| 5,297,208 | A | 3/1994 | Schlafly et al. |
| 5,299,255 | A | 3/1994 | Iwaki et al. |
| 5,307,456 | A | 4/1994 | MacKay |
| 5,317,628 | A | 5/1994 | Misholi et al. |
| 5,333,266 | A | 7/1994 | Boaz et al. |
| 5,339,156 | A | 8/1994 | Ishii |
| 5,349,636 | A | 9/1994 | Irribarren |
| 5,351,276 | A | 9/1994 | Doll et al. |
| 5,355,472 | A | 10/1994 | Lewis |
| 5,367,621 | A | 11/1994 | Cohen et al. |
| 5,371,855 | A | 12/1994 | Letwin |
| 5,371,885 | A | 12/1994 | Letwin |
| 5,379,374 | A | 1/1995 | Ishizaki et al. |
| 5,394,460 | A | 2/1995 | Olson et al. |
| 5,394,522 | A | 2/1995 | Sanchez-Frank et al. |
| 5,404,231 | A | 4/1995 | Bloomfield |
| 5,406,557 | A | 4/1995 | Baudoin |
| 5,418,908 | A | 5/1995 | Keller et al. |
| 5,424,724 | A | 6/1995 | Williams et al. |
| 5,438,433 | A | 8/1995 | Reifman et al. |
| 5,448,626 | A | 9/1995 | Kajiya et al. |
| 5,452,289 | A | 9/1995 | Sharma et al. |
| 5,459,584 | A | 10/1995 | Gordon et al. |
| 5,461,488 | A | 10/1995 | Wilek |
| 5,471,617 | A | 11/1995 | Farrand et al. |
| 5,475,738 | A | 12/1995 | Penzias |
| 5,479,411 | A | 12/1995 | Klein |
| 5,479,491 | A | 12/1995 | Garcia et al. |
| 5,483,466 | A | 1/1996 | Kawahara et al. |
| 5,483,524 | A | 1/1996 | Lev et al. |
| 5,483,580 | A | 1/1996 | Brandman et al. |
| 5,487,100 | A | 1/1996 | Kane |
| 5,488,651 | A | 1/1996 | Giler et al. |
| 5,491,800 | A | 2/1996 | Goldsmith et al. |
| 5,495,610 | A | 2/1996 | Shing et al. |
| 5,497,373 | A | 3/1996 | Hulen et al. |
| 5,502,637 | A | 3/1996 | Beaulieu et al. |
| 5,509,123 | A | 4/1996 | Dobbins et al. |
| 5,513,126 | A | 4/1996 | Harkins et al. |
| 5,513,323 | A | 4/1996 | Williams et al. |
| 5,517,556 | A | 5/1996 | Pounds et al. |
| 5,524,137 | A | 6/1996 | Rhee |
| 5,526,353 | A | 6/1996 | Williams et al. |
| 5,530,740 | A | 6/1996 | Irribarren et al. |
| 5,530,852 | A | 6/1996 | Meske, Jr. et al. |
| 5,544,320 | A | 8/1996 | Konrad |
| 5,546,388 | A | 8/1996 | Lin |
| 5,548,789 | A | 8/1996 | Nakanura |
| 5,552,901 | A | 9/1996 | Kikuchi |
| 5,555,100 | A | 9/1996 | Bloomfield et al. |
| 5,557,659 | A | 9/1996 | Hyde-Thomson |
| 5,557,798 | A | 9/1996 | Skeen et al. |
| 5,559,611 | A | 9/1996 | Bloomfield et al. |
| 5,559,721 | A | 9/1996 | Ishii |
| 5,561,703 | A | 10/1996 | Arledge et al. |
| 5,568,536 | A | 10/1996 | Tiller et al. |
| 5,568,540 | A | 10/1996 | Greco et al. |
| 5,572,643 | A | 11/1996 | Judson |
| 5,579,472 | A | 11/1996 | Keyworth, II et al. |
| 5,590,178 | A | 12/1996 | Murakami et al. |
| 5,604,737 | A | 2/1997 | Iwami et al. |
| 5,604,788 | A | 2/1997 | Tell |
| 5,608,446 | A | 3/1997 | Carr et al. |
| 5,608,786 | A | 3/1997 | Gordon |
| 5,608,874 | A | 3/1997 | Ogawa et al. |
| 5,619,555 | A | 4/1997 | Fenton et al. |
| 5,621,727 | A | 4/1997 | Vaudreuil |
| 5,625,675 | A | 4/1997 | Katsumaru et al. |
| 5,629,938 | A | 5/1997 | Cerciello et al. |
| 5,630,060 | A | 5/1997 | Tang et al. |
| 5,630,061 | A | 5/1997 | Richter et al. |
| 5,633,916 | A | 5/1997 | Goldhagen et al. |
| 5,634,003 | A | 5/1997 | Matsuo |
| 5,634,005 | A | 5/1997 | Matsuo |
| 5,647,002 | A | 7/1997 | Brunson |
| 5,654,957 | A | 8/1997 | Koyama |
| 5,657,461 | A | 8/1997 | Harkins et al. |
| 5,664,102 | A | 9/1997 | Faynberg |
| 5,673,316 | A | 9/1997 | Auerbach et al. |
| 5,675,507 | A | 10/1997 | Bobo, II |
| 5,677,955 | A | 10/1997 | Doggett et al. |
| 5,687,220 | A | 11/1997 | Finningan |
| 5,689,550 | A | 11/1997 | Garson et al. |
| 5,692,039 | A | 11/1997 | Brankley et al. |
| 5,694,458 | A | 12/1997 | Oakda et al. |
| 5,706,434 | A | 1/1998 | Kremen et al. |
| 5,710,883 | A | 1/1998 | Hong et al. |
| 5,712,901 | A | 1/1998 | Meermans |
| 5,712,903 | A | 1/1998 | Bartholomew et al. |
| 5,712,907 | A | 1/1998 | Wegner et al. |

(56) References Cited

U.S. PATENT DOCUMENTS

| | | |
|---|---|---|
| 5,713,019 A | 1/1998 | Keaten |
| 5,715,453 A | 2/1998 | Stewart |
| 5,717,742 A | 2/1998 | Hyde-Thomson |
| 5,724,410 A | 3/1998 | Parvulescu |
| 5,727,156 A | 3/1998 | Herr-Hoyman et al. |
| 5,732,219 A | 3/1998 | Blumer |
| 5,737,395 A | 4/1998 | Irribarren |
| 5,737,396 A | 4/1998 | Garcia |
| 5,737,533 A | 4/1998 | De Hond |
| 5,740,231 A | 4/1998 | Cohn et al. |
| 5,742,596 A | 4/1998 | Baratz et al. |
| 5,742,668 A | 4/1998 | Pepe et al. |
| 5,742,905 A | 4/1998 | Pepe et al. |
| 5,742,906 A | 4/1998 | Foladare et al. |
| 5,751,791 A | 5/1998 | Chen et al. |
| 5,751,814 A | 5/1998 | Kafri |
| 5,751,956 A | 5/1998 | Kirsh |
| 5,757,510 A | 5/1998 | Okada |
| 5,758,088 A | 5/1998 | Bezaire et al. |
| 5,761,201 A | 6/1998 | Vaudreuil |
| 5,761,396 A | 6/1998 | Austin et al. |
| 5,765,033 A | 6/1998 | Miloslavsky |
| 5,768,528 A | 6/1998 | Stumm |
| 5,771,354 A | 6/1998 | Crawford |
| 5,774,668 A | 6/1998 | Choquier et al. |
| 5,781,614 A | 7/1998 | Brunson |
| 5,781,901 A | 7/1998 | Kuzma |
| 5,787,175 A | 7/1998 | Carter |
| 5,790,790 A | 8/1998 | Smith et al. |
| 5,790,793 A | 8/1998 | Higley |
| 5,793,972 A | 8/1998 | Shane |
| 5,805,298 A | 9/1998 | Ho et al. |
| 5,812,278 A | 9/1998 | Toyoda et al. |
| 5,812,639 A | 9/1998 | Bartholomew et al. |
| 5,812,786 A | 9/1998 | Seazholtz et al. |
| 5,818,836 A | 10/1998 | DuVal |
| 5,819,092 A | 10/1998 | Ferguson et al. |
| 5,819,295 A | 10/1998 | Nakagawa et al. |
| 5,825,865 A | 10/1998 | Oberlander et al. |
| 5,838,906 A | 11/1998 | Doyle et al. |
| 5,848,413 A | 12/1998 | Wolff |
| 5,854,893 A | 12/1998 | Ludwig et al. |
| 5,859,967 A | 1/1999 | Kaufeld |
| 5,870,454 A | 2/1999 | Dahlen |
| 5,870,549 A | 2/1999 | Bobo, II |
| 5,872,845 A | 2/1999 | Feder |
| 5,872,926 A | 2/1999 | Levac et al. |
| 5,881,233 A | 3/1999 | Toyoda et al. |
| 5,892,591 A | 3/1999 | Anglin, Jr. et al. |
| 5,892,909 A | 4/1999 | Grasso et al. |
| 5,893,908 A | 4/1999 | Cullen et al. |
| 5,903,723 A | 5/1999 | Beck et al. |
| 5,907,598 A | 5/1999 | Mandalia et al. |
| 5,911,776 A | 6/1999 | Guck |
| 5,917,615 A | 6/1999 | Reifman et al. |
| 5,930,493 A | 7/1999 | Ottesen et al. |
| 5,933,412 A | 8/1999 | Choudhury et al. |
| 5,933,490 A | 8/1999 | White et al. |
| 5,937,041 A | 8/1999 | Cardillo, IV et al. |
| 5,937,161 A | 8/1999 | Mulligan et al. |
| 5,937,162 A | 8/1999 | Funk |
| 5,940,476 A | 8/1999 | Morganstein et al. |
| 5,940,598 A | 8/1999 | Strauss et al. |
| 5,946,386 A | 8/1999 | Rogers et al. |
| 5,960,085 A | 9/1999 | de la Huerga |
| 5,991,292 A | 11/1999 | Focsaneanu et al. |
| 5,996,006 A | 11/1999 | Speicher |
| 5,999,525 A | 12/1999 | Krishnaswamy et al. |
| 5,999,594 A | 12/1999 | Mizoguchi et al. |
| 5,999,965 A | 12/1999 | Kelly |
| 6,009,173 A | 12/1999 | Sumner |
| 6,009,469 A | 12/1999 | Mattaway et al. |
| 6,020,980 A | 2/2000 | Freeman |
| 6,023,345 A | 2/2000 | Bloomfield |
| 6,025,931 A | 2/2000 | Bloomfield |
| 6,055,530 A | 4/2000 | Sato |
| 6,061,448 A | 5/2000 | Smith et al. |
| 6,072,780 A | 6/2000 | Johnson, Jr. et al. |
| 6,073,165 A | 6/2000 | Narasimhan et al. |
| 6,084,892 A | 7/2000 | Benash et al. |
| 6,108,329 A | 8/2000 | Oyama et al. |
| 6,175,619 B1 | 1/2001 | DeSimone |
| 6,185,603 B1 | 2/2001 | Henderson et al. |
| 6,192,407 B1 | 2/2001 | Smith et al. |
| 6,208,638 B1 | 3/2001 | Rieley et al. |
| 6,212,268 B1 | 4/2001 | Nielsen |
| 6,212,550 B1 | 4/2001 | Segur |
| 6,215,858 B1 | 4/2001 | Bartholomew et al. |
| 6,216,173 B1 | 4/2001 | Jones et al. |
| 6,246,983 B1 | 6/2001 | Zou et al. |
| 6,259,533 B1 | 7/2001 | Toyoda et al. |
| 6,263,064 B1 | 7/2001 | O'Neal et al. |
| 6,266,328 B1 | 7/2001 | Johnson, Jr. et al. |
| 6,282,270 B1 | 8/2001 | Porter |
| 6,314,425 B1 | 11/2001 | Serbins et al. |
| 6,330,079 B1 | 12/2001 | Dugan et al. |
| 6,339,591 B1 | 1/2002 | Migimatsu |
| 6,341,160 B2 | 1/2002 | Tverskoy et al. |
| 6,350,066 B1 | 2/2002 | Bobo, II |
| 6,351,771 B1 | 2/2002 | Craddock et al. |
| 6,356,356 B1 | 3/2002 | Miller, Jr. et al. |
| 6,359,881 B1 | 3/2002 | Gerszberg et al. |
| 6,370,142 B1 | 4/2002 | Pilcher et al. |
| 6,411,685 B1 | 6/2002 | O'Neal |
| 6,477,240 B1 | 11/2002 | Lim et al. |
| 6,498,797 B1 | 12/2002 | Anerousis et al. |
| 6,510,438 B2 | 1/2003 | Hasegawa |
| 6,564,193 B1 | 5/2003 | Shore et al. |
| 6,564,321 B2 | 5/2003 | Bobo, II |
| 6,597,688 B2 | 7/2003 | Narasimhan et al. |
| 6,622,174 B1 * | 9/2003 | Ukita .................... G06Q 30/02 |
| | | 705/14.64 |
| 6,625,642 B1 | 9/2003 | Naylor et al. |
| 6,643,034 B1 | 11/2003 | Gordon et al. |
| 6,693,724 B1 | 2/2004 | Min |
| 6,693,729 B1 | 2/2004 | Bloomfield |
| 6,707,580 B1 | 3/2004 | Bloomfield |
| 6,711,158 B1 | 3/2004 | Kahane et al. |
| 6,717,938 B1 | 4/2004 | D'Angelo |
| 6,804,336 B2 * | 10/2004 | Chiu ..................... H04L 51/066 |
| | | 358/440 |
| 6,857,007 B1 | 2/2005 | Bloomfield |
| 6,857,074 B2 | 2/2005 | Bobo, II |
| 6,999,478 B2 | 2/2006 | D'Angelo |
| 7,020,132 B1 | 3/2006 | Narasimhan et al. |
| 7,245,611 B2 | 7/2007 | Narasimhan et al. |
| 7,539,291 B2 | 5/2009 | D'Angelo et al. |
| 7,653,185 B2 | 1/2010 | Rebert et al. |
| 7,808,671 B1 | 10/2010 | Kirchhoff et al. |
| 7,836,141 B2 | 11/2010 | Bobo, II |
| 7,869,076 B1 | 1/2011 | Trandal et al. |
| 8,031,360 B2 | 10/2011 | Kirchhoff et al. |
| 8,037,415 B1 * | 10/2011 | Landivar ................. G06F 15/00 |
| | | 715/734 |
| 8,249,230 B1 | 8/2012 | Watts |
| 8,254,538 B1 | 8/2012 | Watts |
| 8,503,630 B2 | 8/2013 | Watts |
| 8,666,759 B2 * | 3/2014 | Eckert .................... G06Q 50/22 |
| | | 705/2 |
| 9,319,523 B2 * | 4/2016 | Kirchhoff ........... H04M 3/5158 |
| 9,807,257 B2 * | 10/2017 | Cichielo ............. H04N 1/00281 |
| 2001/0014910 A1 | 8/2001 | Bobo |
| 2001/0032245 A1 * | 10/2001 | Fodor ..................... H04L 29/06 |
| | | 709/206 |
| 2001/0047394 A1 * | 11/2001 | Kloba ............. G06F 17/30899 |
| | | 709/217 |
| 2001/0051979 A1 * | 12/2001 | Aufricht ................ G06F 3/0481 |
| | | 709/203 |
| 2002/0019848 A1 * | 2/2002 | Sugawara ................ H04L 51/30 |
| | | 709/206 |
| 2002/0024686 A1 * | 2/2002 | Uchiyama ................ G06F 3/14 |
| | | 358/407 |

(56) References Cited

U.S. PATENT DOCUMENTS

| | | | |
|---|---|---|---|
| 2002/0032722 A1* | 3/2002 | Baynes, Jr. | G06F 17/30575 709/202 |
| 2002/0046296 A1* | 4/2002 | Kloba | G06F 17/30902 709/248 |
| 2002/0052781 A1* | 5/2002 | Aufricht | G06F 17/30902 705/14.61 |
| 2002/0181006 A1* | 12/2002 | Chrisop | H04N 1/32101 358/1.14 |
| 2003/0208688 A1 | 11/2003 | Bobo, II | |
| 2004/0024829 A1* | 2/2004 | Tanimoto | H04L 51/30 709/206 |
| 2004/0039820 A1* | 2/2004 | Colby | H04L 29/06 709/226 |
| 2005/0050349 A1 | 3/2005 | Bobo, II | |
| 2005/0063005 A1 | 3/2005 | Phillips et al. | |
| 2005/0114711 A1* | 5/2005 | Hesselink | H04L 63/0209 726/4 |
| 2005/0117183 A1 | 6/2005 | Adlakha et al. | |
| 2005/0134903 A1* | 6/2005 | Tanimoto | H04N 1/00206 358/1.15 |
| 2006/0171420 A1* | 8/2006 | Chu | H04L 51/36 370/503 |
| 2007/0086438 A1* | 4/2007 | Schneider | H04L 29/06027 370/352 |
| 2007/0109591 A1* | 5/2007 | Kamens | H04L 51/066 358/1.15 |
| 2007/0116228 A1* | 5/2007 | Schneider | H04M 15/06 379/211.01 |
| 2007/0177195 A1* | 8/2007 | Rebert | H04N 1/00214 358/1.15 |
| 2009/0033976 A1 | 2/2009 | Ding | |
| 2009/0051964 A1* | 2/2009 | Ito | H04N 1/00209 358/1.15 |
| 2009/0080021 A1* | 3/2009 | Matsugashita | G06F 21/608 358/1.15 |
| 2009/0086278 A1 | 4/2009 | Vendrow et al. | |
| 2009/0245098 A1* | 10/2009 | Baker | H04L 41/046 370/221 |
| 2009/0245183 A1* | 10/2009 | Baker | H04L 67/16 370/329 |
| 2009/0245492 A1* | 10/2009 | Baker | H04L 67/16 379/112.01 |
| 2009/0316170 A1* | 12/2009 | Tsujii | G03G 15/50 358/1.9 |
| 2010/0017864 A1 | 1/2010 | Codignotto | |
| 2010/0097634 A1 | 4/2010 | Meyers et al. | |
| 2010/0106958 A1* | 4/2010 | Watanabe | G06F 21/552 713/100 |
| 2010/0232358 A1 | 9/2010 | Bettis et al. | |
| 2010/0232582 A1 | 9/2010 | Bettis et al. | |
| 2010/0332636 A1* | 12/2010 | Sato | G06F 3/1203 709/223 |
| 2011/0286026 A1* | 11/2011 | Matsuzawa | G06F 3/1222 358/1.14 |
| 2012/0087484 A1 | 4/2012 | Trandal et al. | |
| 2013/0177145 A1* | 7/2013 | Watts | H04N 1/00212 379/100.17 |
| 2013/0223602 A1* | 8/2013 | Watts | H04L 51/36 379/100.01 |
| 2013/0287189 A1* | 10/2013 | Cichielo | H04N 1/00281 379/100.17 |
| 2014/0237065 A1* | 8/2014 | Kloba | G06F 17/30902 709/213 |
| 2015/0088982 A1* | 3/2015 | Johnson | H04L 67/34 709/203 |
| 2015/0215459 A1* | 7/2015 | Kirchhoff | H04M 3/436 379/266.07 |
| 2015/0237162 A1* | 8/2015 | Asano | H04L 67/32 709/219 |
| 2015/0249765 A1* | 9/2015 | Maki | H04N 1/00854 358/1.14 |
| 2015/0373208 A1 | 12/2015 | Watts et al. | |
| 2016/0087933 A1* | 3/2016 | Johnson | H04W 4/70 709/245 |
| 2016/0330345 A1* | 11/2016 | Kumagai | H04N 1/393 |

FOREIGN PATENT DOCUMENTS

| | | |
|---|---|---|
| GB | 2157117 | 10/1985 |
| JP | 406164645 | 6/1994 |

OTHER PUBLICATIONS

Non-Final Rejection for U.S. Appl. No. 14/313,851 dated Aug. 21, 2017.

FaxSav Incorporated. (Jun. 11, 1997). How FaxMailer Works. FaxMailer. Retrieved May 3, 2012, from http://web.archive.org/web/19970611191211/http://www.faxsav.com/faxsavinternel/html/howmailer.html.

FaxSav Incorporated. (Jun. 11, 1997). FaxSav for Internet. FaxMailer FAQs. Retrieved May 3, 2012, from http:// web.archive.org/web/19970611191134/http:i/www_faxsav.com/faxsavinternel/html/faqstart.html.

Non-Final Rejection for U.S. Appl. No. 13/533,049 dated Jan. 9, 2013.

FAXAGE Internet Fax Service Completes Network Expansion. Dec. 28, 2007. http://www.free-press-release.com/news/200712/1198798649.html.

About FAXAGE. http://www.faxage.com/aboul.php.

FAXAGE. Email Fax Sending Guide. Jan. 11, 2012 16 pages. http://www.faxage.com/documentation/Email/FAXAGE-email-sending.pdf.

FAXAGE. User's Guide. Jan. 11, 2012. 66 pages. http://www.faxage.com/documentation/UserGuide/FAXAGE.sub.--User.sub.--Gui- de.pdf.

FAXAGE. Internet Fax API Documentation. Jul. 22, 2011. 35 pages. http://www.faxage.com/documentation/API/Internet-Fax-API-Documentation-FA- XAGE.pdf.

Non-Final Rejection for U.S. Appl. No. 13/405,614 dated Jun. 25, 2012.

Notice of Allowance for U.S. Appl. No. 13/405,614 dated Jul. 19, 2012.

\* cited by examiner

3300

| Audit ID 3305 | Time 3310 | User 3315 | IP Address 3320 | Interface 3325 | Web SessID 3330 | Operation 3335 | Result 3340 | Job/Fax ID 3345 | Request Detail 3355 | Response Detail 3360 |
|---|---|---|---|---|---|---|---|---|---|---|
| 3371 427765556 | 12/19/16 9:51 | | 127.0.0.1 | system | | 0 faxreceived | success | 148897974 | | From -> 6193301897~!!~To -> 3039916023~!!~Pages -> 3 |
| 3372 427765574 | 12/19/16 9:51 | ports | 127.0.0.1 | email | | 0 faxreceivednotify | success | 148897974 | | email sent to ports@faxage.com |
| 3373 427869550 | 12/19/16 10:13 | robert | 10.0.0.1 | web | 5692909 | weblogin | success | | Username -> robert~!!~Company -> ecdatasys | login success |
| 3374 427870375 | 12/19/16 10:13 | robert | 10.0.0.1 | web | 5692909 | renamefax | success | | Old Filename -> fax431599569.pdf~!!~New Filename -> 63023050681.pdf | Fax renamed |
| 3375 427870376 | 12/19/16 10:13 | robert | 10.0.0.1 | web | 5692909 | mvfax | success | | From -> 6193301897~!!~To -> (303)991-6023~!!~ ... ~!!~Filename -> 123.pdf~!!~Folder -> PA | Fax moved |
| 3376 427870445 | 12/19/16 10:13 | robert | 10.0.0.1 | web | 5692909 | weblogout | success | | Logged out session 5692909 | logout success |

FIG. 33

AUDIT LOGGING FOR A SECURE, SCALABLE AND FLEXIBLE INTERNET FAX ARCHITECTURE

CROSS-REFERENCE TO RELATED APPLICATIONS

This application is a continuation-in-part of U.S. patent application Ser. No. 14/313,851, filed on Jun. 24, 2014, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2016, EC Data Systems Inc.

BACKGROUND

Field

Embodiments of the present invention generally relate to the an Internet fax architecture for processing of facsimile messages via email, website and/or custom application programming interface (API) integration. In particular, embodiments of the present invention relate to auditing capabilities tightly integrated with and designed specifically to facilitate maintenance and tracking of the security and compliance of the Internet fax architecture.

Description of the Related Art

In today's regulatory and privacy oriented environments, auditing capabilities are a key component in an overall program of maintaining a secure and compliant infrastructure. Audit logging functionality currently exists in a number of contexts, including log management products for the creation of audit logs for information technology (IT) systems that generate a security-relevant chronological record of the sequence of activities that have taken place within the system. Existing log management products have various limitations that reduce their usefulness and integrity. For example, a log management product that is generic in nature has no awareness of the specific operational environment in which it is functioning. Such a log management product may provide extensive logging, but even in the context of a small computer network can result in the generation of too much information to be effectively analyzed and cannot provide the appropriate level of granularity to be of value to the network administrator. Meanwhile, the use of multiple distributed log management products that are specific to particular network components, such as firewalls, Intrusion Detection Systems (IDSs), network gateways and the like, within an enterprise network often results in multiple log files having unsynchronized log entries due to time variations among the various system clocks of the network components.

In view of the foregoing, it would be desirable to have a centralized auditing infrastructure that is specifically designed for and tightly integrated with the environment for which it is intended

SUMMARY

Methods and systems are described for an auditing infrastructure for an Internet fax service architecture. According to one embodiment, information regarding an event, associated with a component of the Internet fax service architecture, that is to be logged, is received by a centralized audit logging module of the Internet fax service architecture. The component may be a web server, an email server, a fax server, a notification server or an imaging system. The information is utilized by the centralized audit logging module to determine specific parameters within the Internet fax service architecture to be logged. Finally, the event, including the information and the specific parameters, is recorded by the centralized audit logging module to an audit log associated with the Internet fax service architecture in a standardized format.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 33 is an example of an audit log report that may be obtained via an audit log API call in accordance with an embodiment of the present invention.

DETAILED DESCRIPTION

Figure 1:
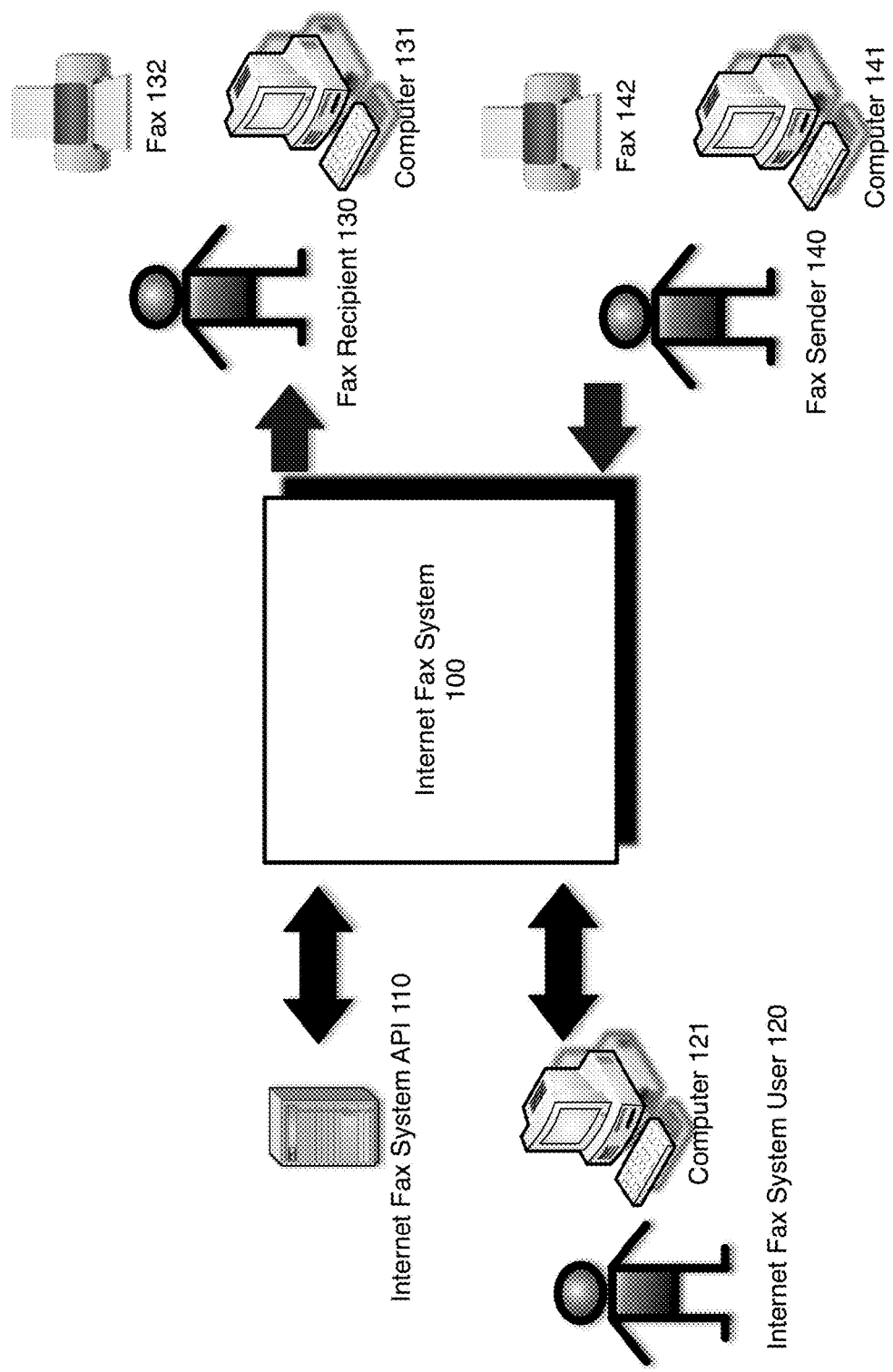
FIG. 1 is a context level diagram illustrating external actors that may interact with an Internet fax system in accordance with an embodiment of the present invention.

Methods and systems are described for a centralized and application-aware auditing infrastructure for an Internet fax service architecture. According to embodiments of the present invention, the centralized auditing infrastructure is tightly integrated with the Internet fax service architecture and is aware of various objects, identifiers, data structures and databases used within the Internet fax service architecture. As such, the auditing infrastructure can offload the various reporting entities (e.g., web servers, email servers, fax servers and image processing servers) within the Internet fax service architecture by providing these reporting entities with a simple interface and making use of information (e.g., website session data, email address and job identifier (ID)) supplied by these reporting entities (e.g., in the form of request details and/or response details and/or global data associated with an API call) to retrieve additional information (e.g., user ID, organization ID, web session ID and Internet Protocol (IP) address) to generate an audit log entry in a standardized format.

According to one embodiment, the centralized auditing infrastructure allows for visibility into "who," "what" and "when" with respect to actions taken that would modify or allow access to business information of a subscriber or user of the Internet fax service. The "who" is typically the user credentials taking the action at issue. The "what" represents an operation or request that is tied to a particular class of action, e.g., downloading a fax image or changing a password, and may include further details specific to the request and the Internet fax services' response to the request as well as the interface (e.g., website, email, API or internal system actions) through which the request was received and the IP address from which the request was received, when applicable. The "when" represents the time at which the event occurred and may be in the form of a timestamp, including both the date and time.

In one embodiment, auditable events may include both (i) requests or events associated with user-facing interfaces of the Internet fax service and (ii) internal system events (e.g., a request to convert a source document into a fax-able format has been queued). Auditable events may stand alone or may represent a milestone within a life cycle through the Internet fax service architecture. Examples of the latter type of auditable events include the sending of a fax and the receipt of a fax. As described in further detail below sent faxes (outbound or outgoing faxes from the perspective of the Internet fax service) may generate multiple auditable operations, including one or more of: (i) receipt of a request to send a fax (via email, the web or the Internet fax service API); (ii) the creation of a fax job within the Internet fax service corresponding to the request; (iii) the status (e.g., success or failure) of a fax conversion operation to convert a source document or documents to fax-able format; (iv) an event indicating the requested fax has been queued for sending; (v) an event indicating the fax has been sent and its status (e.g., success or failure); and (vi) an event indicating the recipient or recipients of the fax have been notified and how (e.g., by email). Received faxes (inbound or incoming faxes from the perspective of the Internet fax service) follow an analogous, but reverse process to that of sent faxes as will be described in further detail below.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The terms "connected" or "coupled" and related terms are used in an operational sense and are not necessarily limited to a direct connection or coupling.

The phrases "facsimile call" or "fax call" generally refer to a call carried over a circuit-switched network (e.g., the public switched telephone network (PSTN)) or a VoIP call carried over a packet-switched network (e.g., the Internet) from a device intending to transmit a facsimile to a particular destination phone number.

The phrases "facsimile processing resource" and "fax processing resource" generally refer to a device capable of answering or making facsimile calls. Depending upon whether the fax at issue is inbound or outbound, the fax processing resource may additionally establish a facsimile protocol communication with the caller or destination, receive facsimile data in an audio format and translate the received audio into a digital representation or transmit facsimile data to a destination phone number. A non-limiting example of a facsimile processing resource is a fax server or a subset of resources associated with a fax server. According to embodiments of the present invention, there is no requirement that all fax processing resources be configured the same and/or have the same capabilities or capacity. In one embodiment, such flexibility is enabled by the fact that an appropriate fax processing resource of a set of available fax processing resources may be determined on-the-fly responsive to receipt of an incoming fax call.

The phrases "facsimile signal" or "fax signal" generally refer to a digital representation of audio information encoding a facsimile message. According to embodiments of the present invention, outbound fax signals may be transmitted over a circuit-switched network (e.g., the public telephone network) or a packet-switched network (e.g., the Internet via Voice over Internet Protocol (VoIP)). According to embodiments of the present invention, incoming fax signals may also be received over a circuit-switched network (e.g., the public telephone network) or a packet-switched network (e.g., the Internet via VoIP) and delivery of the fax may be to a packet-switched network (e.g., an internal network connected to the Internet). In one embodiment, incoming fax signals contain information regarding the type of network (e.g., packet-switched or circuit-switched), the service provider, a source address and a destination address, thereby allowing processing of the incoming fax signals to be influenced by configuration and/or preference information associated with one or a combination of the source address, the destination addresses, the network and the service provider. For example, the source address and its known capabilities and/or whether the facsimile call arrived over a packet-switched or circuit-switched connection may be used to assign the facsimile call to a particular facsimile processing resource to compensate for the presence or absence of packet delays and jitter. Similarly, the particular source address and destination address combination may have been configured to deliberately use a given type of facsimile processing resource based on known limitations and/or preferences of both the source and destination.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

FIG. 1 is a context level diagram illustrating external actors that may interact with an Internet fax system 100 in accordance with an embodiment of the present invention. In embodiments of the present invention, Internet fax system 100 allows users (e.g., Internet fax system user 120) associated with a subscriber account to send and/or receive fax messages without necessarily owning a fax machine via a web site, email to fax, fax to email, and/or application programming interface (API) fax methods. Embodiments of the present invention support the notion of a truly multi-user system where the subscriber may be, but is not assumed to be an individual user and is typically an organization having 1 to n users each of which may have access to faxes received on multiple inbound fax numbers. In accordance with various embodiments of the present invention, the notion of a user is effectively decoupled from the destination address (e.g., the inbound fax number) such that a destination address can support 0 to n users and a user can be associated with 0 to n destination addresses.

Each subscriber account may have one or more users and one or more associated fax numbers. According to one embodiment, flexible outbound fax configuration settings allow do not fax settings, image resolution settings, notification settings, caller ID settings, tagline settings, time zone settings and retry settings at a subscriber, user or job-level as appropriate. According to one embodiment, flexible inbound user configuration settings allow security options, delivery preferences and access privileges to be established with finer resolution than existing fax services. For example, any inbound fax number associated with a subscriber account can be set up to deliver received faxes to any or no user account associated with the subscriber account. As such, multiple inbound fax numbers can be associated with a single user or multiple user accounts rather than being constrained to a one-to-one relationship. For purposes of efficiency, defaults may be established at an account level and overridden, if desired, at the user level. For example, by default all faxes received by a subscribing enterprise may be stored as one or more of portable document format (PDF) files, Joint Photographic Experts Group (JPEG) files, tagged image file format (TIFF) files, ASCII text files, Personal Computer Exchange (PCX) files, DCX file, PostScript files and/or other supported file formats, including, but not limited to, bit map or raster graphics file formats; however, a particular user may specify that faxes delivered to him/her be delivered only in a subset of the supported file formats. Additionally, all outbound faxes from a particular subscriber may be configured to include a particular tagline, use a certain time zone when printing the date/time in the tagline and perform a particular number of retries. Meanwhile, users at different geographical locations may override the time zone setting and/or number of retries. Similarly, by default all faxes transmitted by a subscribing enterprise may be configured to image the TIFF outbound fax job at a certain resolution on a per-account basis (e.g., fine, hyperfine, low/normal); however, a particular user may override the default based on his/her personal tradeoff preferences between cost/time-to-transmit and quality of the image as transmitted.

Internet fax system 100 receives and processes inbound fax calls on behalf of subscribers and stores fax images for later retrieval by subscribers and/or forwards the fax images to one or more email addresses designated by the subscribers. Internet fax system 100 also receives and processes requests to deliver outbound fax message from an Internet fax system application programming interface (API) 110 and/or users associated with subscribers, e.g., Internet fax system user 120 (via an email or web interface), and delivers fax messages to one or more destination phone numbers associated with desired recipients, e.g., fax recipient 130 associated with fax 132. Anyone (subscriber or non-subscriber, e.g., fax sender 140) with a fax machine (e.g., fax 142) can dial a subscriber's fax number and Internet fax system 100 will receive the fax, convert/store the fax in a configurable format for later retrieval via the web and/or email the fax to one or more email addresses that can be configured on a per-fax-number basis. As described further below, embodiments of the present invention also allow for data store queries and/or fax delivery requests via an API over Hypertext Transport Protocol (HTTP) or HTTP secure (HTTPS) that allows programmers to build fax receive and/or fax transmission capabilities into their applications.

According to the present example, Internet fax system 100 interfaces with Internet fax system APIs, such as Internet fax system API 110, Internet fax system users associated with a subscriber account, such as Internet fax system user 120, fax senders, such as fax sender 130, and fax recipients, such as fax recipient 130.

Internet fax system user 120 may receive inbound fax messages directed to one or more fax numbers associated with an Internet fax subscription via any Internet connected device, such as computer, a smartphone (not shown) or the like. As described further below, Internet fax system user 120 may receive faxes as email attachments, as secure download links embedded within email messages or download them from a web site associated with Internet fax system 100. To the extent he/she is authorized to do so, Internet fax system user 120 may also make administrative changes to account settings via the web site, including, but not limited to associating email addresses with fax numbers, specifying fax delivery preferences, designating user access permissions and the like.

Internet fax system user 120 may also communicate requests to deliver outbound fax messages directed to one or more fax numbers via any Internet connected device, such as computer 121, a smartphone (not shown) or the like. As described further below, Internet fax system user 120 may provide content to be faxed in a variety of forms, including email attachments in the form of standard business documents (e.g., Microsoft Word, PDF, etc.), links to web content and inline email content (e.g., text, Hypertext Markup Language (HTML) and/or embedded images).

Fax recipient 130 may receive faxes from subscribers of Internet fax system 100 via a dedicated fax machine 132, computer 131, multifunction/all-in-one printer (not shown) or other fax-capable device (not shown) just as he/she would receive faxes from non-subscribers. Fax recipient 130 may, but need not be a subscriber of Internet fax system 100 to receive faxes from a subscriber, such as Internet fax system user 120. If fax recipient 130 is a subscriber, then he/she may receive faxes as email attachments, as secure download links embedded within email messages or download them from a web site associated with Internet fax system.

Fax sender 140 may send faxes to subscribers of Internet fax system 100 via a dedicated fax machine 132, computer 131, multifunction/all-in-one printer (not shown) or other fax-capable device (not shown) just as he/she would send faxes to non-subscribers. Fax sender 140 need not be a subscriber of Internet fax system 100 to send faxes to a subscriber, such as Internet fax system user 120.

Internet fax system API 110 may represent a standardized API associated with Internet fax system 100 or a custom API developed to API specifications established by the owner/operator of Internet fax system 100. Internet fax system API 110 may provide capabilities that an application programmer can use to integrate fax capabilities into their applications utilizing Internet fax system 100 as a backend, for example. In one embodiment, the integration is accomplished via HTTP or HTTPS POST operations.

Depending upon the particular implementation, Internet fax system API 110 may provide operations to support fax sending and receiving, call detail record collection, audit log entry retrieval and automated number provisioning and de-provisioning.

Figure 2:
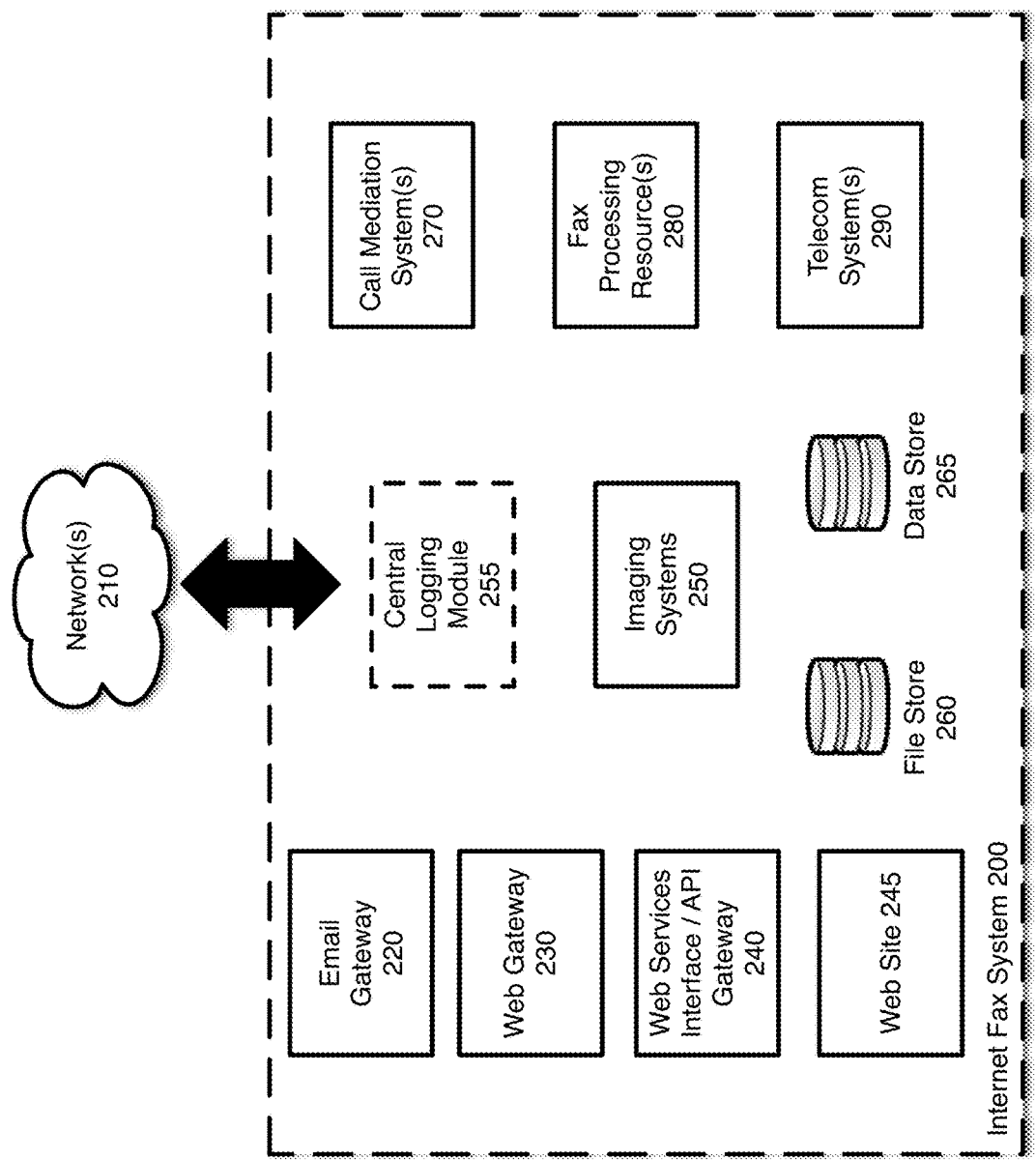
FIG. 2 is a system level block diagram conceptually illustrating an architecture of an Internet fax system in accordance with an embodiment of the present invention.

FIG. 2 is a system level diagram conceptually illustrating an architecture of an Internet fax system 200 in accordance with an embodiment of the present invention. According to the present example, Internet fax system 200 is coupled to one or more networks 210 through which inbound faxes may be received and delivered and outbound faxes may be uploaded and transmitted.

In the exemplary simplified architecture depicted, Internet fax system 200 includes a central logging module 255, one or more call mediation system(s) 270, one or more telecommunications system(s) 290, fax processing resources 280, imaging systems 250, an email gateway 220 a web services interface/API gateway 240, a web gateway 230, a web site 245, a file store 260 and a data store 265 interconnected via an appropriate telecommunications signaling network and an IP network. The description below first explains the functionality of various architectural components from the perspective of inbound fax processing and subsequently addresses the functionality of the various architectural components from the perspective of outbound fax processing.

According to one embodiment, from an inbound fax processing perspective, telecommunications system(s) 290 are operable to receive incoming fax calls and pass accepted fax calls to a call mediation system of call mediation system(s) 270. In one embodiment, telecommunications system(s) 290 perform round-robin load balancing among the call mediation system(s) 270. Upon call completion, telecommunications system(s) 290 may record telephony (ISDN) information and call accounting information in data store 265 for billing purposes and/or troubleshooting.

In one embodiment, call mediation system(s) 270 are logically interposed between telecommunications system(s) 290 and fax processing resources 280. Call mediation system(s) 270 receive incoming call information (e.g., caller ID and called number), determine custom call handling based thereon, select an appropriate fax processing resource of those available within fax processing resources 280 and redirect inbound fax calls to the selected fax processing resource. As described further below, load leveling may also be performed at the call mediation layer by preferring not to select the same specific available fax processing resource until all other available and appropriate fax processing resources of fax processing resources 280 have been selected to process an inbound fax call. In some embodiments, call mediation system(s) 270 sit in the path of inbound fax calls and wait for call completion to allow call mediation system(s) 270 to record call accounting for billing in a separate database (not shown). To the extent not performed at the telecommunications system layer, call mediation system(s) 270 may also record telephony (ISDN) information and call accounting information in data store 265 to facilitate troubleshooting.

Fax processing resources 280 are operable to receive incoming call information from call mediation system(s) 270, set custom parameters based on information passed, such as speed/protocol, capabilities, etc., receive inbound fax signals, convert audio fax signals to appropriate digital image form and deliver or otherwise make available the resulting fax messages to one or more users associated with the subscribers to which the inbound faxes are directed (e.g., by storing the fax messages in a destination address-specific storage area within file store 260 for subsequent web retrieval and/or by creating an email message directed to one or more users according to the subscriber's administrative account settings).

According to one embodiment, email gateway 220 is a simple relay operable to receive and send email messages created by fax processing resources 280. In such an embodiment, before sending an email message to email gateway 220 that is to be relayed to a subscriber, fax processing resources 280 may apply custom messaging to the email. For example, fax processing resource 280 may make the email message appear to be from a customer's service provider that operates as a reseller of the Internet fax service or fax processing resource 280 may reformat data in the notification based on customer defined preferences. In alternative embodiments, email gateway 220 may include more intelligence and perform some portion of email creation, customization and/or reformatting.

Web services interface/API gateway 240 supports API-based receiving of fax messages, wherein the interaction can be with a program on a user system, as opposed to manual downloading of fax messages by an individual using a web browser as required by existing Internet fax systems, such as that described in U.S. Pat. No. 6,350,066 and its progeny. According to one embodiment, web services interface/API gateway 240 is operable to receive request for download of received faxes (e.g., by unique fax ID recorded in data store 265 by fax processing resources 280) via an API call and return fax images to the requesting system. For example, web services interface/API gateway 240 may retrieve the fax image location from data store 265, retrieve the fax image from file store 260 and send the fax image to the requesting system over a secure sockets layer (SSL) connection.

Web site 245 is operable to receive and process user requests relating to received faxes. For example, responsive to a user logging into web site 245 and navigating to the receive faxes page, web site 245 may query data store 265 and present the user with an interface, per receiving fax number within the subscriber account with which the logged in user is associated to which the user has access, that lists received faxes. The user may then select a fax to download and cause web site 245 to retrieve the corresponding fax image from file store 260 for download to the user's client system via SSL. In some embodiments, web site 245 may further support the capability for users to rename received faxes to something meaningful to them and/or to create logical "folders" and move faxes' storage presentation from the destination to the logical folder.

File store 60 represents a shared storage resource accessible by fax processing resources 280, email gateway 220, web services interface/API gateway 240 and web site 245 for storing and accessing digital representations of fax messages. According to one embodiment, file store 260 is simply a disk with no processing other than storage access logic. According to one embodiment, file store 260 is a fax image database implemented within a network attached storage (NAS) device, such as a NetApp NAS filer available from NetApp, Inc.

Data store 265 represents storage for accounting, billing, features and metadata associated with received fax messages. According to one embodiment, data store 265 is a Solaris x86-based workstation running an open source database, such as MySQL.

Central logging module 255 represents a centralized mechanism through which audit log entries or records containing information regarding auditable events may be created, logged, managed and retrieved. Central logging module 255 is depicted in broken lines because it may or may not represent a service running on a physical server within Internet fax system 200. Depending on the particular implementation, central logging module 255 may be a daemon that runs within Internet fax system 200 and which may receive calls from the various components of the infrastructure that log auditable events. Alternatively, central logging module 255 may be implemented in the cloud and thereby represent a remote service available to Internet fax system 200. In one embodiment, one or more routines of central logging module 255 may be transient in nature and be implemented in the form of code stored within file store 260 that are instantiated and run by the caller on an as needed basis.

As noted above, in embodiments of the present invention, central logging module 255 auditing infrastructure is tightly integrated with the architecture of Internet fax system 200 and is aware of various objects, identifiers, data structures and databases used therein. As such, central logging module 255 can offload the various reporting entities (e.g., web servers associated with web gateway 230, email servers associated with email gateway 220, fax servers or notification servers associated with fax processing resource(s) 280 and/or image processing servers associated with imaging system 250) within Internet fax system 200 by providing these reporting entities with a simple interface and making use of information (e.g., website session data, email address and job identifier (ID)) supplied by these reporting entities (e.g., in the form of request details and/or response details and/or global data associated with an API call) to retrieve additional information (e.g., user ID, organization ID, web session ID and/or Internet Protocol (IP) address) to generate an audit log entry for auditable events (e.g., email-to-fax events, fax-to-email, web events, API events and system events) in a standardized format. Further details regarding central logging module 255 are described below with reference to FIGS. 29-34.

The centralization of configuration and user information in the manner described above eliminates duplication of such information among inbound fax servers as suggested by prior Internet fax system architectures, such as the architecture described in U.S. Pat. No. 6,208,638. The centralization of storage on a network-shared storage device also eliminates the need for redirecting requests for faxes to a system or program separate and apart from the one (e.g., the web server) the user is communicating with initially to make the request as suggested by prior Internet fax system architectures, such as the architecture described in U.S. Pat. No. 6,350,066. This enhances scalability, flexibility and reliability of the Internet fax system by, among other things, removing the possibility to redirect a request to a server having a problem and in general results in fewer "moving parts" and fewer opportunities for failure.

According to one embodiment, from an outbound fax processing perspective, email gateway 220 is operable to receive requests to deliver outbound fax messages from subscribers. Responsive to receipt of an email message email gateway 220 may parse the email to determine the sender, the destination(s) and other optional parameters. In one embodiment, the email request may include one or more attachments representing the content of the desired outbound fax message. In such an embodiment, email gateway 220 may strip the attachment(s) from the email message and store the attachment(s) in file store 260. As described further below, email gateway 220 may also determine the sender based upon the email message and extract information regarding the destination(s) and other parameters and store this information in data store 265. According to one embodiment, if a system generated cover sheet is set up, email gateway 220 may also generate and store a cover sheet as another file for the fax job in the file store 260 and data store 265. Once the fax content is ready to be processed, email gateway 220 may store a work request in a centralized message/work queue (not shown) implemented within a database, such as data store 265. In some embodiments, rather than implementing a simplistic FIFO mechanism as described by U.S. Pat. No. 6,597,688 and its progeny, a novel imaging system selection process is employed by email gateway 220 to identify a least loaded imaging system of imaging systems 250 to process the fax content (e.g., convert to TIFF format, transform landscape to portrait, print HTML source to a PDF, etc.). According to one embodiment, after an appropriate imaging system has been selected to process the fax content, email gateway 220 assigns a corresponding work request to the selected imaging system by placing a work request in the centralized message/work queue within data store 265, for example, where the work request contains information identifying the selected imaging system that should process the fax content.

In one embodiment, the work request includes the following information:
Hostname—the hostname of the selected imaging system
Jobid—the unique job ID associated with the request in the application-level database (e.g., data store 265)
Callerid—caller ID requested, if different than the default
Orgid—the unique id associated with the subscriber account Web gateway 230 is operable to receive and process user requests relating to outbound faxes. For example, responsive to a user logging into web site 245 and navigating to the transmit faxes page, web site 245 may present the user with an interface to specify one or more destinations, upload document(s) to send, create a cover sheet and specify other optional parameters. After the information regarding the outbound fax delivery request has been gathered from the user, web gateway 230 stores the document(s) to be faxed in file store 260, stores sender, destination(s) and any other parameters in data store 265 and stores a work request in the centralized message/work queue. In some embodiments, web gateway 230 may also perform the imaging system selection process to identify a least loaded imaging system of imaging systems 250 to process the fax content. According to one embodiment, after an appropriate imaging system has been selected to process the fax content, web gateway 230 assigns the work request to the selected imaging system as described above by placing the work request in the centralized message/work queue and including therein information identifying the selected imaging system (e.g., the hostname of the selected imaging system) that should process the fax content.

Web services interface/API gateway 240 supports API-based receipt of requests to deliver outbound fax messages, wherein the interaction can be with a program on a user system. In this manner, web services interface/API gateway 240 provides an alternative to manual uploading of fax messages in contrast to existing Internet fax systems, such as that described in U.S. Pat. No. 6,597,688 and its progeny. As described in further detail below, web services interface/API gateway 240 processes API information to determine the sender, destination(s) and other optional parameters associated with requests to deliver outbound fax messages. As indicated above with respect to email gateway 220 and web gateway 230, after the information regarding the outbound fax delivery request has been gathered, web services interface/API gateway 240 stores the document(s) to be faxed in file store 260, stores sender, destination(s) and any other parameters in data store 265 and stores a work request in the centralized message/work queue. In some embodiments, web services interface/API gateway 240 may also perform the imaging system selection process to identify a least loaded imaging system of imaging systems 250 to process the fax content. According to one embodiment, after an appropriate imaging system has been selected to process the fax content, web services interface/API gateway 240 assigns the work request to the selected imaging system as described above by placing the work request in the centralized message/work queue and including therein information identifying the selected imaging system (e.g., the hostname of the selected imaging system) that should process the fax content. Further details regarding an exemplary set of operations that may be automated via web services interface/API gateway 240 are provided in the attached Appendices.

According to one embodiment, imaging systems 250 implement a load-notification system in which each imaging system periodically sends load information to an image queue database within data store 265, for example. As described in further detail below, the initial submission device (e.g., email gateway 220, web gateway 230 or web services interface/API gateway 240) runs an imaging system selection process to select an appropriate imaging system of imaging systems 250 based on the load information reported by the imaging systems 250.

File store 280 represents a shared storage resource accessible by the initial submission device (e.g., email gateway 220, web gateway 230 or web services interface/API gateway 240), imaging systems 250 and fax processing resources 280 for storing and accessing fax content in its source format and the corresponding digital representations of fax messages based thereon.

In one embodiment, data store 265 includes a centralized message/work queue database for storing work requests for imaging systems 250 and a separate application-level database that is operable to store information specific to fax jobs (e.g., destination number(s), location(s) of file(s) that comprise the fax job, source user, user account configuration, etc.). Data store 265 may also represent storage for accounting, billing, features and other metadata associated with outbound fax messages. According to one embodiment, data store 265 is a Solaris x86-based workstation running an open source database, such as MySQL.

Embodiments of the present invention seek to provide redundancy and scalability based on an active-0/active-n setup of multiple fax processing resources, PBXs, etc. that are all essentially identical, such that a given fax processing resource does not have to be associated with a "backup" fax processing resource that is used if it goes down as suggested by prior Internet fax system architectures, such as the architecture described in U.S. Pat. No. 6,208,638. Instead, in accordance with embodiments of the present invention, an n-way pool of possible fax servers and modems, for example, are available for use.

Fax processing resources 280 are operable to accept outbound fax jobs from imaging systems 250. According to one embodiment fax processing resources send the fax jobs to the destination(s) with automatic retries and other customer-specified parameters. Fax processing resources 280 may include one or more digital access cross connects (DACS) (not shown) and one or more fax servers (not shown), each of which may include one or more analog fax modems, digital fax boards and/or soft modems (modems implemented in software). According to one embodiment, fax servers each have 24 ports and those ports are connected to the 24 ports of a single DACS. Those of ordinary skill in the art will appreciate there are a variety of possible combinations of DACS to fax server connections/configurations. For example, in alternative configurations, each DACS may support multiple fax servers—theoretically as many fax servers as it has ports by connecting each port of the DACS to a single port of a fax server. According to one embodiment, fax servers include Linux servers running open source fax server software, such as HylaFAX. According to one embodiment, DACS provide DS1/DS0 (0/1) cross-connect functionality and may be one of Adtran's ATLAS series of enterprise integrated access devices, such as the ATLAS 550 series, ATLAS 800 series, Tellabs Titan series DACS or the like.

According to one embodiment, one or more PBXs (e.g., call mediation system(s) 270) are logically interposed between fax processing resources 280 and telecom system(s) 290. The PBXs are operable to accept outgoing calls initiated by fax processing resources 280, determine an appropriate route for such calls, dial the appropriate route and bridge the call to the fax processing resource. At call completion, the PBXs record telephony (Integrated Services Digital Network (ISDN)) information and call accounting information in data store 265 for billing. PBXs may be implemented by installing and running an open source PBX software package on a server. For example, a non-limiting example of a suitable PBX is a Linux server running Asterisk. Alternatively, PBXs available from Cisco or Avaya may be used.

According to one embodiment, telecommunications system(s) 290 are operable to accept outgoing fax calls and select an appropriate trunk group (amongst multiple connected circuit and packet connections) based on information received from PBXs. Telecommunications system(s) 290 dial the outgoing fax call on the appropriate trunk group and upon call completion, record telephony (ISDN), switch, accounting and technical information in data store (via RADIUS) for troubleshooting and debugging purposes. In one embodiment, telecommunications system(s) 290 include one or more switches (not shown), which may be connected to the Internet via Ethernet and connected to the PSTN via dedicated, high bandwidth circuits (e.g., DS3 and/or DS1 lines). In one embodiment, switches are high-capacity access servers providing both packet and time-division multiplexing (TDM) switching. Examples of suitable switches include, but are not limited to, the Cisco AS5850 Universal Gateway, the Cisco AS5800 Access Server, the Cisco AS5400 Universal Gateway, the Cisco AS5350 Universal Gateway and the Cisco AS5300 Universal Access Server. Depending upon the particular implementation, telecommunications system(s) 290 may comprise a single switch or multiple redundant switches in which one of the switches is an active primary switch and the others are active standby switches, which can take over for the primary in the event of a failure. In alternative embodiments, it is also possible to have an active/active redundant switch architecture in which multiple circuits from PSTN and/or Internet provide the same services and the circuits are split between multiple switches that are interconnected in a mesh for redundancy and/or increased capacity.

Figure 3:
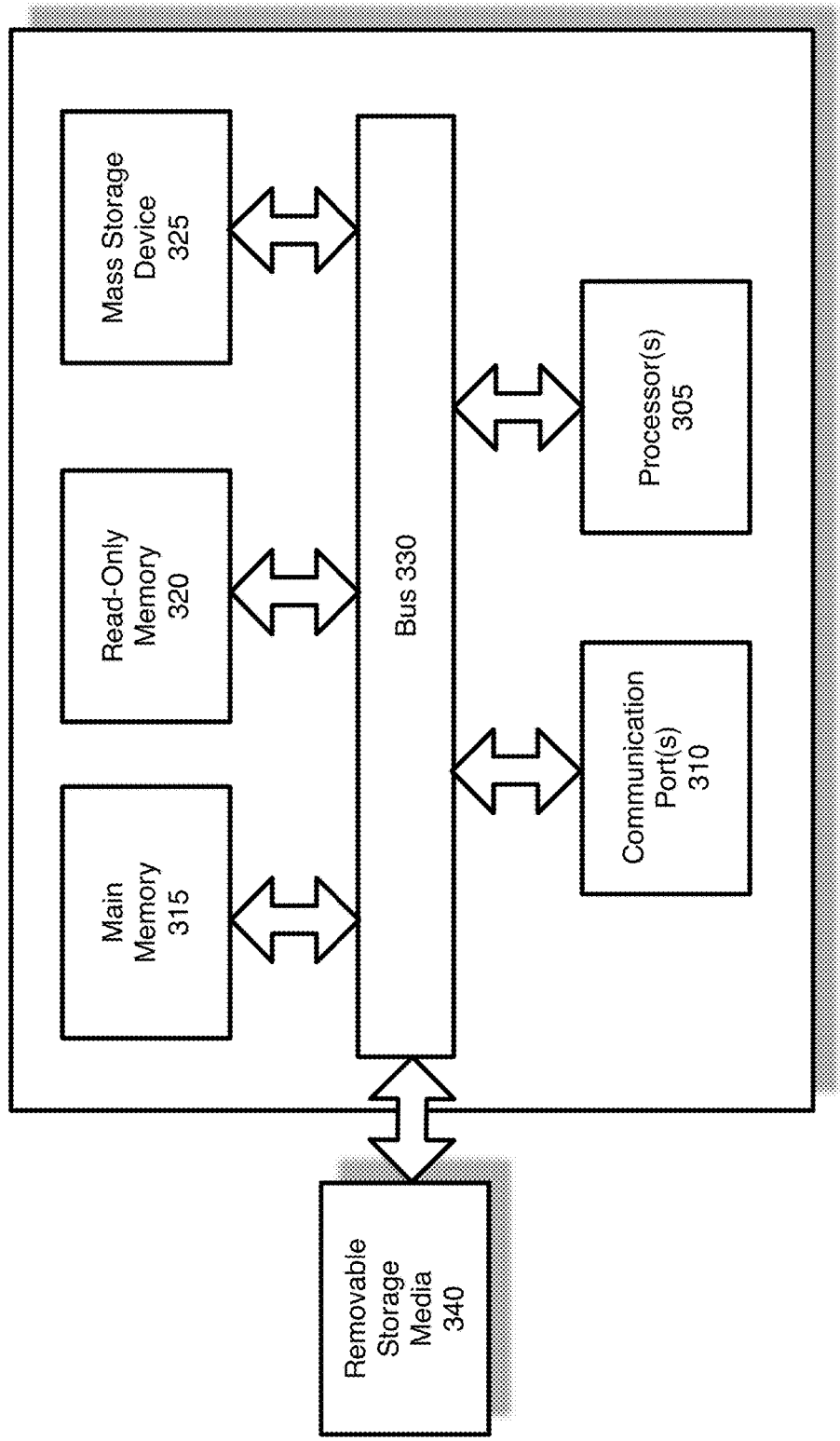
FIG. 3 is an example of a computer system with which embodiments of the present invention may be utilized.

FIG. 3 is an example of a computer system with which embodiments of the present invention may be utilized.

Embodiments of the present invention include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware. As such, FIG. 3 is an example of a computer system 300, such as a Linux-based fax server, a Linux-based PBX, a Solaris x86 database server or the like, upon which or with which embodiments of the present invention may be employed.

According to the present example, the computer system includes a bus 330, one or more processors 305, one or more communication ports 310, a main memory 315, a removable storage media 340, a read only memory 320 and a mass storage 325.

Processor(s) 305 can be any future or existing processor, including, but not limited to, an Intel® Itanium® or Itanium 2 processor(s), or AMD® Opteron® or Athlon MP® processor(s), or Motorola® lines of processors. Communication port(s) 310 can be any of an RS-232 port for use with a modem based dialup connection, a 10/100 Ethernet port, a Gigabit port using copper or fiber or other existing or future ports. Communication port(s) 310 may be chosen depending on a network, such as a Local Area Network (LAN), Wide Area Network (WAN), or any other network to which the computer system 300 connects. For example, in the context of a PBX, communication port(s) 310 may include communication cards supporting Ethernet or DS1/DS3 types of connections and in the context of a fax server, communication port(s) 310 may include Ethernet, DS0, T1/DS1 (such as ISDN Primary Rate Interface (PRI)) or fractional T1/DS1 or digital DS0 (such as ISDN Basic Rate Interface (BRI)).

Main memory 315 can be Random Access Memory (RAM), or any other dynamic storage device(s) commonly known in the art. Read only memory 320 can be any static storage device(s) such as Programmable Read Only Memory (PROM) chips for storing static information such as start-up or BIOS instructions for processor 305.

Mass storage 325 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 330 communicatively couples processor(s) 305 with the other memory, storage and communication blocks. Bus 330 can include a bus, such as a Peripheral Component Interconnect (PCI)/PCI Extended (PCI-X), Small Computer System Interface (SCSI), USB or the like, for connecting expansion cards, drives and other subsystems as well as other buses, such as front side bus (FSB), which connects the processor(s) 305 to system memory.

Optionally, operator and administrative interfaces, such as a display, keyboard, and a cursor control device, may also be coupled to bus 330 to support direct operator interaction with computer system 300. Other operator and administrative interfaces can be provided through network connections connected through communication ports 310.

Removable storage media 340 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

In some embodiments, a computer system, such as computer system 300, is configured to operate as one or more PBXs. For example, as described above, any or all PBXs within Internet fax system 200 may be implemented as a Linux server running an open source PBX software package, such as Asterisk. In some embodiments, a computer system, such as computer system 300, is configured to operate as one or more fax servers. For example, as described above, any or all of fax processing resource(s) 280 may be implemented as a Linux server running open source fax server software, such as HylaFAX. In some embodiments, a computer system, such as computer system 300, runs multiple virtual machines each of which represents an imaging system of imaging systems 250. In some embodiments, a computer system, such as computer system 300, is configured to support one or more databases, such as a billing database and/or data store 265 including a centralized message/work queue accessible by the gateway systems (e.g., email gateway 220, web gateway 230 and web services interface/API gateway 240) and imaging systems 250. For example, as described above, any or all of the databases described herein may be implemented within a Solaris x86-based workstation running an open source database, such as MySQL. As those of ordinary skill in the art will appreciate, the computer system components described above are meant only to exemplify various possibilities. In no way should the aforementioned exemplary computer system limit the scope of the invention.

Figure 4:
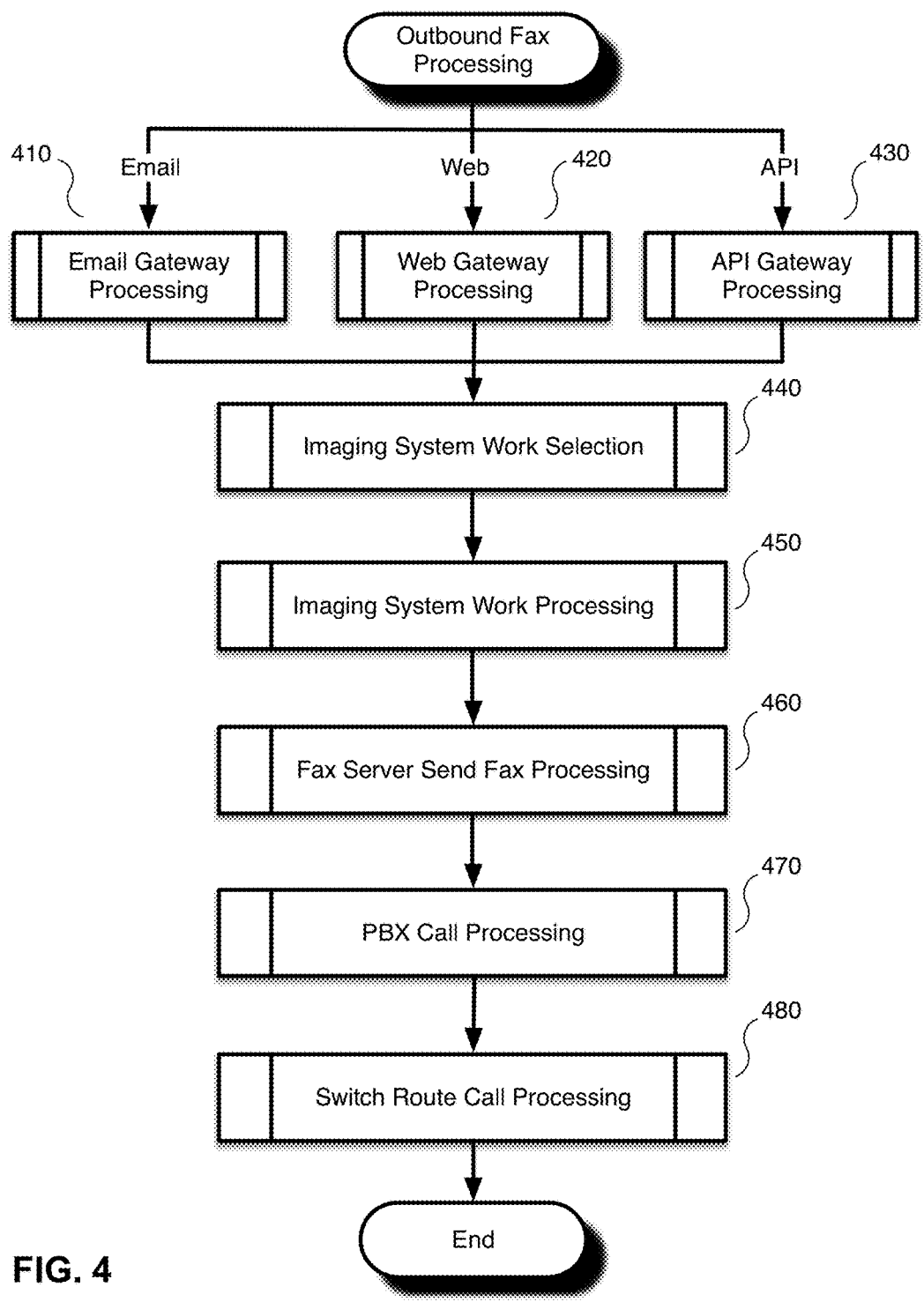
FIG. 4 is a high-level flowchart illustrating outbound fax processing in accordance with an embodiment of the present invention.

FIG. 4 is a high-level flowchart conceptually illustrating outbound fax processing in accordance with an embodiment of the present invention. According to the present example, a request to deliver an outbound fax message can be received via email, web or API. If the request is received via email, then outbound fax processing continues with block 410 in which email gateway processing is performed. According to one embodiment, email gateway processing is as described with reference to FIG. 5.

If the request is received via web, then outbound fax processing continues with block 420 in which web gateway processing is performed. According to one embodiment, web gateway processing is as described with reference to FIG. 6.

Otherwise, if the request is received via API, then outbound fax processing continues with block 430 in which API gateway processing is performed. According to one embodiment, API gateway processing is as described with reference to FIG. 7.

As the initial submission devices (e.g., email gateway 220, web gateway 230 or web services interface/API gateway 240) process requests to deliver outbound fax messages and create corresponding work requests for selected imaging systems of imaging systems 250, imaging system work selection is performed by each imaging system at block 440 to identify appropriate work requests. According to one embodiment, imaging system work selection is as described with reference to FIG. 9.

After an imaging system identifies appropriate work request(s), at block 450, imaging system work processing is performed. According to one embodiment, imaging system work processing is as described with reference to FIG. 11.

After the imaging system has completed its processing and has submitted the corresponding fax job to a fax server, at block 460, fax server send fax processing is performed. According to one embodiment, fax server send fax processing is as described with reference to FIG. 12.

Responsive to fax server send fax processing, PBX call processing is initiated at block 470. According to one embodiment, PBX call processing is as described with reference to FIG. 13.

Responsive to PBX call processing, switch route call processing is initiated at block 480. According to one embodiment, switch route call processing is as described with reference to FIG. 14. After switch route call processing is terminated, outbound fax processing is complete.

Figure 5:
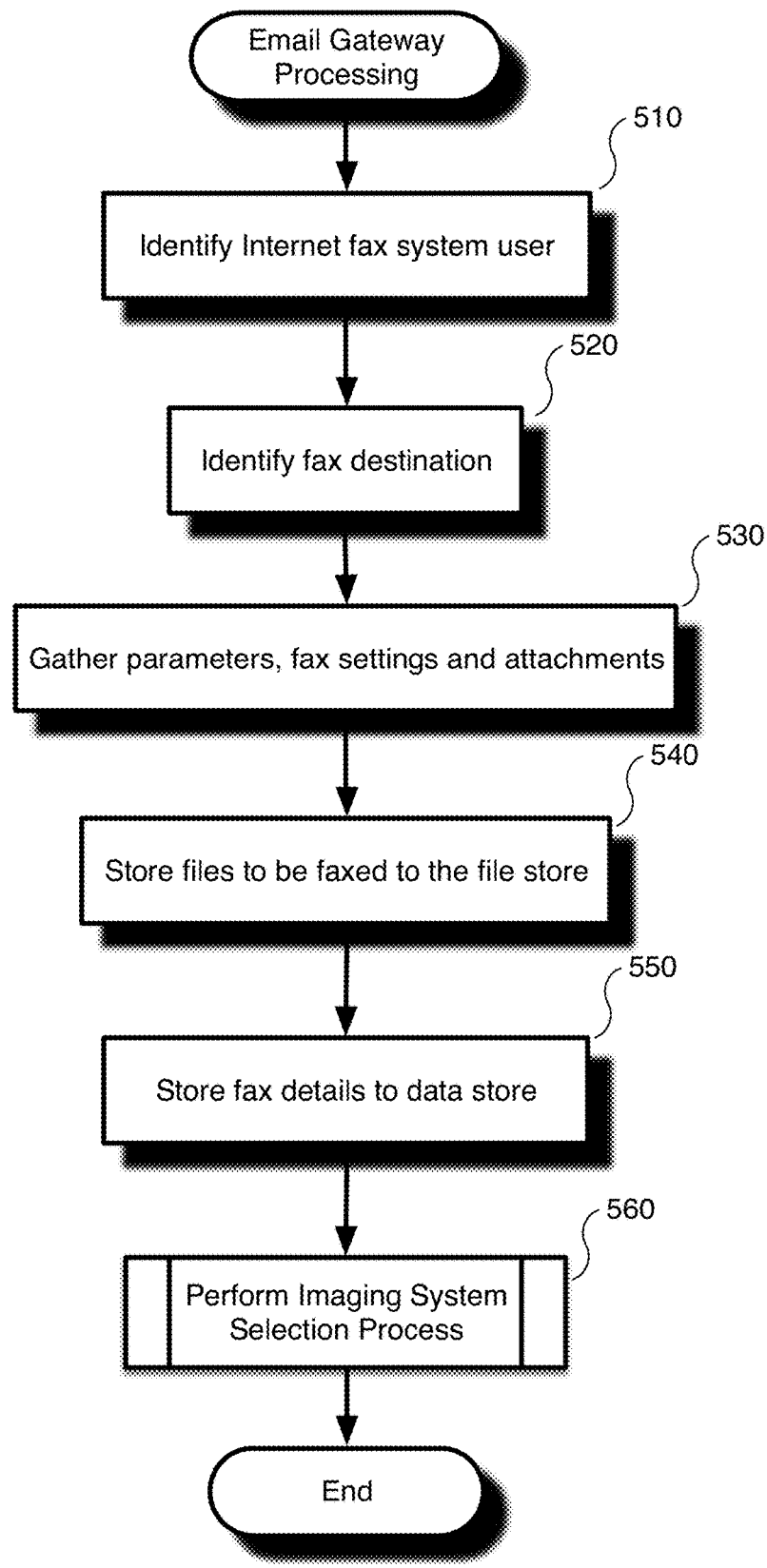
FIG. 5 is a flowchart illustrating outbound email gateway processing in accordance with an embodiment of the present invention.

FIG. 5 is a flowchart illustrating outbound email gateway processing in accordance with an embodiment of the present invention. At block 510, the Internet fax system user is identified. According to one embodiment, information may be gathered regarding the sender of the email request from the Return-Path and/or from other email headers associated with the email request. Based on the identity of the sender of the email request, subscriber account information may be queried from a subscriber database to determine whether the sender is a valid user on an active subscriber account. If not, then a return email may be generated and transmitted to the sender indicating the error and email gateway processing may terminate. If the sender is confirmed to be a valid user of an active subscriber account, then email gateway processing continues with block 520.

At block 520, the fax destination is identified. In one embodiment, Internet fax system users may direct faxes to a desired fax destination by directing the email to a domain owned by the Internet fax system and specifying the desired fax destination in the local-part of the email address (e.g., 3035551212@faxage.com). In such an embodiment, the fax destination may be identified by extracting the local-part of the email address in the "To" header of the email request. In alternative embodiments, various other conventions may be used to convey the desired fax destination. For example, the fax destination may be identified as such (via a labeling or tagging convention) in the body of the email request or in the subject line. Those skilled in the art will recognize numerous other alternatives. If a valid destination is not found associated with the email request, then a return email may be generated and transmitted to the Internet fax system user identifying the error (e.g., "no valid fax destination") and email gateway processing may terminate. If a valid fax destination is identified, then email gateway processing continues with block 530.

At block 530, parameters, fax settings and attachments are gathered. In one embodiment, optional parameters, such as priority (low or high), destination name and whether to include text and HTML attachment types on a one-off basis, may be identified in the email request. As indicated above, various conventions may be used to convey values of parameters, including, but not limited to, providing a list of name-value pairs, in the body of the email request or in the subject line. Other default or custom fax settings may be stored in a subscriber database. For example, email fax settings for the subscriber account may specify whether a system-generated cover sheet is to be used, types of email attachments that are enabled and whether to store the subject line for later return. Having identified the types of permissible email attachments, the email gateway can proceed to gather attachments, if any, according to valid types. In one embodiment, the email body itself can serve as a valid email "attachment." If no valid email attachments are found, then a return email may be generated and transmitted to the Internet fax system user identifying the error (e.g., "no attachments to fax email") and email gateway processing may terminate. If one or more valid email attachments are found, then email gateway processing continues with block 540.

At block 540, copies of files to be faxed are stored in file store 260, for example. In addition to any valid email attachments associated with the email request, the files stored may include a cover sheet as the first file to be faxed if a cover sheet is to be generated.

At block 550, fax details are stored to data store 265, for example. Fax details may include one or more of the following:
  Sending user ID
  Sending Account ID
  Destination
  Locations of files to fax
  Optional parameters
  Original subject line In one embodiment, responsive to the fax details storage request, data store 265 returns to email gateway 220 a unique ID (e.g., a job ID of 1 to n digits) to be associated with this particular outbound fax job. According to one embodiment, the job ID is based on an auto-incremented unique primary key.

At block 560, an imaging system selection process is performed. According to one embodiment, imaging system selection processing is as described with reference to FIG. 8.

Figure 6:
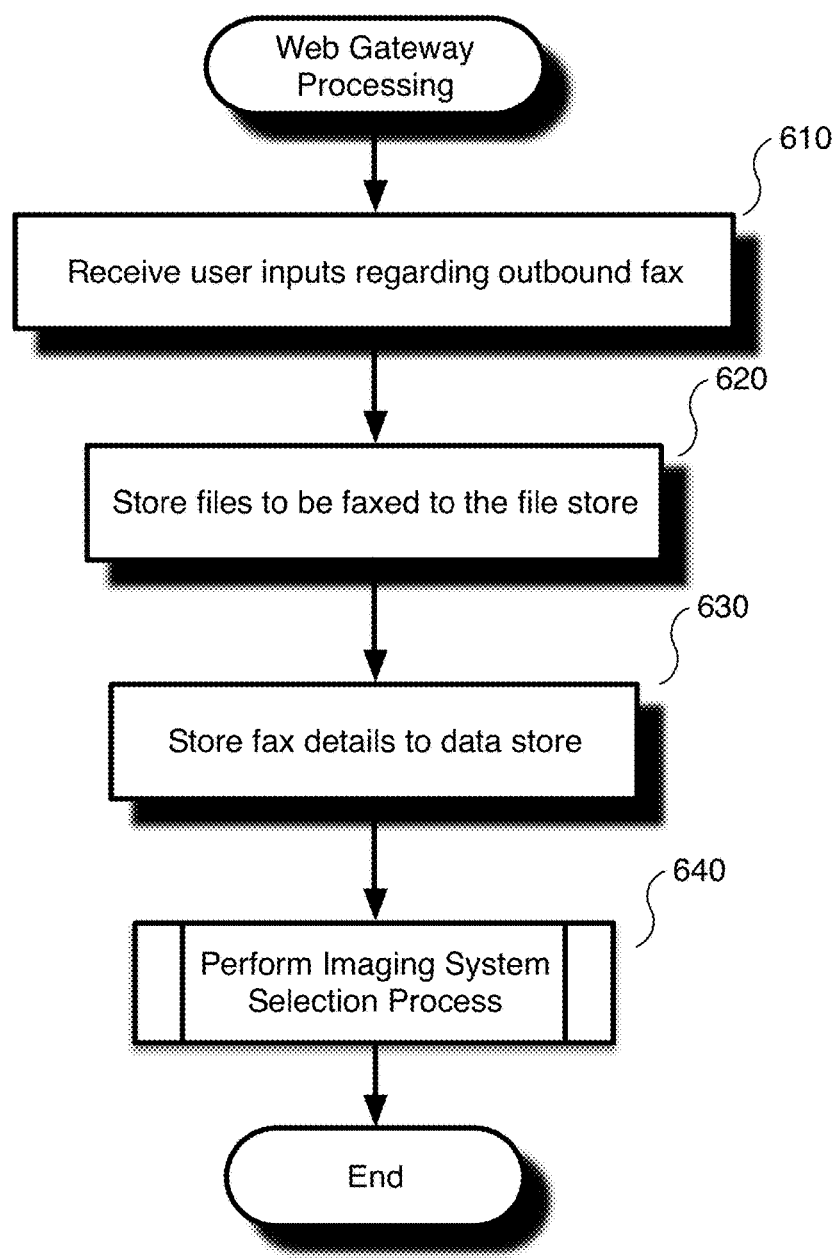
FIG. 6 is a flowchart illustrating outbound web gateway processing in accordance with an embodiment of the present invention.

FIG. 6 is a flowchart illustrating outbound web gateway processing in accordance with an embodiment of the present invention. At block 610, a user inputs regarding an outbound fax are received. Typically, the user would first login by providing login credentials (e.g., a username and a password) via a subscriber login page of a website associated with the Internet fax system. Responsive to receipt of the login credentials, web gateway 230 queries a subscriber database to verify whether the login credentials correspond to a valid user on an active subscriber account. If not, then an error message may be returned identifying the error (e.g., "login incorrect") and web gateway processing may terminate. If the login credentials correspond to a valid user on an active subscriber account, then web gateway processing continues (potentially after receiving one or more intermediate navigation requests from the user ultimately indicating a desire to transmit a fax) by presenting one or more HTML screens to the user to collect information associated with the desired outbound fax. Information collected may include a destination name and number, priority (low or high), from 1 to n locations of content to be transmitted (e.g., paths of 1 to n files on the user's computer system, URLs or the like), a location of a file representing an optional cover sheet and an indication of whether the user would like to be notified by email when the fax transmission has completed. According to one embodiment, after the files representing the content to be transmitted have been uploaded to the Internet fax system, the user is given an opportunity to fill out a cover sheet form, which causes the system to generate the cover sheet file. Processing then continues with block 620.

At block 620, the files to be faxed are stored in file store 260, for example. In addition to the file(s) representing the content of the desired fax, the files stored may include an optional cover sheet as the first file to be faxed if a cover sheet is to be generated.

At block 630, fax details are stored to data store 265, for example. Fax details may include one or more of the following:
  Sending user ID
  Sending Account ID
  Destination
  Locations of files to fax In one embodiment, responsive to the fax details storage request, data store 265 returns to web gateway 230 a unique ID (e.g., a job ID of 1 to n digits) to be associated with this particular outbound fax job. As described above with respect to email gateway processing, the job ID may be based on an auto-incremented unique primary key.

At block 640, an imaging system selection process is performed. According to one embodiment, imaging system selection processing is as described with reference to FIG. 8.

Figure 7:
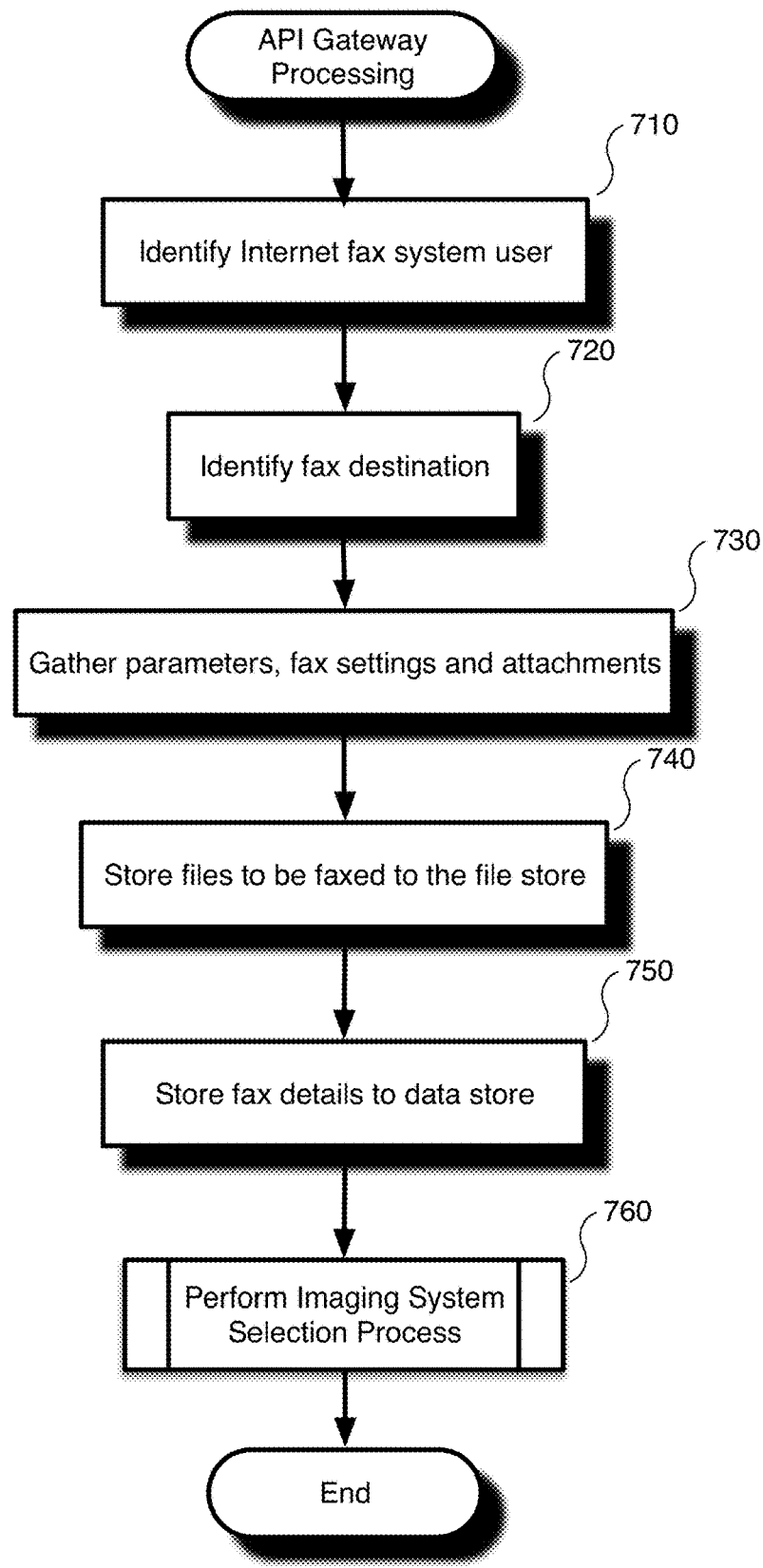
FIG. 7 is a flowchart illustrating outbound web services processing in accordance with an embodiment of the present invention.

FIG. 7 is a flowchart illustrating outbound web services processing in accordance with an embodiment of the present invention. At block 710, responsive to receipt of an HTTP or HTTPS POST, web services interface/API gateway 240 identifies the Internet fax system user making the request. According to one embodiment, credentials are gathered from the POST and a subscriber database is queried to determine whether the request is from a valid user on an active subscriber account. If not, then an error message may be returned (e.g., "user not found") identifying the error and web services processing may terminate. If the request is confirmed to be from a valid user of an active subscriber account, then web services processing continues with block 720.

At block 720, the fax destination is identified. In one embodiment, Internet fax system users may direct faxes to one or more desired fax destination via web services interface/API gateway 240 by specifying the destination(s) in the POST request. If a valid destination is not found within the POST request, then an error message identifying the error (e.g., "no valid fax destination") may be returned and web services processing may terminate. If one or more valid fax destinations are identified within the POST request, then web services processing continues with block 730.

At block 730, parameters, fax settings and attachments are gathered. In one embodiment, parameters, such as the file(s) or URL(s) to fax, the recipient name and optional parameters, such as priority (low or high), caller ID, resolution, contrast algorithm, notification preference (e.g., via URL or email) and tagline name and number, may be identified in the POST request. If one or more URLs are specified as the content of the fax, then the content of the URLs are downloaded and stored as a file to fax. Any non-URL files included within the POST request are base64 decoded. If no valid files are associated with the POST request, then an error message identifying the error (e.g., "no files to fax) may be returned and web services processing may terminate. If one or more valid files are associated with the POST request, then web services processing continues with block 740.

At block 740, the files to be faxed are stored in file store 260, for example.

At block 750, fax details are stored to data store 265, for example. Fax details may include one or more of the following:
  Sending user ID
  Sending Account ID
  Destination
  Locations of files to fax
  Optional parameters from the POST request In one embodiment, responsive to the fax details storage request, data store 265 returns to web services interface/API gateway 240 a unique ID (e.g., a job ID of 1 to n digits) to be associated with this particular outbound fax job. As described above with respect to web and email gateway processing, the job ID may be based on an auto-incremented unique primary key. In one embodiment, the job ID is returned to the source of the POST request.

At block 760, an imaging system selection process is performed. According to one embodiment, imaging system selection processing is as described with reference to FIG. 8.

Figure 8:
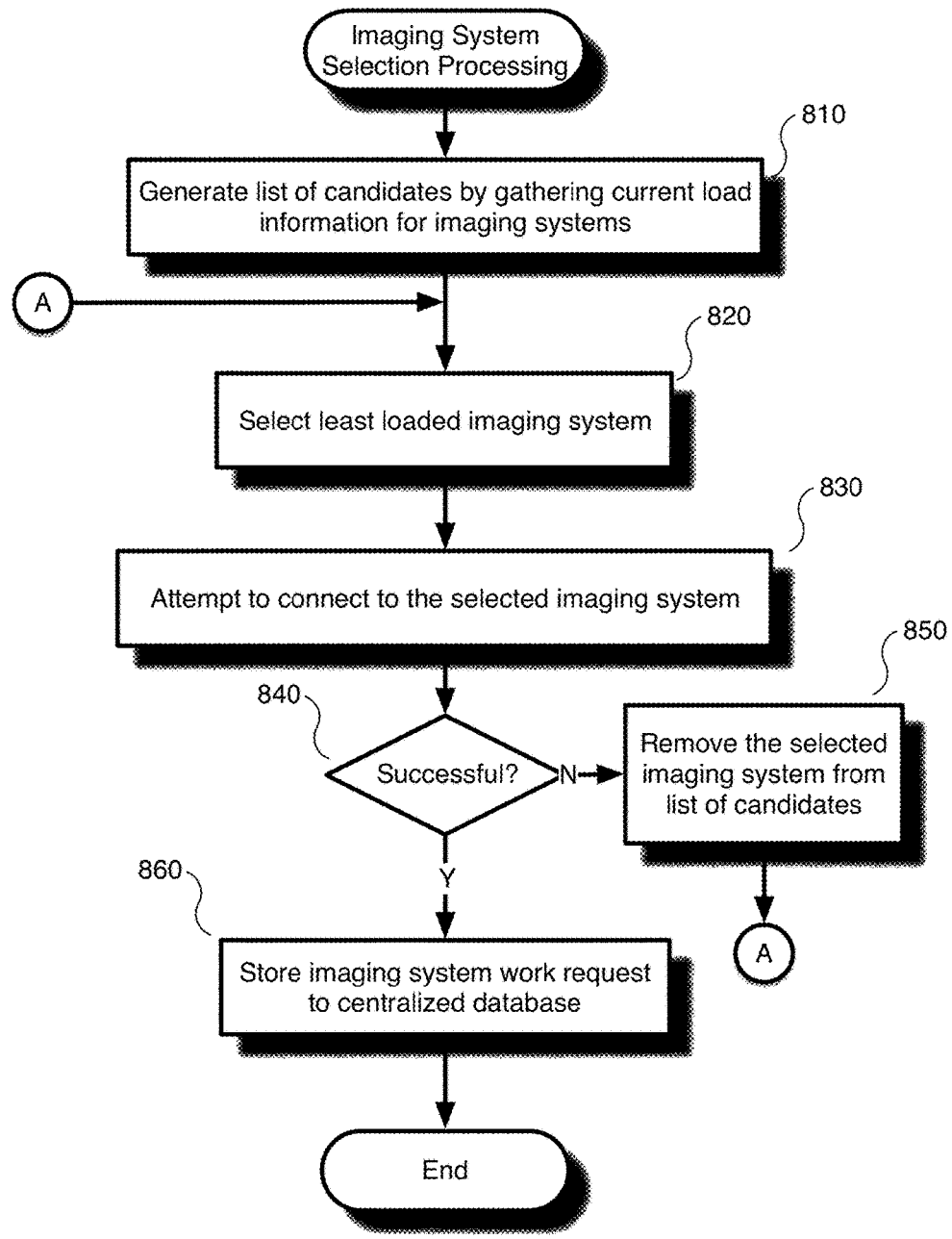
FIG. 8 is a flowchart illustrating imaging system selection processing in accordance with an embodiment of the present invention.

FIG. 8 is a flowchart illustrating imaging system selection processing in accordance with an embodiment of the present invention. At block 810, a list of candidates is generated by gathering current load information for imaging systems (e.g., imaging systems 250). In one embodiment, the current load information for the imaging systems is periodically calculated and reported by the individual imaging systems and stored in data store 265 as described further below with reference to FIG. 10. In such an embodiment, the current load information is gathered by requesting the most recently reported load information from data store 265. Various alternative methods for gathering current load information will be understood by those of ordinary skill in the art. For example, the initial submission device (e.g., email gateway 220, web gateway 230 or web services interface/API gateway 240) to which the outbound fax request was made may poll the imaging systems directly for their current load information at the time when such information is needed.

At block 820, the least loaded imaging system is selected. Depending upon the particular load score computation, the least loaded imaging system may be associated with the lowest load score or the highest load score. In the exemplary load score calculation processing described below with reference to FIG. 10, the least loaded imaging system is the one having the lowest load score.

At block 830, an attempt is made to connect to the selected imaging system. According to one embodiment, the initial submission device (e.g., email gateway 220, web gateway 230 or web services interface/API gateway 240) to which the outbound fax request was made and which is currently performing the imaging system selection processing attempts to make an HTTP connection to the selected imaging system. Those skilled in the art will appreciate various acknowledgement mechanisms can be employed for the selected imaging system to confirm to the initial submission device that it is able to accept and process a work request. In one embodiment, the imaging systems are configured to echo back the job ID passed on the connection if they are up and working.

At decision block 840, a determination is made regarding whether the connection attempt was successful. According to one embodiment, this determination is made based on whether the selected imaging system echoes back the job ID to the initial submission device via the HTTP connection. If the connection attempt was unsuccessful, then process branches to block 850; otherwise, imaging system selection processing continues with block 860.

At block 850, the selected imaging system is removed from the list of candidates and a new imaging system is selected by looping back to block 820.

At block 860, the imaging system work request is stored in the centralized message/work queue within data store 265, for example, and imaging system selection processing is complete. In one embodiment, the work request contains information identifying the selected imaging system that should process the work request.

In one embodiment, the initial submission device may update the load information associated with the selected imaging system to reflect the newly assigned work request. In this manner, to the extent subsequent imaging system selection processing occurs before the load score calculation cycle is able to update the load score for the selected imaging system, the subsequent imaging system selection processing will still have the benefit of access to load information for the selected imaging system that more accurately reflects its soon to be currently effective load, thereby preventing work requests from being assigned to the selected imaging system based on an out-of-date load score.

Figure 9:
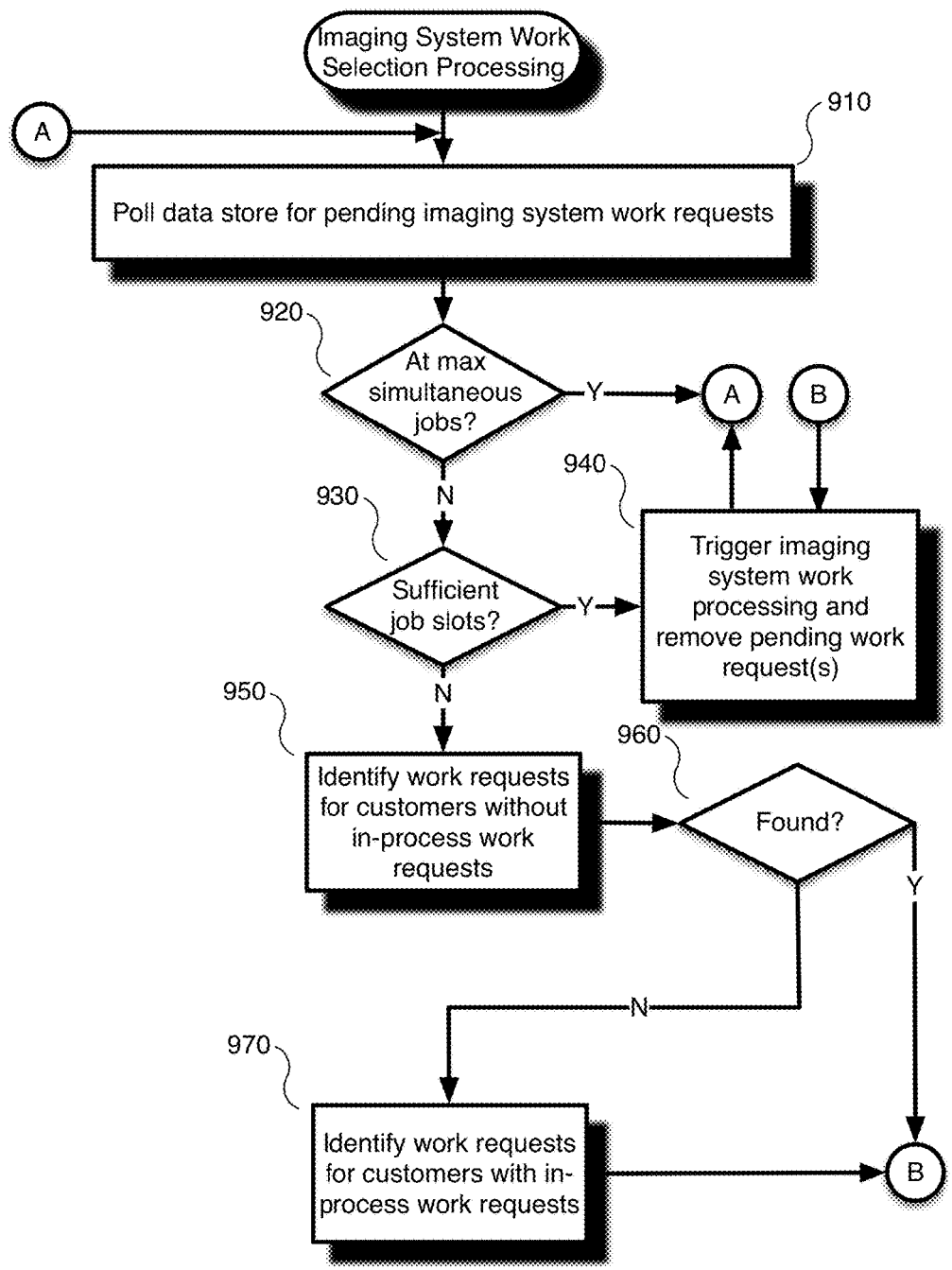
FIG. 9 is a flowchart illustrating imaging system work selection in accordance with an embodiment of the present invention.

FIG. 9 is a flowchart illustrating imaging system work selection in accordance with an embodiment of the present invention. According to one embodiment, a daemon running on each of the imaging systems performs work selection to determine a work processing order that promotes fairness among subscribers and avoids starvation under heavy work loads. In one embodiment, each imaging system has a configured level of simultaneous processing capability (e.g., between 2 and 5 simultaneous jobs, such as 3 jobs) and implements a "fair queue" to provide a unique "slot" per customer among its available work slots. Multiple slots can be used by a particular subscriber (subject to subscribed capacity limitations) if slots remain available and there are not other subscriber requests competing over such slots.

For simplicity and sake of brevity, FIG. 9 illustrates processing performed by a single imaging system in connection with work selection. It is to be understood that multiple imaging systems may be concurrently performing such processing.

At block 910, the imaging system at issue polls data store 265 for pending imaging system work requests. In one embodiment, the imaging system work requests are stored in a centralized message/work queue within data store 265. Thus, in response to the polling request, data store 265 may return only those work requests from the centralized message/work queue that identify the imaging system at issue as the one selected for processing the corresponding work request. Those of skill in the art will appreciate there are numerous mechanisms that can be used to trigger the polling cycle described herein. For example, the polling cycle may be triggered responsive to expiration of a configurable timer (e.g., every 5 seconds), upon the availability of one or more job slots, upon the completion of one or more job slots or the like.

At decision block 920, the imaging system determines if it is currently running a maximum number of simultaneous jobs. In one embodiment, this involves retrieving the configured simultaneous maximum jobs allowed to be performed by the imaging system (e.g., the number of total job "slots" the imaging system has) and subtracting from this the number of jobs currently being processed. If the imaging system is currently processing at its maximum number of simultaneous jobs (i.e., all job slots are allocated), then imaging system work selection processing loops back to block 910. If one or more job slots are available, then imaging system work selection processing continues with decision block 930.

At decision block 930, a determination is made regarding whether sufficient job slots are available to process all of the pending imaging system work requests for the imaging system. If not, then the fairness aspects kick in and imaging system work selection processing branches to block 950; otherwise, processing continues with block 940.

At block 940, it has been determined that sufficient job slots are available to process all pending job requests for the imaging system, so all of these pending job requests are removed from the centralized message/work queue and imaging system work processing is triggered.

At block 950, it has been determined that insufficient job slots are available to process all pending job requests for the imaging system, so work requests for customers without in-process work requests are identified. According to one embodiment, this involves building a list of customers for whom jobs are currently processing and then checking for work for customers other than those on the list on a first-in-first-out basis.

At decision block 960, a determination is made regarding whether work requests exist for customers for which jobs are not already in-process on the imaging system. If such jobs are found, then imaging system work selection processing continues with block 940; otherwise processing branches to block 970.

At block 970, work requests for customers with in-process work requests are identified. According to one embodiment, this identification of work requests is performed on a first-in-first-out basis and may be limited by a number of concurrent jobs allowed pursuant to the customer's subscription plan with the Internet fax system. After appropriate work requests have been identified, imaging system work selection processing continues with block 940.

Figure 10:
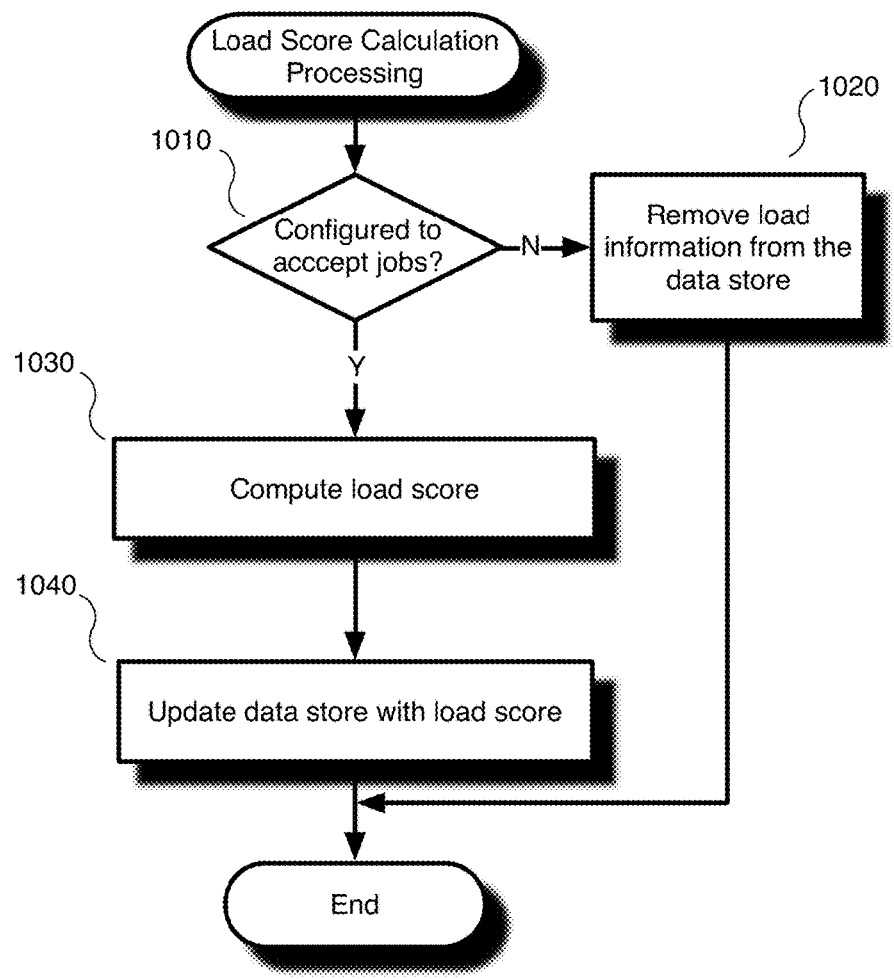
FIG. 10 is a flowchart illustrating load score calculation processing in accordance with an embodiment of the present invention.

FIG. 10 is a flowchart illustrating load score calculation processing in accordance with an embodiment of the present invention. For simplicity and sake of brevity, FIG. 10 illustrates one cycle of load score calculation processing performed by a single imaging system in connection with load score calculation processing. It is to be understood that all imaging systems may be concurrently performing such processing and that such processing may be periodically triggered as a result of expiration of a timer (e.g., every 5 to 10 seconds) or responsive to some other event in the Internet fax system (e.g., a request for load information from an initial submission device, completion of a job or the like).

At decision block 1010, the imaging system determines whether it is configured to accept jobs. This determination may be performed with reference to configuration information set by an administrator of the Internet fax system, for example. According to one embodiment, an imaging system is configured not to select jobs by creating a flag file (e.g., /tmp/oor) on the imaging system to communicate to the imaging system that it is out of rotation. If the imaging system is currently configured to accept jobs, then the load score calculation processing continues with block 1030. If the imaging system is not currently configured to accept jobs, then the load score calculation processing branches to block 1020.

At block 1020, this imaging system is removed from consideration for work assignment. In one embodiment, any existing load information for this imaging system is removed from data store 265 to preclude assignment of imaging work to this imaging system. Alternatively, the load score for this imaging system may be set to a value, such as the highest load score, to indicate this imaging system's unavailability to process work requests. Load score calculation processing is then terminated until the next load score calculation processing cycle is triggered.

At block 1030, the load score for this imaging system is calculated. In one embodiment, the load score is based on the number of jobs currently in-process on the imaging system, the current CPU load and the amount of memory currently in use. According to one embodiment, the load score is calculated in accordance with the following equation:

$A \times (\text{number of jobs pending}) + B \times (\text{CPU load}) + C \times (\text{megabytes of memory used})$ where, A is a constant value between 0.5 and 5 (e.g., 1).
B is a constant value between 5 and 20 (e.g., 10).
C is a constant value between 0 and 1 (e.g., 0.01).

Those skilled in the art will appreciate various alternative calculations can be used. For example, the constants A, B and/or C can be adjusted as appropriate to suit a particular implementation or imaging system configuration.

At block 1040, the imaging system updates data store 265 with the newly calculated load score. Notably, while the present example is described assuming each imaging system gathers load information (e.g., jobs pending, CPU load and memory used), in alternative embodiments, a process external to the imaging systems may be provided with access to load information and may perform the actual load score calculation processing and/or reporting to data store 265 on behalf of the imaging systems.

Figure 11:
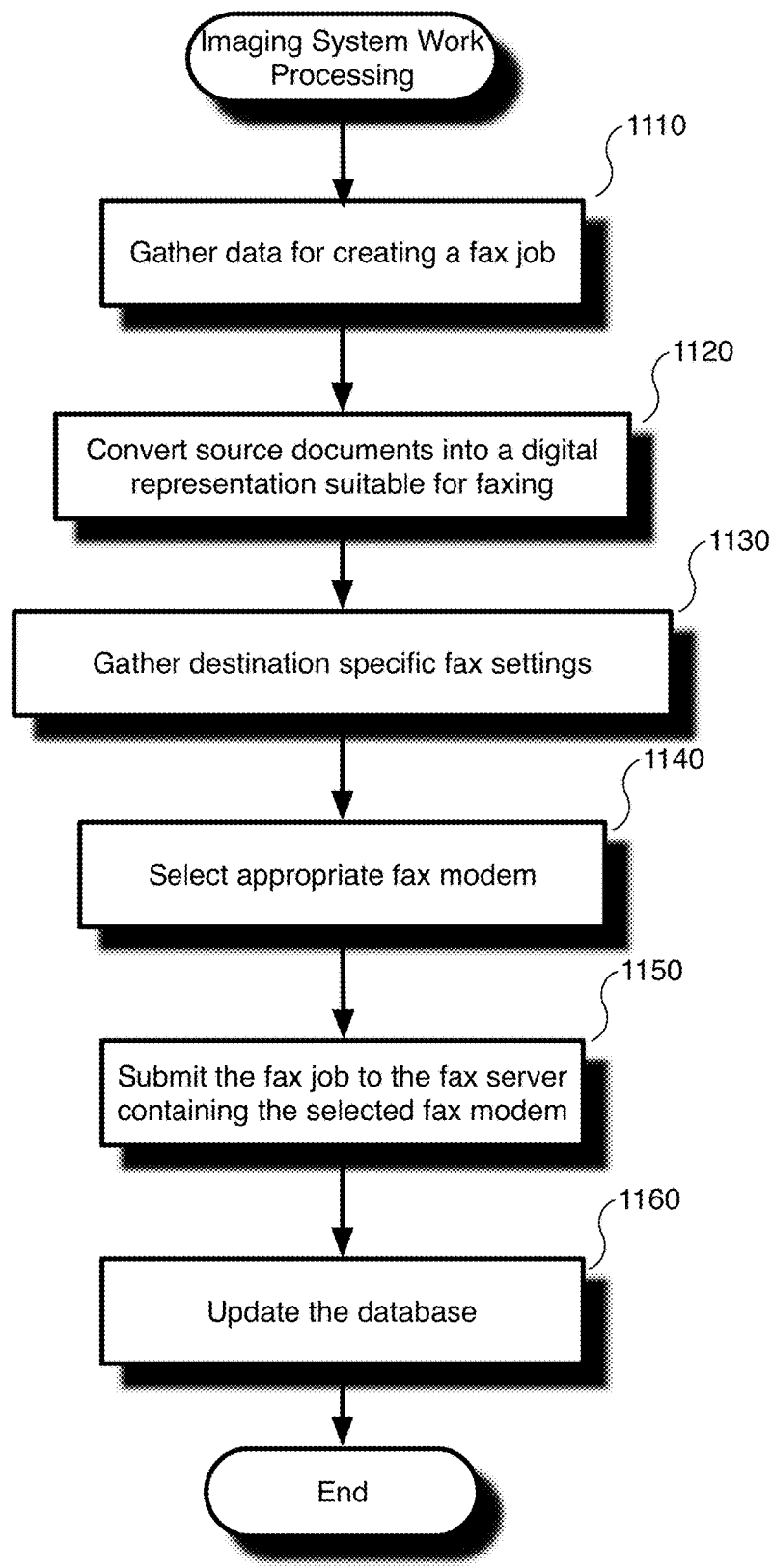
FIG. 11 is a flowchart illustrating imaging system work processing in accordance with an embodiment of the present invention.

FIG. 11 is a flowchart illustrating imaging system work processing in accordance with an embodiment of the present invention. At block 1110, data is gathered for creating a fax job. According to one embodiment, this involves gathering command-line arguments (e.g., job ID and an optional caller ID), identifying the customer associated with the job and job-specific parameters from the database (e.g., data store 265) and gathering customer outgoing fax settings from the database, some of which may be potentially overridden by the job-specific parameters. In one embodiment, the customer outgoing fax settings include one or more of the following:

Notification setting (e.g., email, API push, web or API poll)
Sending user
Tagline name and number to use
Tagline time zone to use for timestamp on fax
Generate fax TSI to use from tagline number
Resolution to image at (e.g., low, fine or hyperfine)
Number of retries to perform
Contrast enhancement algorithm to use (the Internet fax system may implement multiple contrast enhancement algorithms, e.g., a default algorithm, a darkening algorithm, etc.
Custom email notification parameters (from address, subject and body templates), if any
Maximum queue time for this fax In one embodiment, the destination number may be checked against disallowed numbers. For example, system-wide and/or customer-specific blacklists (do not fax list) may be maintained and enforced to prevent calls to certain numbers (e.g., 911, 411, etc.). In such an embodiment, if the destination is on one of the do not fax lists, then an error message will be communicated to the user according to the notification settings and imaging system work processing is terminated.

At block 1120, the source documents are converted into a digital representation suitable for faxing. In one embodiment, this involves converting the source documents into a single multi-page TIFF using the resolution and contrast enhancement as previously identified. If the conversion is unsuccessful, then an error message will be communicated to the user according to the notification settings and imaging system work processing is terminated. If the conversion is successful, then processing continues with block 1130.

At block 1130, destination-specific fax settings, if any, are gathered. According to one embodiment destination-specific fax settings are gathered from the database (e.g., data store 265) and include one or more of the following:

Maximum speed
Fax protocol class to use (e.g., 1, 1.0, 2.0 or 2.1)
Enable or disable error correction mode (ECM)

At block 1140, an appropriate fax modem of available fax processing resources (e.g., fax processing resources 280) is selected. According to one embodiment, the available fax processing resources are filtered to produce an initial candidate list based on the ability of the modems to meet the desired capabilities (e.g., the destination-specific fax settings previously identified). From the initial candidate list, the list of potential fax modems to use to transmit the call is further refined based on whether the customer is at or above its subscribed capacity. If the customer is at or above capacity, then the lines currently being used are selected; otherwise, the least used (or first unused) line found in the database is selected.

At block 1150, the fax job is submitted to the fax server containing the selected fax modem. According to one embodiment, submitting includes sending the following information to the fax server:

Destination number
A TIFF image file to fax
Tagline name and number to use
Time zone to use on the tagline
Number of retries to attempt
TSI (the fax identifier on the call) to use
Format of the tagline
Sending customer account number
Maximum time the fax may be in the queue
The specific fax modem to use
Modem capabilities to use (as identified previously in connection with gathering destination-specific fax settings)

If submission is successful (e.g., the fax server returns a unique communication ID to the image server), then imaging system work processing continues with block 1160. If submission is unsuccessful, then an error message may be communicated to the user according to the notification settings and imaging system work processing may terminate; however, in an embodiment in which a configurable number of retries may be attempted upon unsuccessful submission, imaging system work processing may continue by excluding the previously selected fax modem from the list of potential fax modems and looping back to block 1140 until submission is successful or the number of retires is exhausted.

At block 1160, the database is updated to reflect successful submission. In one embodiment, updating the database includes updating a counter in the database to reflect the customer has a job in progress on the selected fax modem and updating the outgoing fax job with one or more of the following:

The fax server communication ID returned by the fax server upon successful submission
The number of pages in the single multi-page TIFF file submitted
The caller ID to use if such optional caller ID information was previously available during the gathering process of block 1110
An indication of an "In Queue" state (which allows API and web retrieval to show the fax is currently in queue and waiting to be sent)

Figure 12:
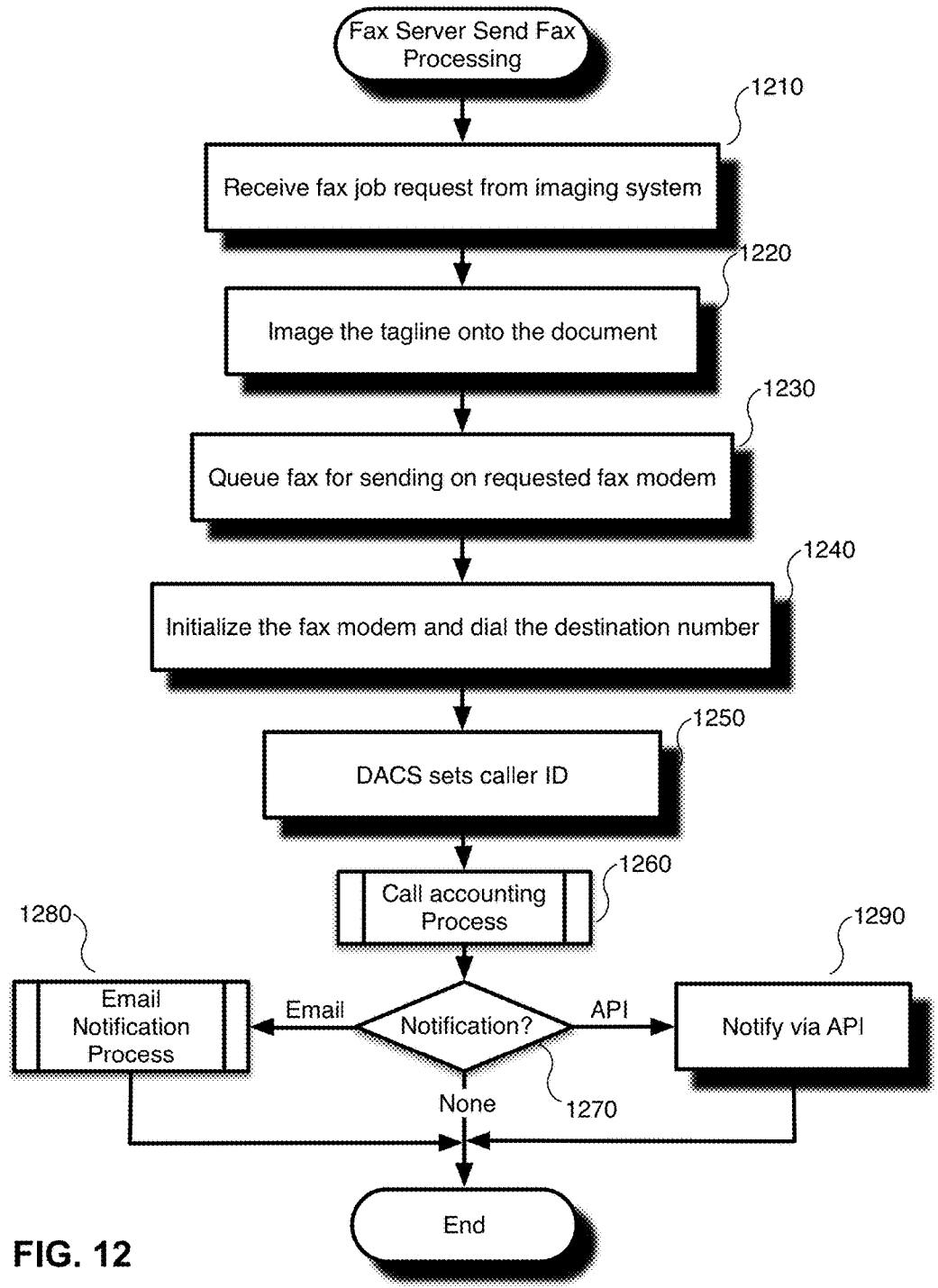
FIG. 12 is a flowchart illustrating fax server send fax processing in accordance with an embodiment of the present invention.

FIG. 12 is a flowchart illustrating fax server send fax processing in accordance with an embodiment of the present invention. At block 1210, a fax server receives a fax job request from an imaging system and returns a unique communication ID to the imaging system.

At block 1220, the fax server images the tagline on to the document according to the received parameters.

At block 1230, the fax server queues the fax for sending on the requested fax modem.

At block 1240, when this fax comes up in the queue, the fax modem is initialized with the requesting capabilities and the destination number is dialed.

At block 1250, a DACS, connected via a POTS line to the fax modem, writes information into the caller ID field to allow an upstream PBX to identify the modem/port originating the fax call. According to one embodiment, the DACS sets the caller ID field based on a static number assignment mechanism that forms a one-to-one association between an extension and a particular modem/port and then forwards the call to a PBX attached via T1/PRI. In one embodiment, each PBX of the Internet fax system architecture is associated with one or more DACS each having 24 fax ports and each fax server is connected to multiple ports of a DACS and the extensions have the following format:

303303 DDFF

Where:

the first six digits (i.e., 303303) are hard-coded

DD represents the DACS with which the fax server is associated

FF represents the port to which the fax modem on the fax server is connected the DACS to which the fax server is connected.

Following the above convention (or variations thereof) for associating a static number with a modem/port, the PBX receiving the fax call may use the caller ID information passed to it to identify the specific fax modem on the specific fax server and may use that information to interrogate the fax server for desired information as described further below with reference to FIG. 13.

If the fax call is successful, then fax server send fax processing continues with block 1260. If the fax call is unsuccessful, then a configurable number of carrier retries may be attempted by recording the number of attempts and causing the PBX to retry with an alternate carrier if the failure reason is one eligible for an alternate carrier retry (e.g., disconnected, no carrier or busy) or retry with the same carrier if the failure reasons is not one eligible for trying an alternate by looping back to block 1230. After the retries have been exhausted, processing continues with block 1260.

In some embodiments, a notify process may be performed at this point of fax server send fax processing (regardless of the success or failure of the fax call) to record the location of the file (attempted to be) faxed, a success/failure indicator, transmission time, communications ID, sending account ID and number of pages transmitted. This information may be used later in combination with additional information to provide a detailed outbound fax confirmation to the user via their configured notification method (e.g., email or API notification). In one embodiment, regardless of the configured notification method (e.g., even if it is "none"), the database is updated so that web-based status information is available to the customer via web retrieval through web gateway 230, for example.

At block 1260, a call accounting process is performed. According to one embodiment, the call accounting process is as described with reference to FIG. 15.

At decision block 1270, a determination is made regarding the type of notification, if any, to be performed in relation to the completed fax job. According to one embodiment, the notification type (e.g., email, API push to URL or none) for this outbound fax is first retrieved from the database. If the notification setting for this outbound fax is none, then fax server send fax processing is complete. If the notification setting for this outbound fax is email, then fax server send fax processing continues with block 1280; otherwise processing branches to block 1290.

At block 1280, an email notification process is performed. According to one embodiment, the email notification process is as described with reference to FIG. 16.

At block 1290, the user is notified regarding the completed fax job via API. According to one embodiment, the URL (originally recorded by web services interface/API gateway 240) to which the notification is to be pushed is retrieved from the database. The following data may then be POSTed to the specified URL and fax server send fax processing is complete:

Fax job ID

Communications ID

Destination name

Destination number

Success/failure

Detailed reason (if failure)

Time sent

Time completed

Call duration

Total number of pages

Number of pages transmitted

Figure 13:
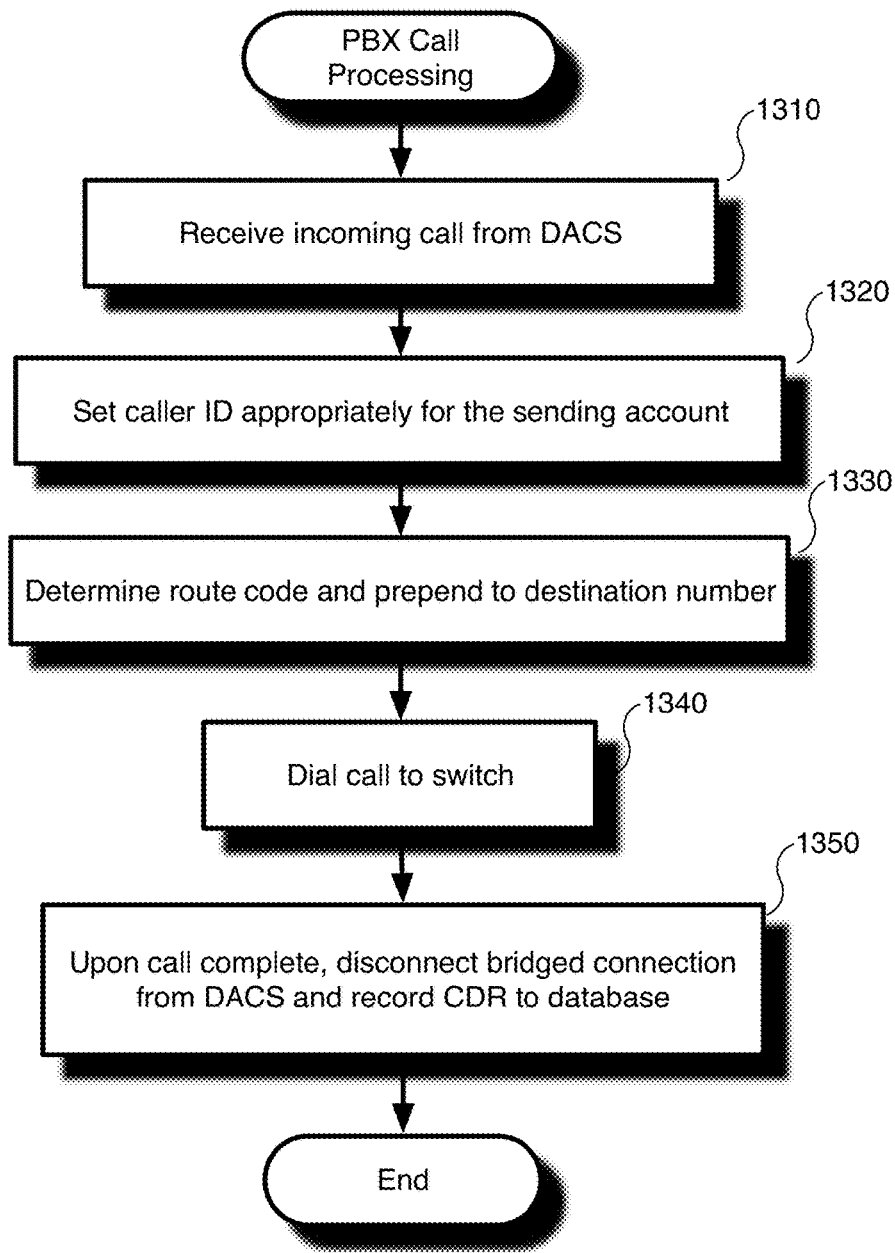
FIG. 13 is a flowchart illustrating private branch exchange (PBX) call processing associated with an outbound fax in accordance with an embodiment of the present invention.

FIG. 13 is a flowchart illustrating PBX call processing associated with an outbound fax in accordance with an embodiment of the present invention. At block 1310, a PBX, logically interposed between fax processing resources 280 and telecom system(s) 290, receives an incoming call from DACS (representing the outbound fax call).

At block 1320, the caller ID field is set appropriately for the sending account. According to one embodiment, the caller ID field is set with either a default caller ID associated with the subscriber account or a caller ID associated with this communications ID, if specified.

As noted above with reference to FIG. 12, in one embodiment, the caller ID field communicated to the PBX may contain extension information according to a static number assignment mechanism that forms a one-to-one association between an extension and a particular fax modem/DACS port. This allows the PBX to identify the fax server originating the outbound fax call, make an IP connection to the fax server and interrogate the fax server for the communications ID of the fax job being sent by the fax modem identified by the caller ID field.

Using the communications ID, the PBX may then query the database to identify the sending subscriber account ID that initiated the communications ID and can retrieve the default caller ID associated with the subscriber account ID. This caller ID will be written to the caller ID field unless overridden by a particular caller ID value specified by the user to be associated with this outbound fax call in which case the caller ID field will be set with the call-specific caller ID value.

At block 1330, a route code is prepended to the destination number. According to one embodiment, the database is checked to determine if a destination-specific route code exists. In one embodiment, the first match of the following takes precedence:

A route code associated with the full number (e.g., all ten digits of the destination number)

A route code associated with the NPANXX (e.g., the first six digits of the destination number)

A route code associated with the NPA (a/k/a area code, the first three digits of the destination number)

A default route code

In one embodiment, if a default route code is to be used, then the database carrier rate tables are queried to determine the lowest cost route code based on NPANXX of the destination number.

In an implementation that allows carrier retries, the current route code may be overridden. According to one embodiment after the route code has been determined based on the foregoing criteria, the database is queried to determine if the current fax call is a retry attempt wherein an alternate carrier has been requested by the fax server. If so, then the current route code is overridden with an alternate carrier route code different from that used in the prior fax call attempt.

In alternative embodiments, the order of route code determination described above may be reordered so as to first identify whether the current fax call is a retry attempt and if so identifying the alternate carrier route code; otherwise applying the destination-specific route code matching algorithm noted above.

In any event, after the route code is determined, it is prepended to the destination number to cause a switch of telecom system(s) 290, for example, to select an appropriate trunk for the outbound fax call.

At this point in PBX call processing, the PBX may internally mark this call (for call detail record (CDR)) with one or both of the following:

The account code of the account ID previously gathered
A user field specifying the communication ID and fax modem that initiated the call At block 1340, the outbound fax call is dialed to the switch via a T1/PRI connection with the caller ID and destination as set based on the foregoing PBX call processing steps.

At block 1350, the PBX waits for the call to complete (e.g., switch disconnect). Upon call completion, the PBX disconnects the bridged connection from the DACS, records the CDR to the database and PBX call processing is terminated.

Figure 14:
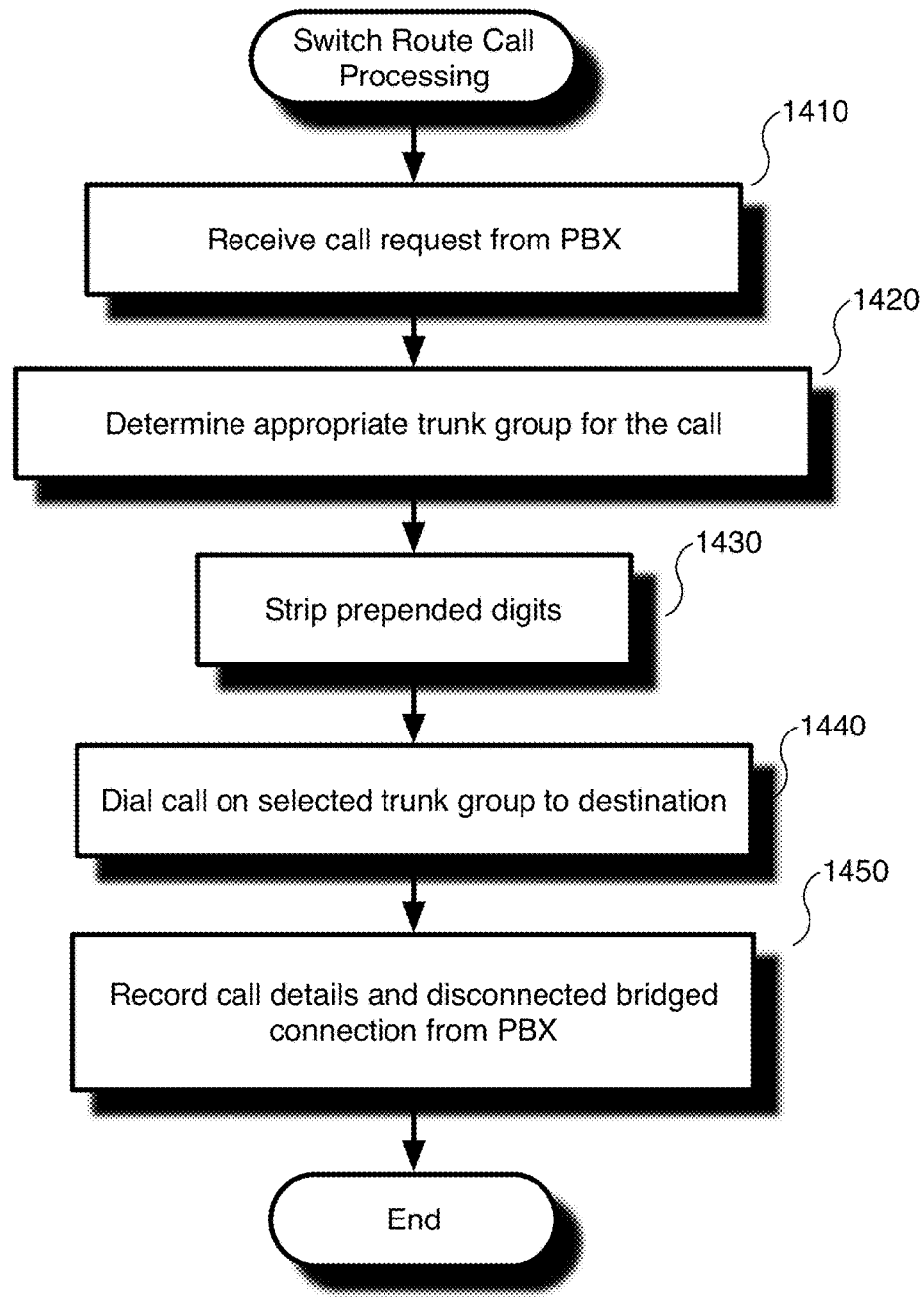
FIG. 14 is a flowchart illustrating switch route call processing associated with an outbound fax in accordance with an embodiment of the present invention.

FIG. 14 is a flowchart illustrating switch route call processing associated with an outbound fax in accordance with an embodiment of the present invention. At block 1410, a call request representing an outbound fax call is received from a PBX.

At block 1420, an appropriate trunk group is determined for the call. Trunk groups may provide a transmission channel to a packet-switched network (e.g., the Internet) or a circuit-switched network (e.g., the PSTN). According to one embodiment, the destination number of the call request (which includes the route code digits prepended by the PBX) is pattern-matched against trunk groups (e.g., T1/PRI, DS3, Session Initiation Protocol (SIP) and the like) attached to the switch with the most specific match taking precedence.

At block 1430, the prepended digits are stripped to arrive at an appropriate number of digits to dial (e.g., the rightmost 10, 11, 7, etc.) according to the configuration of the selected trunk group.

At block 1440, the call is dialed on the selected trunk group to the destination.

At block 1450, upon call completion, call details are recorded, the bridged connection from the PBX is disconnected and switch route call processing is terminated.

Figure 15:
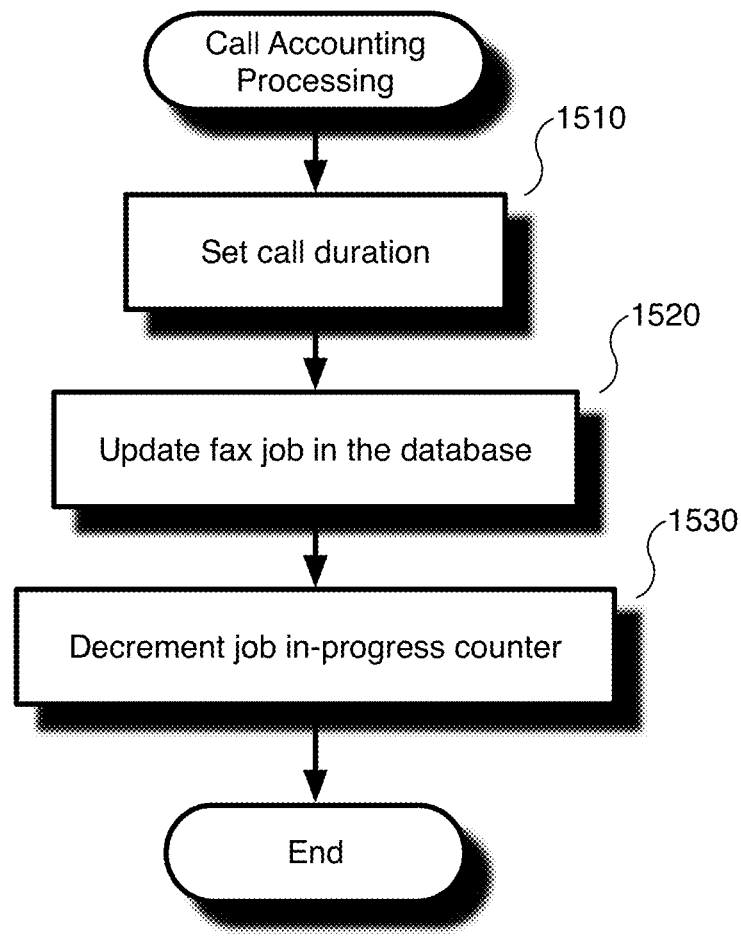
FIG. 15 is a flowchart illustrating call accounting processing associated with an outbound fax in accordance with an embodiment of the present invention.

FIG. 15 is a flowchart illustrating call accounting processing associated with an outbound call in accordance with an embodiment of the present invention. At block 1510, the call duration for the outbound fax call is set. According to one embodiment the database is first queried for a CDR associated with the destination and sending account ID to obtain actual call duration. If the CDR is found, then the actual call duration is used; otherwise the transmit time is used as the call duration.

At block 1520, the fax job is updated in the database. According to one embodiment, the fax job ID is first looked up in the database based on the communication ID, account ID and "in queue" state. Then, the fax job record is updated in the database to indicate success or failure and a detailed reason for the failure is added in the case of a failure. The number of pages transmitted may also be added to the fax job record.

At block 1530, the appropriate job in-progress counter is decremented. According to one embodiment, a job in-progress counter is maintained in the database for each fax modem by customer. In some embodiments, this counter is used during imaging system work processing to select an appropriate fax modem (see, e.g., FIG. 11 and block 1140).

Figure 16:
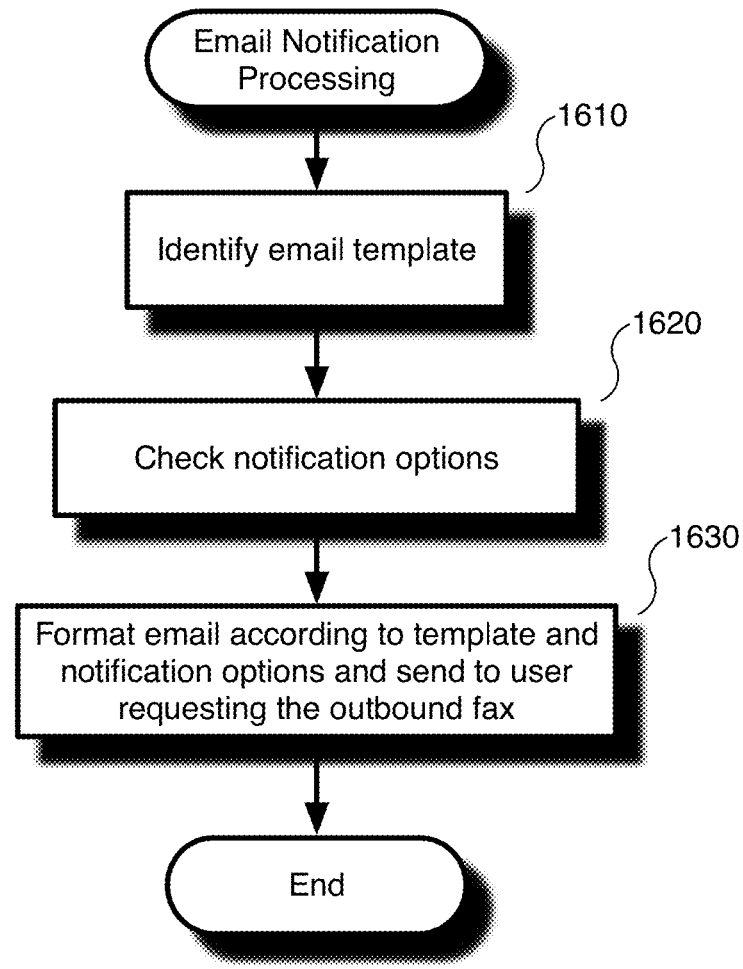
FIG. 16 is a flowchart illustrating email notification processing associated with an outbound fax in accordance with an embodiment of the present invention.

FIG. 16 is a flowchart illustrating email notification processing associated with an outbound fax in accordance with an embodiment of the present invention. At block 1610, an email notification template is identified that is to be used for email notifications to the user. According to one embodiment, the database is queried to locate a custom email notification template for the subscriber account. The custom email notification template may define custom messaging for use in connection with the subject line and/or body of the email notification. If a custom template is not specified for the subscriber account, then a default email notification template may be used.

At block 1620, notification options are checked. According to one embodiment, notification options include whether to include a transmittal page and whether to include the original email fax request subject line. Those skilled in the art will appreciate various other options are possible. For example, the subscriber may specify email notifications are to be in plain text format versus HTML and that the transmittal page and/or the scaled image of the first page are to be sent as attachments versus inline images.

If a transmittal page is to be included with email notifications for this subscriber account, then a transmittal page is generated including one or more of the following:

Destination
Call status (success/failure, detailed reason if failure)
Number of pages transmitted
Date/time in user's specified time zone
Call duration
Scaled image of the first page of the file faxed If the subject line from the email fax request that initiated this fax job is to be included, then the subject for this job ID is retrieved from the database (which was recorded earlier by the email gateway 220, for example).

At block 1630, the email notification is formatted according to the identified template and notification options and sent to the user that originated the email fax request for this fax job.

Figure 17:
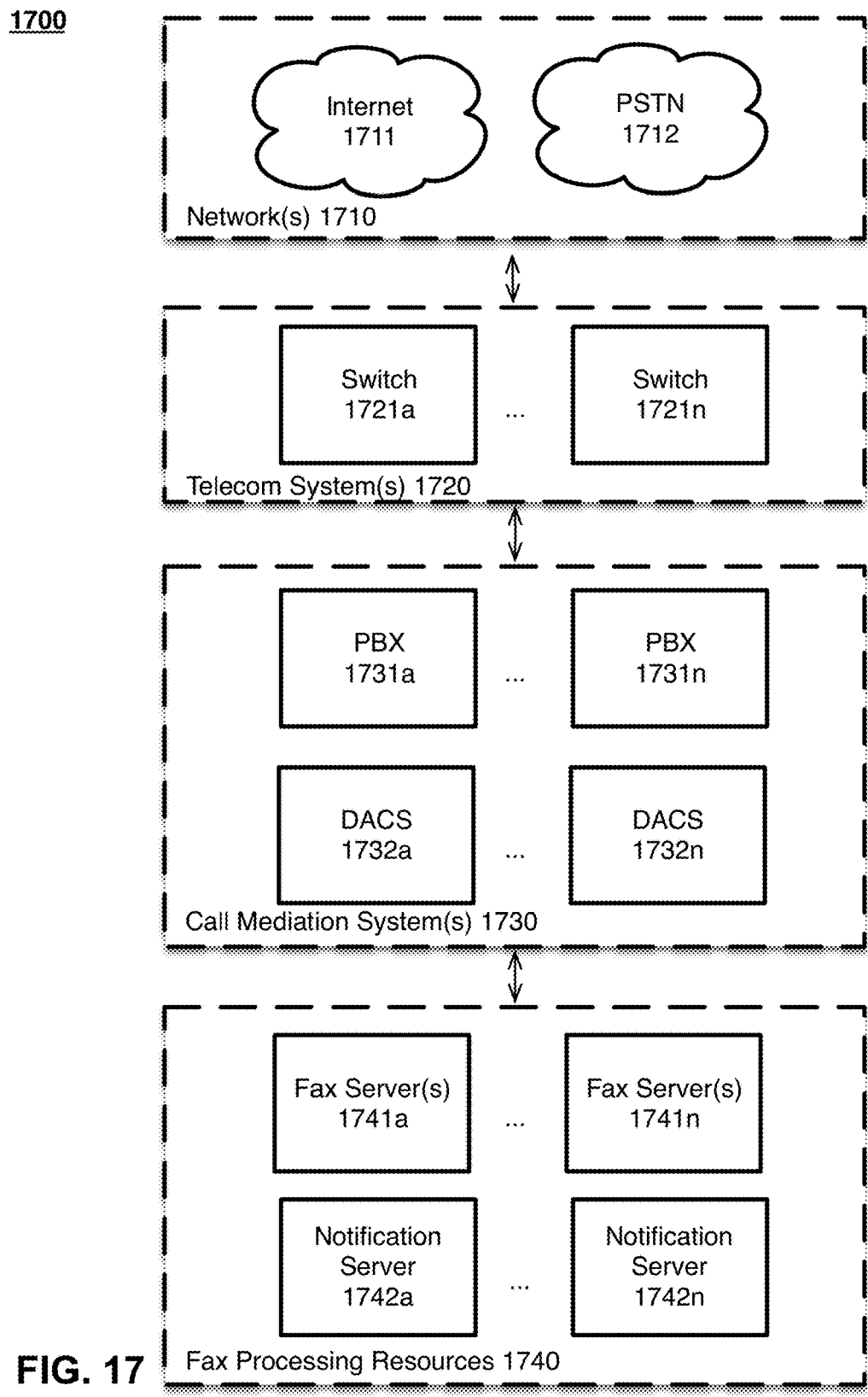
FIG. 17 is block diagram illustrating various components of an Internet fax system architecture associated with inbound fax processing in accordance with an embodiment of the present invention.

FIG. 17 is block diagram illustrating various components of an Internet fax system architecture 1700 associated with inbound fax processing in accordance with an embodiment of the present invention. Embodiments of the present invention seek to provide redundancy and scalability based on an active-0/active-n setup of multiple fax servers, PBXs, etc. that are all essentially identical, such that a given fax server does not have to be associated with a "backup" fax server that is used if it goes down as suggested by prior Internet fax system architectures, such as the architecture described in U.S. Pat. No. 6,208,638. Instead, in accordance with embodiments of the present invention, an n-way pool of possible fax servers and modems are available for use and which may be sub-divided by the technical capabilities of each.

In the present example, as in the example architecture discussed with reference to FIG. 2, Internet fax system architecture 1700 includes one or more telecommunications systems 1720, one or more call mediation systems 1730 and fax processing resources 1740 coupled to one or more networks 1710.

According to the architecture depicted, network(s) 1710 may include both a packet-switched network, such as the Internet 1711, and a circuit-switched network, such as the public switched telephone network (PSTN) 1712. As such, Internet fax system architecture 1700 may receive inbound fax calls over packet-switched or circuit-switched connections.

According to the present example, telecommunications system(s) 1720 include one or more switches 1721a-n. Switches 1721a-n may be connected to the Internet via Ethernet and connected to the PSTN 1712 via dedicated, high bandwidth circuits (e.g., DS3 and/or DS1 lines). In one embodiment, switches 1721a-n are high-capacity access servers providing both packet and time-division multiplexing (TDM) switching. Examples of suitable switches include, but are not limited to, the Cisco AS5850 Universal Gateway, the Cisco AS5800 Access Server, the Cisco AS5400 Universal Gateway, the Cisco AS5350 Universal Gateway and the Cisco AS5300 Universal Access Server. Depending upon the particular implementation, telecommunications system(s) 1720 may comprise a single switch or multiple redundant switches in which one of the switches 1721a-n is an active primary switch and the others are active standby switches, which can take over for the primary in the event of a failure. In alternative embodiments, it is also possible to have an active/active redundant switch architecture in which multiple circuits from PSTN 1712 and/or Internet 1711 provide the same services and the circuits are split between multiple switches 1721a-n that are interconnected in a mesh for redundancy and/or increased capacity.

Call mediation system(s) 1730 may include one or more PBXs 1731a-n. In one embodiment analog fax processing resources are supported by providing associated digital access cross connect systems (DACS) 1732a-n. PBXs 1731a-n may be implemented by installing and running an open source PBX software package on a server. For example, a non-limiting example of a suitable PBX is a Linux server running Asterisk. Alternatively, PBXs available from Cisco or Avaya may be used. According to one embodiment, DACS 1732a-n provide DS1/DS0 (0/1) cross-connect functionality and may be one of Adtran's ATLAS series of enterprise integrated access devices, such as the ATLAS 550 series, ATLAS 800 series, Tellabs Titan series DACS or the like.

As described in further detail below, in various embodiments of the present invention, the destination address associated with an inbound fax call may be remapped in a novel manner to force it to be routed to a particular selected analog modem on a fax server where the destination (DID) is changed by the call mediation system to a fixed DID that represents the modem to a DACS in front of the fax server. The destination address is moved into the caller ID name field, while the caller ID number remains the source address.

According to the present example, fax processing resources 1740 include one or more fax servers 1741a-n and one or more notification servers 1742a-n. Each of the fax servers 1741a-n may include one or more analog fax modems, digital fax boards and/or soft modems (modems implemented in software). According to one embodiment, fax servers 1741a-n each have 24 ports and those ports are connected to the 24 ports of a single DACS of DACS 1732a-n. Those of ordinary skill in the art will appreciate there are a variety of possible combinations of DACS to fax server connections/configurations. For example, in alternative configurations, each DACS 1732a-n may support multiple fax servers—theoretically as many fax servers as it has ports by connecting each port of the DACS to a single port of a fax server. According to one embodiment, fax servers 1741a-n include Linux servers running open source fax server software, such as HylaFAX. As described further below, embodiments of the present invention accommodate facsimile processing resources having different configurations and/or differing capabilities or capacities by dynamically selecting at the call mediation layer appropriate facsimile processing resources based on various factors, e.g., (i) the source address (e.g., automatic number identification (ANI) or caller identification (caller ID, CID)) of the inbound fax call and the source's known capabilities/limitations; (ii) whether the inbound fax call arrived over a packet-switched or circuit-switched connection, (iii) the telecommunications service provider through which the inbound fax call arrived and (iv) the destination address (e.g., Direct Inward Dialing (DID), Dialed Number Identification System (DNIS) or Calling Identification). As such, an Internet fax system architecture in accordance with embodiments of the present invention allows for selection of differing capabilities for inbound modems.

In one embodiment, notification servers 1742a-n are used during inbound fax processing to separate image format conversion processing (which may be performed by the fax servers 1741a-n) from email notification processing. In alternative embodiments, notification servers may perform both conversion of received fax content (TIFF images) to one or more supported file formats and email notification processing. In both cases, security of Internet fax system 200 is increased by isolating fax servers 1741a-n from the Internet.

In some embodiments, fax servers 1741a-n perform a notification server selection process (e.g., as described further below with reference to FIG. 26) to identify a least loaded notification server of notification servers 1742a-n to process the fax content. According to one embodiment, after an appropriate notification server has been selected to process the fax content (e.g., perform image format conversion processing and/or email notification processing), the fax server issues a processing request to the selected notification server as described further below with reference to FIG. 26.

Figure 18:
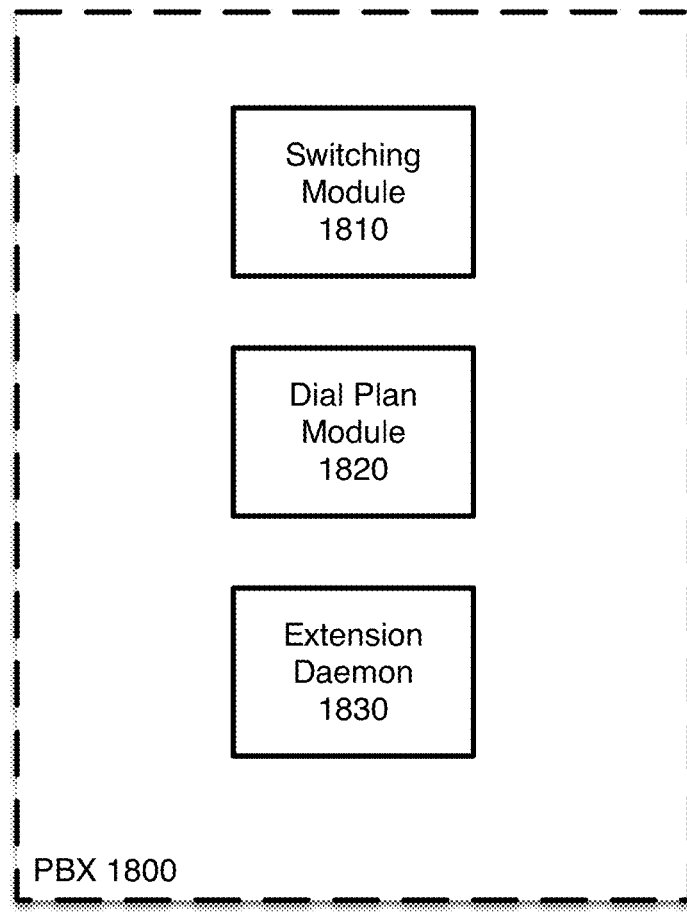
FIG. 18 is block diagram illustrating functional units of a private branch exchange (PBX) associated with inbound fax processing in accordance with an embodiment of the present invention.

FIG. 18 is block diagram illustrating functional units of a PBX 1800 associated with inbound fax processing in accordance with an embodiment of the present invention. In the context of the present simplified example, PBX 1800 includes a switching module 1810 a dial plan module 1820 and an extension daemon 1830.

According to one embodiment, switching module 1810 is responsible, under control of dial plan module 1820, for out-dialing on a particular circuit or channel to a destination, then bridging the source call with the destination when the destination answers. Switching module 1810 is also typically responsible for reporting the event that the destination answers and/or does not answer to dial plan module 1820 for further processing when such event occurs.

Dial plan module 1820 is generally responsible for choosing whether to accept or reject a particular inbound fax call, based on source, destination, carrier received on, etc. If the call is accepted, the dial plan module 1820 asks extension daemon 1830 for an appropriate destination extension to which to switch the call and requests that switching module 1810 switch the call to the destination received from extension daemon 1830. If switching module 1810 indicates that the destination does not answer, then the dial plan module 1820 may request extension daemon 1830 to identify an alternative destination and attempt to switch the call to the alternative destination until the selected destination answers. Dial plan module 1820 may also record call accounting information at call completion for billing purposes.

Extension daemon 1830 is responsible for receiving a request for a fax call to be switched from dial plan module 1820. The request may include the source address, the destination address and information regarding the carrier/technology from which the call originated. Based on the source, destination, carrier/technology the call comes in on, etc., extension daemon 1830 selects a subset of appropriate fax call resources (with the "right" or "desired" capabilities) from all fax call resources. As such, an Internet fax system architecture implemented in accordance with embodiments of the present invention allows for selection of differing capabilities for inbound modems. In any event, from the appropriate fax call resources, extension daemon 1830 selects the "next" (according to a round-robin algorithm, for example) fax processing resource that should be tried/used. Extension daemon 1830 then returns an extension associated with the selected fax call resource to dial plan module 1820.

Figure 19:
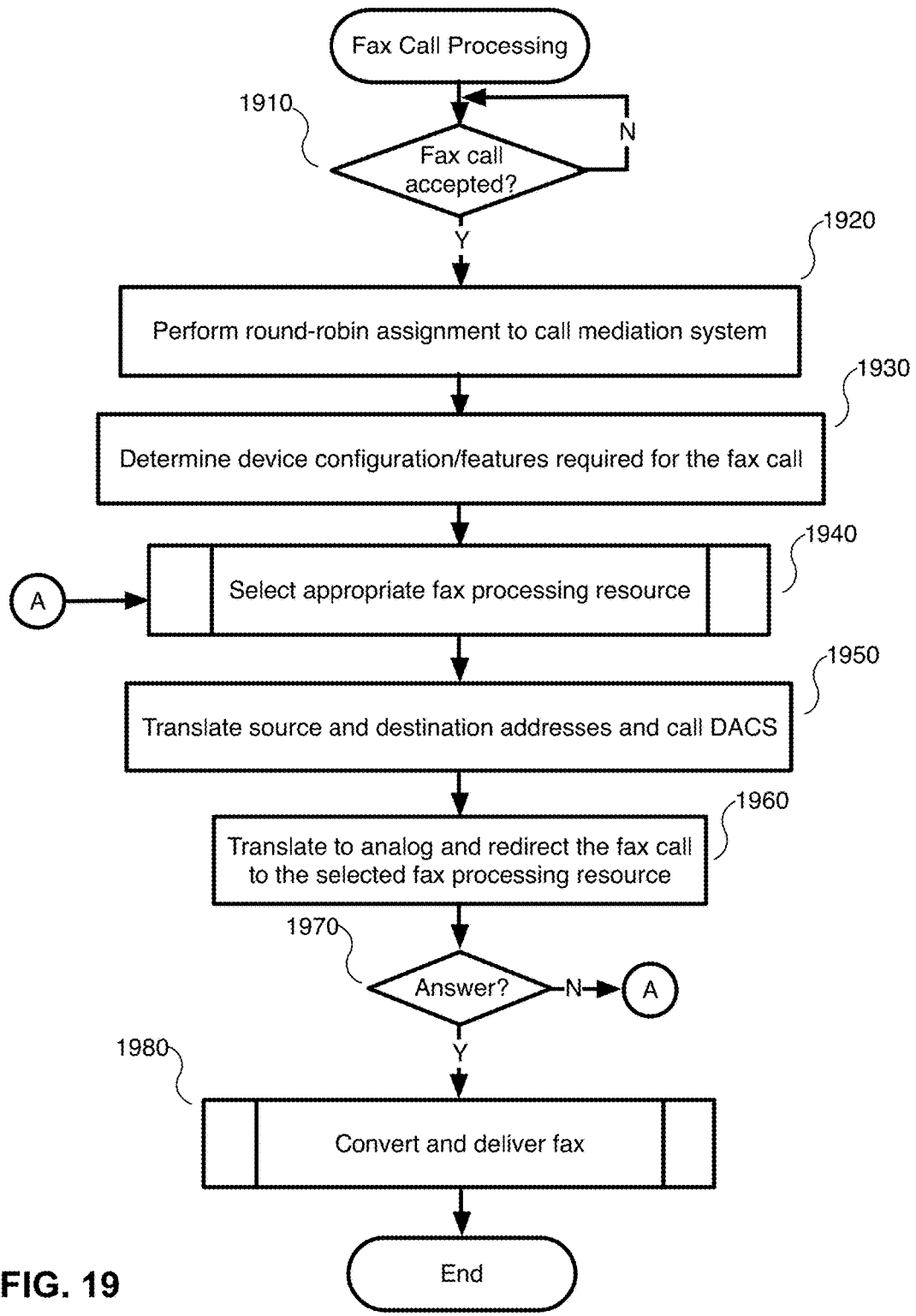
FIG. 19 is a flowchart illustrating inbound fax call processing in accordance with an embodiment of the present invention.

FIG. 19 is a flowchart illustrating inbound fax call processing in accordance with an embodiment of the present invention. At decision block 1910, a determination is made regarding whether an inbound fax call has been accepted by the Internet fax system, e.g., by telecommunications system(s) 290 of Internet fax system 200. If so, then fax call processing continues with block 1920; otherwise, fax call processing loops back to decision block 1910 until an inbound fax call is received.

At block 1920, the inbound fax call is assigned to a call mediation system. In one embodiment, a switch, such as switch 321*a*, performs round-robin load balancing among multiple PBXs, such as PBX 331*a-n*. In such an embodiment, the switch is stateful as it keeps state regarding which PBX to use next, for example. Those skilled in the art will appreciate that various other load distribution techniques are available. For example, in alternative embodiments, the inbound fax call may be assigned to the least recently used PBX, a randomly selected PBX or PBX having the most available capacity. If guaranteed or differentiated quality of service is offered to subscribers, weighted round-robin or weighted fair queuing may be implemented.

At block 1930, device configuration/features required for processing the inbound fax call are determined. According to one embodiment, the PBX to which the inbound fax call has been assigned performs a source address and subscriber account lookup (based on the destination address) in data store 265 to identify configurations or known capabilities/limitations associated with the source and/or the destination of the inbound fax call. For example, the fax transmission source of the inbound call may be known to be capable of high-speed transmission and therefore indicate a preference for a higher speed fax server. Alternatively, the fax transmission source may be known for producing higher than average transmission errors or known to be using an older fax standard, thus indicating a preference for a lower speed fax server.

The PBX may also use information regarding the service provider and/or whether the inbound fax call arrived over a packet-switched or circuit-switched connection to determine configuration/features required for processing the inbound fax call. Based on the various factors, it may be determined, for example, that a fax server that is more tolerant of delays is a feature desirable for processing the particular inbound fax call. Those skilled in the art will appreciate an appropriate data structure can be created and maintained to store and prioritize configuration/feature information based on the above-referenced factors and/or others. For example, a configuration/feature preference associated with a particular network connection (e.g., packet-switched connection) may override and take precedence over a configuration/feature preference associated with one or both of the source address and the destination address of the inbound fax call at issue.

In some embodiments, an inbound fax call may be accepted or rejected by the PBX without performing any further processing based on various factors. For example, the PBX may reject an inbound fax call according to the subscriber's subscribed capacity and how many calls are currently in progress to one or more destination addresses associated with the subscriber. Calls can also be rejected based on the subscriber configuring source addresses (e.g., known fax spammers) from which calls are not to be accepted.

According to one embodiment, as a precondition to performing configuration/feature determination, the PBX may check whether the subscriber to which the inbound fax call is directed is within its subscribed capacity limits (e.g., number of received faxes, total faxes, number of concurrent inbound fax calls, number of received fax pages and/or total fax pages within a predetermined time frame, long distance fees, bandwidth, storage, etc.). If the subscriber is determined to be at capacity, then a busy signal can be returned to the caller. Alternatively or additionally, an inbound fax call may be blocked (by sending a busy signal) at the PBX without passing the call to a fax server based on the source address, the destination address or a combination of the two addresses. Source-address-only blocking may be performed system wide for all subscribers and all destinations. In one embodiment, an inbound fax call may be blocked based on a combination of the source address and the subscriber. That is, subscribers of the Internet fax system may be provided with the capability to block a source to just one of their numbers or to all of their numbers, including numbers to which they subscribe in the future; the block being based on source/subscriber combination accomplishes this. In one embodiment, the PBX remains in the path of the call and waits for the call to be completed so it can record call accounting for billing in a billing database. In one embodiment, at the time of the inbound call event and prior to call completion, source and destination address configurations are checked, but the centralized resource for user account information is not.

At block 1940, to the extent the inbound fax call is to be passed to a fax processing resource, an appropriate fax processing resource is selected. According to one embodiment, appropriate fax processing resource selection proceeds as described with reference to FIG. 20.

At block 1950, the source and destination addresses associated with the inbound fax call are translated and the appropriate DACS is called. According to one embodiment, the PBX places the DNIS into the calling name and changes the DNIS to the extension of the selected fax processing resource prior to calling the DACS. Those skilled in the art will be familiar with various conventions/schemes for assigning extensions to DACS and fax servers in the exemplary architecture depicted in FIG. 17.

In one embodiment, each PBX is associated with one or more DACS each having 24 fax ports and the extensions have the following format:

303303DDFF

Where:

the first six digits (i.e., 303303) are hard-coded

DD represents the DACS with which the selected fax server is associated

FF represents the fax port on the DACS to which the selected fax server is connected.

At block 1960, the inbound fax call is translated to analog and redirected to the selected fax processing resource. In one embodiment, the DACS redirects the incoming call signal along with the source and destination addresses, to the selected fax processing resource, as specified in the destination address specified by the call mediation system to the message processing resource via a circuit switched connection, translating the ANI into caller ID name (containing the original destination address) and number (containing the source address) fields. According to one embodiment, the DACS redirects the inbound fax call to the port number represented by the last two digits of the DNIS of the inbound fax call.

At decision block 1970, it is determined whether the selected fax processing resource answered the call. If so, then fax call processing continues with block 1980; otherwise, fax call processing loops back to block 1940 and a different fax processing resource is selected.

At block 1980, the inbound fax signal is converted to a fax image and delivered and fax call processing is complete. According to one embodiment, conversion and notification/delivery of the fax proceeds as described with reference to FIG. 21. In other embodiments, conversion and notification/delivery of the fax proceeds as described with reference to FIG. 26.

Figure 20:
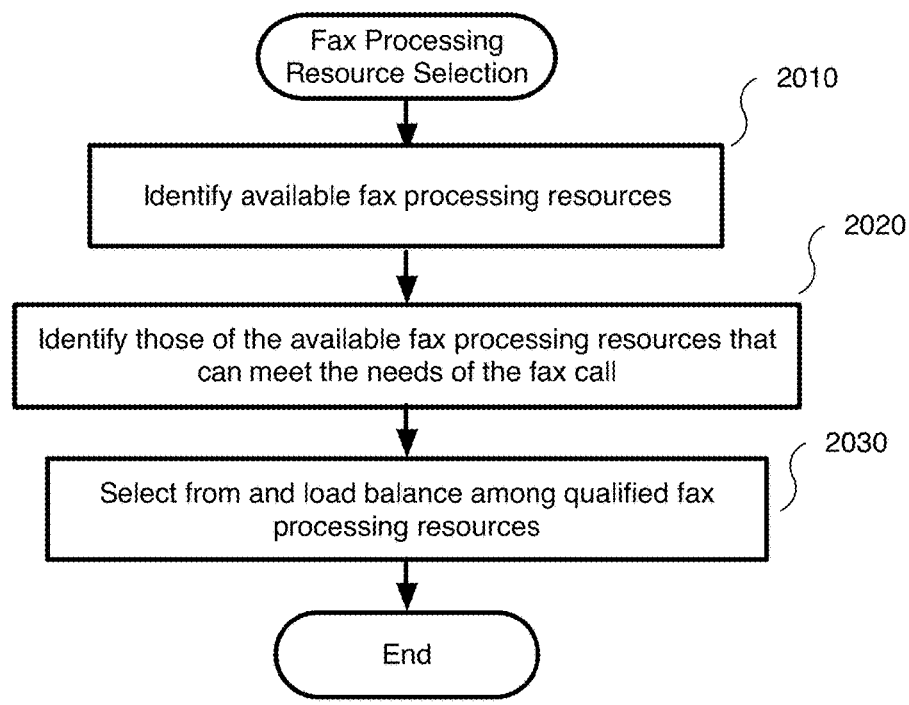
FIG. 20 is a flowchart illustrating fax processing resource selection associated with an inbound fax in accordance with an embodiment of the present invention.

FIG. 20 is a flowchart illustrating fax processing resource selection associated with an inbound fax in accordance with an embodiment of the present invention. In one embodiment, the steps described with reference to FIG. 20 are performed within block 1940 of FIG. 19.

At block 2010, available fax processing resources are identified. According to one embodiment, a database exists within the Internet fax system that maintains information identifying (i) all fax processing resources within the Internet fax system, (ii) the DACS and port number with which each fax processing resource is associated and (iii) features of each fax processing resource. The PBX may identify the universe of fax processing resources available to it by obtaining information from the database relating to fax processing resources associated with one or more DACS connected to the PBX.

In some embodiments, the PBX may maintain information regarding those fax processing resources that are ready to accept a call based on device status information periodically provided to the PBX by its associated fax processing resources. In other embodiments, the PBX may request device status information as needed from its associated fax processing resources or query the status from a database that maintains such information. In an environment in which device status is available to the PBX, the PBX may retrieve from the database feature information for only those fax processing resources known to currently be ready to accept a call.

At block 2020, those of the available fax processing resources that can meet the needs of the inbound fax call are identified. According to one embodiment, the list of available fax processing resources generated in block 2010 is pruned to produce a list of qualified fax processing resources by excluding those fax processing resources that are incapable of handling the fax speed and/or other capabilities deemed to be required to processing the fax signal associated with the inbound fax call.

At block 2030, an appropriate fax processing resource is selected from the list of qualified fax processing resources. According to one embodiment, load balancing is performed among those of the qualified fax processing resources by performing a least recently used selection algorithm or the like. For example, the PBX may avoid selection of a previously selected fax processing resource until all other fax processing resources on the list of qualified fax processing resources have been subsequently selected to process an inbound fax call.

Figure 21:
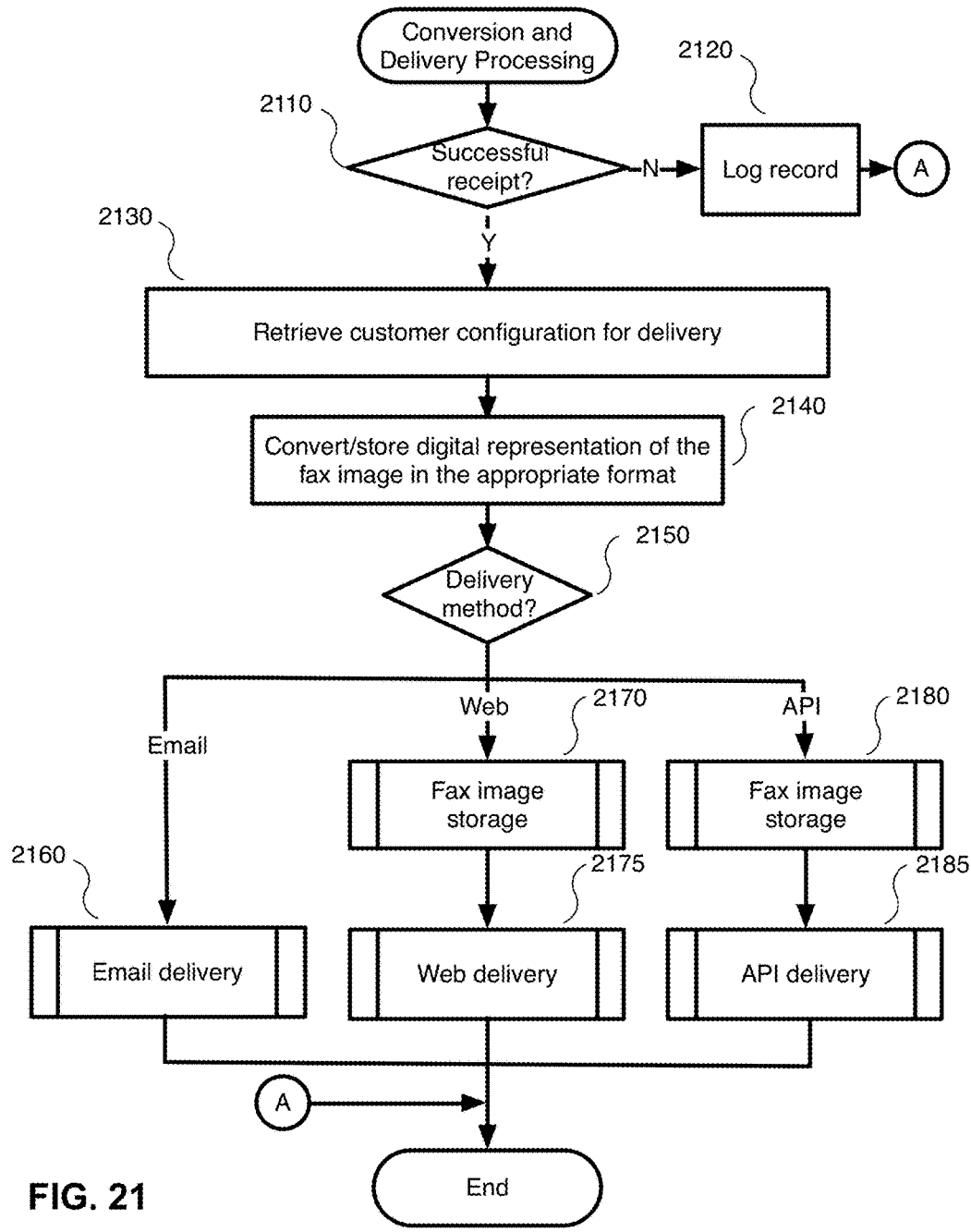
FIG. 21 is a flowchart illustrating conversion and delivery processing associated with an inbound fax in accordance with an embodiment of the present invention.

FIG. 21 is a flowchart illustrating conversion and delivery processing associated with an inbound fax in accordance with an embodiment of the present invention. In one embodiment, the steps described with reference to FIG. 21 are performed within block 1980 of FIG. 19.

At decision block 2110, a determination is made regarding whether the fax signal associated with the inbound fax call was successfully received. According to one embodiment, successful receipt means receipt of all pages encoded within the fax signal and proper completion of all phases of the fax protocol. If it is determined that fax signal has been successfully received, then conversion and delivery processing continue with block 2130; otherwise, conversion and delivery processing branch to block 2120.

At block 2120, detailed information regarding the inbound fax call and the associated fax signal can be stored in a log to facilitate subsequent troubleshooting.

At block 2130, subscriber account information is retrieved to obtain delivery preferences/configuration for the fax based on the fax number dialed. In embodiments of the present invention, each subscriber may have one or more fax numbers and each fax number may have zero or more authorized users.

At block 2140, based on the subscriber's established preferences, the received fax may be converted from TIFF format to any of a number of supported formats, such as PDF format, and stored for retrieval via the web or API. According to one embodiment, received faxes are stored based on their destination address, not by user thereby supporting the notion of a truly multi-user system in which the subscriber is not an individual user, but rather is an organization having multiple users. In this manner, multiple users may be authorized to access and/or delete faxes received on a particular fax number.

At decision block 2150, the delivery method is determined. According to one embodiment, various configurable delivery preferences include, one or more of a preferred image file format (e.g., TIFF or PDF), delivery method and zero or more authorized users and associated access rights (e.g., read only, read/delete). Exemplary delivery methods include retrieval via a web site associated with the Internet fax server, retrieval via API, delivery of an email notification with an embedded link from which the fax can be retrieved or delivery of the fax as an email attachment (with or without password protection or PGP encryption).

Depending upon the particular implementation, the delivery method may be established at the subscriber level, the fax number level and/or the user level. For sake of brevity and simplicity, in the present example, it is assumed that a delivery method is established at the subscriber level or the fax number level. As such, in accordance with the present example, each user designated to receive a copy of faxes received on the particular fax number will receive the fax in the same form and via the same delivery method. If the delivery method is email, then conversion and delivery processing continues with block 2160. If the delivery method is web, then processing continues with block 2170. If the delivery method is API, conversion and delivery processing continues with block 2180. Those skilled in the art will recognize various other delivery methods, including, but not limited to, text message notification, instant message notification, pager notification, notification via automated voice call and the like.

At block 2160, the fax message is delivered via email to the designated users. Depending upon the particular implementation, a copy of the fax image may or may not also be stored within the Internet fax system. According to one embodiment, email delivery proceeds as described with reference to FIG. 22. Upon completion of the email delivery, conversion and delivery processing is complete.

At block 2170, the fax image is stored within the Internet fax system to make it available for access to authorized users. According to one embodiment, fax image storage proceeds as described with reference to FIG. 23.

At block 2175, delivery of the fax image is performed via a web delivery mechanism. According to one embodiment, fax image storage proceeds as described with reference to FIG. 24. Upon completion of the web delivery, conversion and delivery processing is complete.

At block 2180, the fax image is stored within the Internet fax system to make it available for access to authorized users. According to one embodiment, fax image storage proceeds as described with reference to FIG. 23.

At block 2185, delivery of the fax image is performed via an API delivery mechanism. According to one embodiment, fax image storage proceeds as described with reference to FIG. 24. Upon completion of the API delivery, conversion and delivery processing is complete.

While in the context of the present example, fax image storage is shown as taking place for only the web and API delivery methods, in one embodiment, fax image storage may take place for all delivery methods.

For simplicity FIG. 21 shows the delivery method determination being performed only once; however, it is to be understood that decision block 2150 may be placed within a loop to allow a delivery method determination to be made for each user to which a received fax is to be delivered. For example, embodiments of the present invention may provide highly customizable delivery options. According to one embodiment, delivery preferences can be configured at one or more levels of the hierarchy (e.g., the subscriber level, the fax number level and/or the user level) with preferences defined at lower levels of the hierarchy overriding preferences (defaults) established at higher levels of the hierarchy. As such, a received fax may be delivered to multiple users via different delivery methods. For example, a subscriber's default delivery preferences may be web delivery (e.g., retrieval via a web site associated with the Internet fax system) in PDF form with delivery to users A, B, C and D. Meanwhile, a particular fax number associated with the subscriber may be configured via delivery preferences to deliver a copy of all received faxes to users A, B and C, but not D. Furthermore, users A and B may have individually established delivery preferences, such as email notification and email delivery via password protected PDF, respectively. In such a configuration, all faxes received on the particular fax number will be delivered to users A, B and C (but not user D) by causing an email notification to be sent to user A, causing an email with a password protected PDF containing an image of the received fax to be sent to user B and causing a copy of the received fax to be stored, e.g., in file store 260, that is accessible via the web site by user C.

While for simplicity FIG. 21 treats the successful receipt determination (i.e., decision block 2110) as an all or nothing proposition (i.e., either the entire fax is received successfully or it is considered a failure), in other embodiments, partial fax receipt may be accommodated via an associated delivery preference specifying whether partial faxes should be delivered and if so by logging the partial receipt and treating the partial receipt as a successful receipt for purposes of decision block 2110. In some embodiments, the partial delivery (on or off) preference may be supported only as a per-destination preference (not per-subscriber or per-user). Similarly, partial delivery may be supported for only a limited number of the delivery methods (e.g., email and API delivery, but not web delivery).

Figure 22:
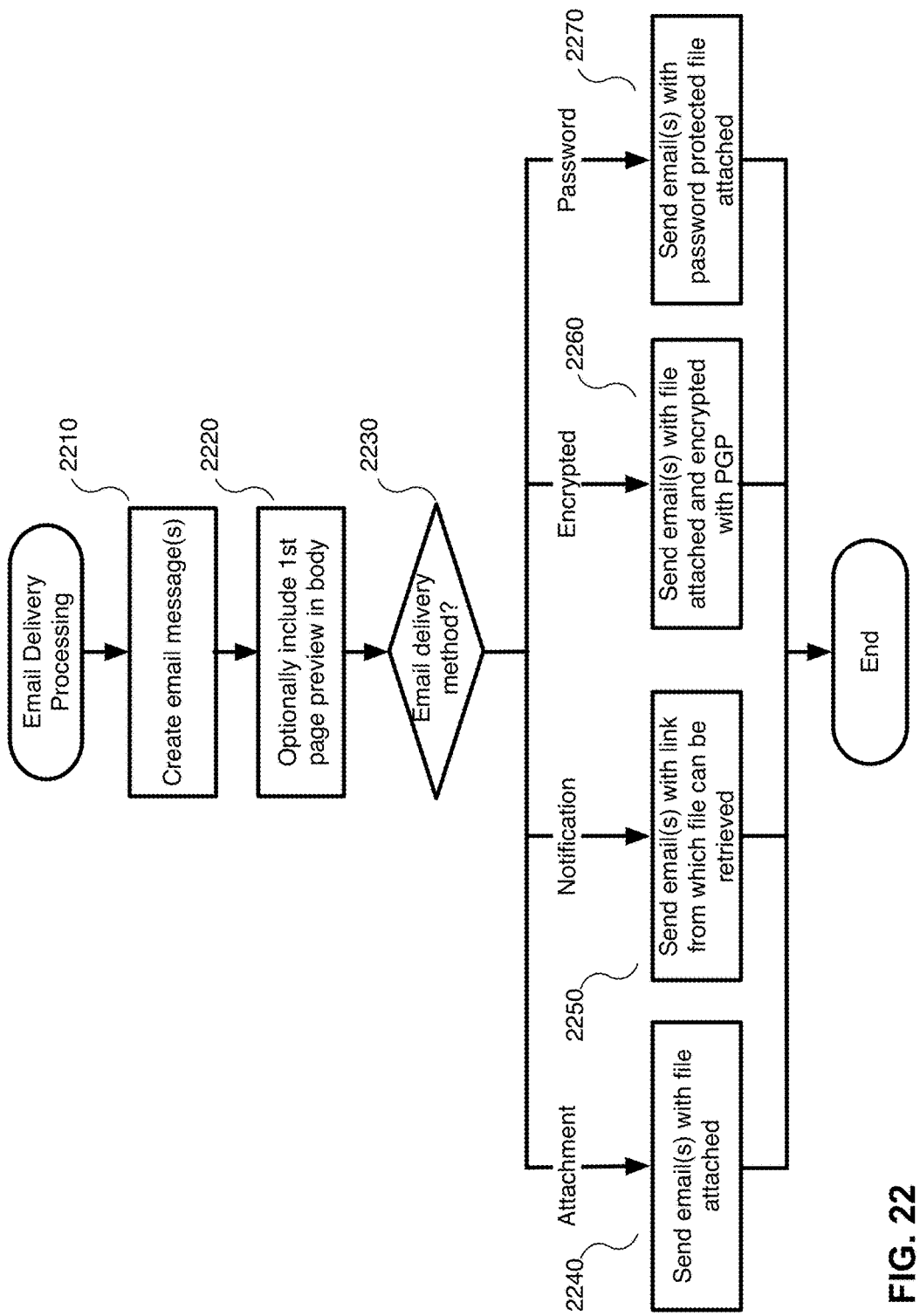
FIG. 22 is a flowchart illustrating email delivery processing associated with an inbound fax in accordance with an embodiment of the present invention.

FIG. 22 is a flowchart illustrating email delivery processing associated with an inbound fax in accordance with an embodiment of the present invention. In one embodiment, the steps described with reference to FIG. 22 are performed within block 2160 of FIG. 21.

At block 2210, one or more email messages are created directed to the users designated to receive a copy of received faxes for the fax number at issue. Depending upon the particular implementation, a single email message can be created directed to all users designated to receive a copy of received faxes for the fax number at issue. Alternatively, flexibility can be enhanced by creating separate email messages for each designated user in accordance with their specific delivery preferences. In some embodiments, the fax server or email gateway may apply custom messaging to the email message to make the email message appear to be from a customer's service provider that operates as a reseller of the Internet fax service, for example. Alternatively, the email message may be otherwise reformatted based on customer-defined preferences.

According to one embodiment, post-processing custom messaging/email capabilities may be provided on a per-subscriber and per-user within the subscriber basis in order to support, among other things, re-sale of the fax service and custom parsing requirements the user's system (if they parse email with a program) may have, such as subject line sorting in a way that works for the user in their email client (e.g., putting the number from which the fax was received at the beginning of the subject line (or the date and time or the page count or whatever) so the user can sort and find faxes in the context of their email client (e.g., Microsoft Outlook or the like) easily by subject line)

At block 2220, a preview of the first page of the fax may be embedded inline within the email message. According to one embodiment, the preview may be embedded in the form of a reduced size thumbnail image of the first page of the fax. In some embodiments, the preview may include more than one page.

At decision block 2230, the specific email delivery method is ascertained. Numerous email delivery and notification methods are contemplated. For purposes of simplicity, the present example, illustrates processing relating to unencrypted email attachment, email notification, encrypted email attachment and password-protected email attachment. If the email delivery method is attachment, the email delivery processing continues with block 2240. If the email delivery method is notification, then email delivery processing continues with block 2250. If the email delivery method is encrypted, processing continues with block 2260. If the email delivery method is password, then email delivery processing continues with block 2270.

At block 2240, the one or more generated email messages are sent with an attachment in the previously determined desired image file format.

At block 2250, the one or more generated email messages are sent with a link from which the fax image can be retrieved. According to one embodiment, the link is a secure link that uses SSL to transmit the fax image.

At block 2260, the one or more generated email messages are sent with an attachment in the form of an image file encrypted with PGP.

At block 2270, the one or more generated email messages are sent with an attachment in the form of a password-protected image file, such as a password-protected PDF.

For simplicity FIG. 22 shows the email delivery method determination being performed only once; however, it is to be understood that decision block 2230 may be placed within a loop to allow an email delivery method determination to be made for each user to which a received fax is to be delivered in a manner similar to that described with reference to FIG. 21. As such, each user designated to receive an email delivery/notification may have such email delivery/notification delivered in accordance with their particular preferences.

Figure 23:
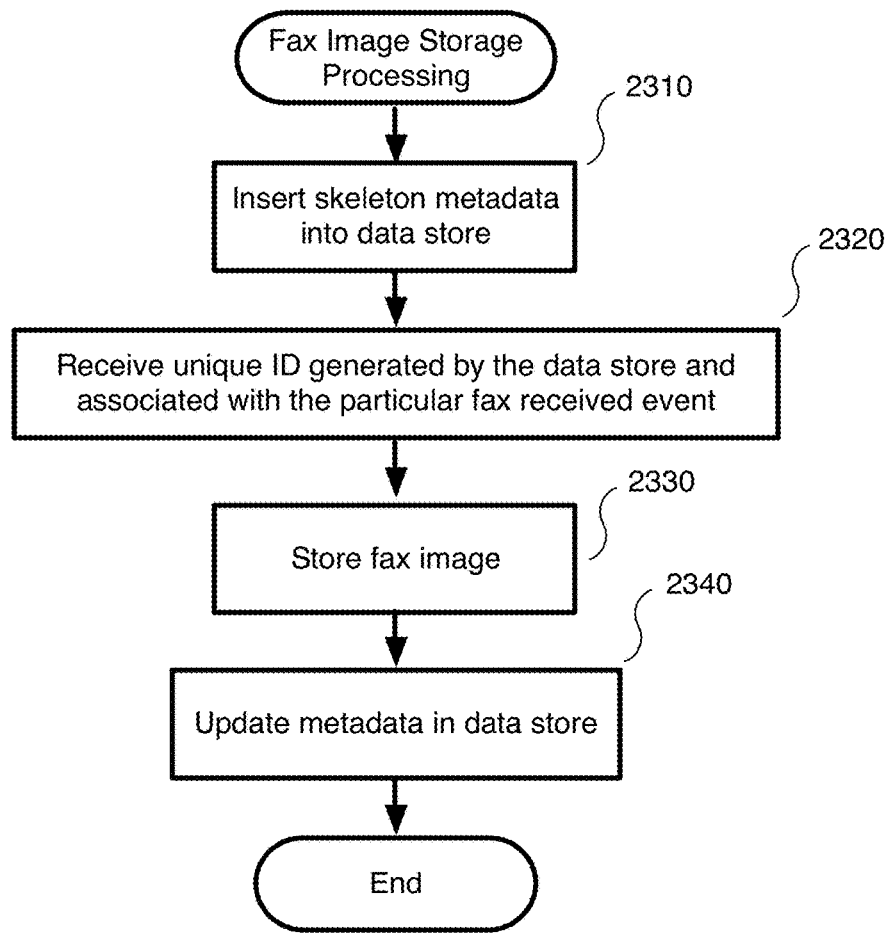
FIG. 23 is a flowchart illustrating fax image storage processing associated with an inbound fax in accordance with an embodiment of the present invention.

FIG. 23 is a flowchart illustrating fax image storage processing associated with an inbound fax in accordance with an embodiment of the present invention. In one embodiment, the steps described with reference to FIG. 23 are performed within blocks 2170 and 2180 of FIG. 21.

At block 2310, skeleton metadata is inserted into data store 265. According to one embodiment, the skeleton metadata is a subset of the metadata (e.g., excluding the associated directory path as it has yet to be determined) associated with the received fax and is inserted by the fax server. In one embodiment, responsive to the insertion data store 265 returns to the fax server a unique ID (e.g., a fax ID of 1 to n digits) to be associated with this particular fax received event. According to one embodiment, the fax ID is based on an auto-incremented unique primary key.

At block 2320, the unique ID generated by data store 265 is received by the fax server.

At block 2330, the fax image is stored. According to one embodiment, the fax image is stored within the file store 260 in a directory path that is based at least in part on the fax ID. In one embodiment, if an appropriate directory has not already been created, logic implemented within the fax server may create a directory on the file store 260 in accordance with the following convention, for example:
/export/Infaxes/ZZZZ/YYYY-MM-DD/VVVV
Where:
/export/Infaxes/ is fixed (this is where the NFS file store is mounted)
ZZZZ represents the ID associated in the database with the destination number (can be 1 to n digits long)
YY-MM-DD represents the current year/month/day
VVVV represents the unique ID associated in the database with this particular fax received event (can be 1 to n digits long)

At block 2340, metadata regarding the received fax is updated, for example, to include the (now known) directory path. According to one embodiment, the metadata includes:
1. A system-established unique identifier for this received fax
2. A numeric identifier corresponding to the destination number on which the fax was received
3. A system-established unique identifier for the file that contains the image of the fax (e.g., the PDF or TIFF image)
4. The date and time the fax was received
5. The data and time at which the call resulting in the received fax began
6. The caller ID or "source" or "source address" of the call
7. The number of pages in the image
8. The subscriber (not the user) for whom the fax is addressed
Additional metadata (in other related tables by the corresponding numeric identifiers) may include:
For #2 above:
   The phone number or destination address associated with the destination that the fax was received on, which subscriber that phone number belongs to.
For #3 above
   A physical storage location associated with the file id.
   Either of a destination or a logical folder (user created) in which the file currently resides.
   A system generated unique file name for the file, which may be used when the user downloads it. The user can also rename the file either when it is residing in the destination number or when it is residing in a folder. An example system-generated name would be along the lines of fax012345.pdf.

Figure 24:
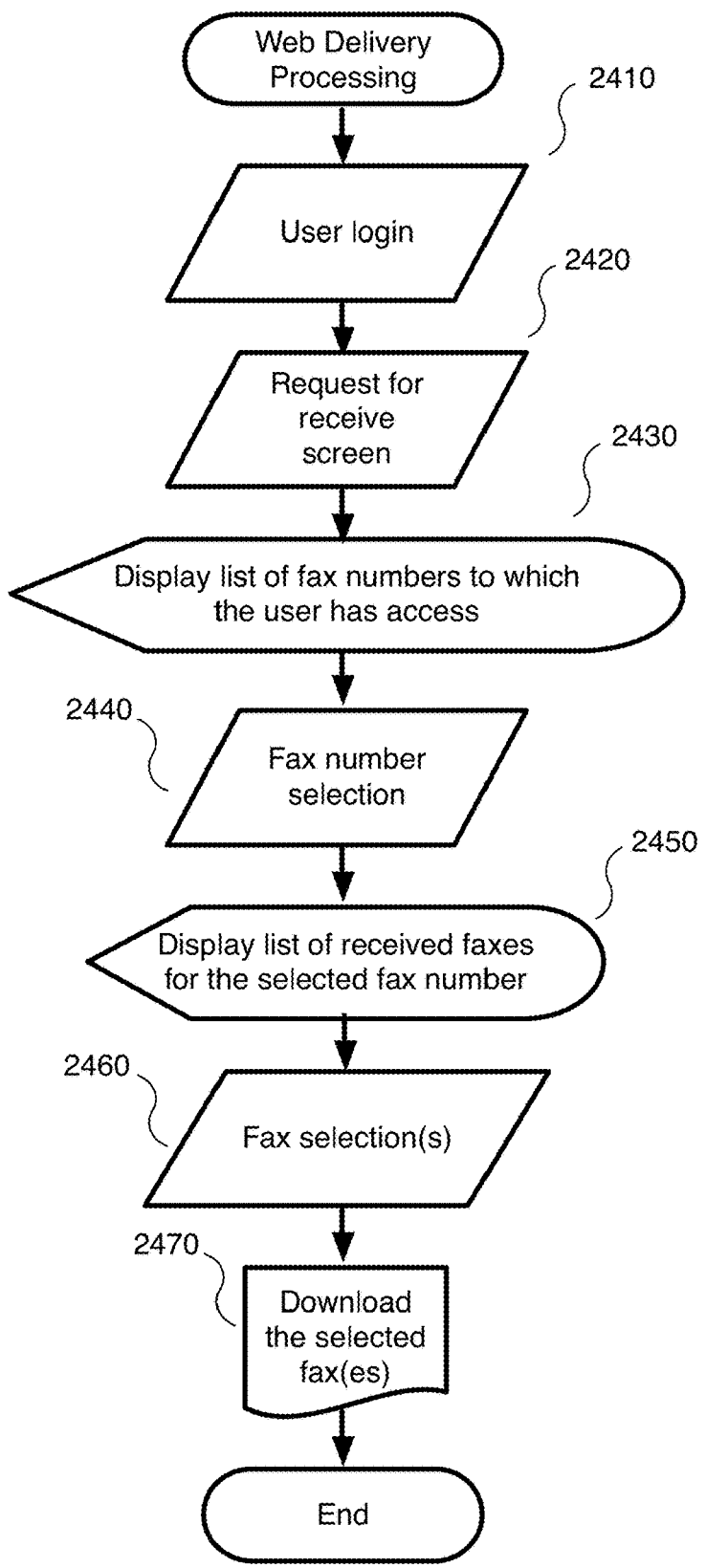
FIG. 24 is a flowchart illustrating web delivery processing associated with an inbound fax in accordance with an embodiment of the present invention.

FIG. 24 is a flowchart illustrating web delivery processing associated with an inbound fax in accordance with an embodiment of the present invention. In one embodiment, the steps described with reference to FIG. 24 are performed within block 2175 of FIG. 21. For simplicity, only a subset of interactions with the web site are depicted in FIG. 24—those relating to retrieval of a received fax.

At block 2410, a customer logs in via a web site, e.g., web site 245, associated with the Internet fax system. According to one embodiment, each user associated with a subscriber is assigned a user name and password.

Assuming the user is logging into the web site to view and/or retrieve received faxes, at block 2420, a request for the receive page is received from the user.

Concurrently with displaying of the receive page, at block 2430, a list of fax numbers to which the user has access is displayed (which might be a subset of all fax numbers associated with the subscriber or even none).

At block 2440, the user selects a fax number from the list of fax numbers and the fax number selection is received by a web server associated with the Internet fax system.

At block 2450, responsive to the fax number selection, a list of received faxes for the selected fax number is displayed. Depending upon the particular implementation, received faxes may be selectively displayed in ascending or descending order according to the time and date received. Received faxes may also be sorted based on the source address and/or based on whether the received fax has already been viewed or downloaded.

At block 2460, the user selects a fax from the list of received faxes and the fax selection is received by the web server.

At block 2470, the selected fax is downloaded to the client system being used by the user. Various other interactions relating to administrative settings and receiving, sending and/or organizing faxes may be supported by the web site interface. For example, as described above, web site 245 may support the renaming of faxes and the creation and use of logical folders to organize sent and/or received faxes.

Figure 25:
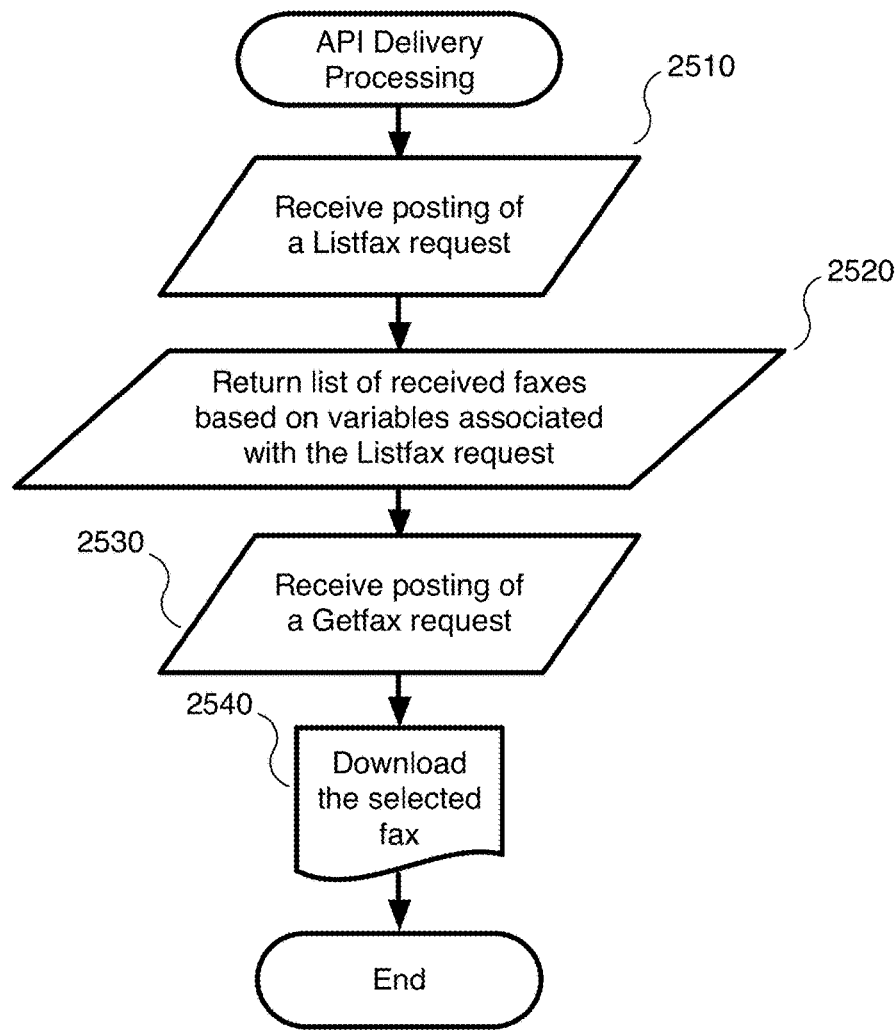
FIG. 25 is a flowchart illustrating API delivery processing associated with inbound faxes in accordance with an embodiment of the present invention.

FIG. 25 is a flowchart illustrating API delivery processing associated with inbound faxes in accordance with an embodiment of the present invention. In one embodiment, the steps described with reference to FIG. 25 are performed within block 2185 of FIG. 21. For simplicity, only a subset of interactions with a web services interface, e.g., web services interface/API gateway 240, are depicted in FIG. 25—those relating to retrieval of a received fax.

At block 2510, a subscriber application posts a Listfax request to the Internet fax system web services interface, e.g., web services interface/API gateway 240 via HTTP or HTTPS. According to one embodiment, the Listfax request allows for programmatic listing of currently received faxes. For purposes of maintaining security consistent with access via the web site, the Listfax request may require, among other information, the company credential associated with the subscriber as assigned by the Internet fax system, a user name associated with the subscriber as assigned by the Internet fax system and the password associated with the user making the request. Various other POST variables include, but are not limited to, a begin variable, which allows the subscriber application to retrieve faxes received after the specified date/time.

Responsive to the Listfax request, at block 2520, a list of received faxes, including corresponding fax IDs, are returned to the subscriber application based on the variables associated with the Listfax request.

At block 2530, the subscriber application posts a Getfax request to the Internet fax system web services interface via HTTP or HTTPS. According to one embodiment, the Getfax request allows for programmatic downloading of a received fax. As above, for purposes of maintaining security consistent with access via the web site, the Getfax request may require, among other information, the company credential, a user name and the password associated with the user making the request. In one embodiment, the fax ID of the desired fax is a required POST variable.

At block 2540, the selected fax is downloaded to the subscriber application.

In the context of FIG. 21 it is assumed a fax server performs both conversion and customer notification processing. An alternative approach, which distributes conversion and customer notification processing between a fax server and a notification server, is now described with reference to FIG. 26 and FIG. 27. It is to be noted that a further alternative approach may shift both conversion and customer notification processing from the fax server to the notification server.

Figure 26:
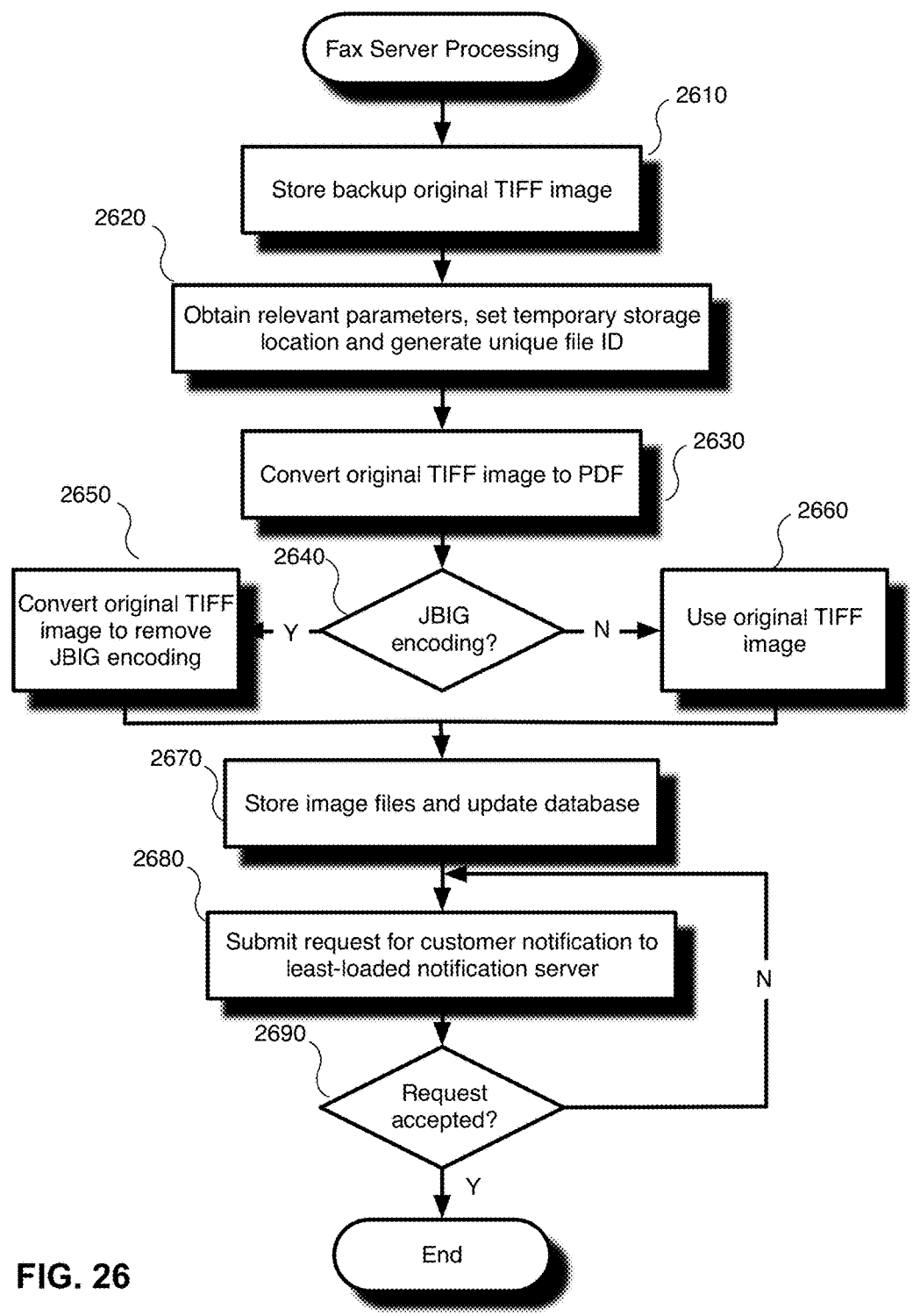
FIG. 26 is a flowchart illustrating conversion and notification/delivery processing associated with an inbound fax in accordance with another embodiment of the present invention.

FIG. 26 is a flowchart illustrating conversion and notification/delivery processing associated with an inbound fax in accordance with another embodiment of the present invention. In one embodiment, the steps described with reference to FIG. 26 are performed within block 1980 of FIG. 19 by a fax server selected at block 1940 of FIG. 19.

At block 2610, a fax call has been successfully received and a backup of the original TIFF image representing the received fax content is stored.

At block 2620, relevant parameters are obtained, a temporary storage location is setup and a unique file ID is generated. According to one embodiment, processing performed at block 2620 may generally follow the steps described above with referenced to FIG. 23.

At block 2630, the original TIFF image is converted to a PDF. Those skilled in the art will appreciate that the original TIFF image may also be converted to one or more additional file formats as desired. For example, the original TIFF image may also or alternatively be converted into one or more of a JPEG file, an ASCII text file, PCX files, a DCX file, a PostScript file and/or other supported file formats, including, but not limited to, bit map or raster graphics file formats.

At decision block 2640, it is determined whether the original TIFF image has been compressed using Joint Bi-level Image Experts Group (JBIG) encoding (e.g., JBIG1 or JBIG2). If so, then processing continues with block 2650; otherwise, processing branches to block 2660.

At block 2650, the original TIFF image, which has been determined to include JBIG encoding is converted to remove the JBIG encoding to accommodate client-side TIFF viewers, which typically do not support JBIG-encoded TIFFs. After block 2650, processing continues with block 2670.

At block 2660, the original TIFF image, which has been determined not to include JBIG encoding is used and no further processing of the original TIFF image is performed. After block 2660, processing continues with block 2670.

At block 2670, the original TIFF image or the converted original TIFF image and the one or more additional files created based on the original TIFF image (collectively, the fax files) are stored and the database is updated. According to one embodiment, the fax files and log file are stored in the paths generated at block 2620. The locations of the fax files and log file may also be stored to the database for use by the selected notification server to perform customer notification processing.

At block 2680, a request to perform customer notification is submitted to the least-loaded notification server. In one embodiment, the request from the fax server to the selected notification server may be made by way of placing a request on a request queue of the selected notification server that is maintained within data store 265. Alternatively, the fax server may communicate directly with the selected notification server.

According to one embodiment, load information for notification servers (e.g., notification servers 342*a-n*) is first obtained to make the determination regarding the least-loaded notification server. In one embodiment, the current load information for the notification servers is periodically calculated and reported by the individual notification servers and stored in a centralized database (e.g., data store 265) as described further below with reference to FIG. 15. In such an embodiment, the current load information is gathered by requesting the most recently reported load information from the centralized database. Various alternative methods for gathering current load information will be understood by those of ordinary skill in the art. For example, the fax server attempting to identify the least loaded notification server may poll the notification servers directly for their current load information at the time when such information is needed.

At decision block 2690, a determination is made regarding whether the selected notification server has accepted the request. As above, this communication between the fax server and the selected notification server may be direct or indirect via data store 265. If the request is accepted by the selected notification server, then fax server processing is complete; otherwise, processing loops back to block 2680 for selection of a least-loaded notification server from a candidate set of notification servers excluding the previously selected notification server. This process continues until a notification server has been selected that accepts the request or until a configurable or predetermined number of tries has been made.

Figure 27:
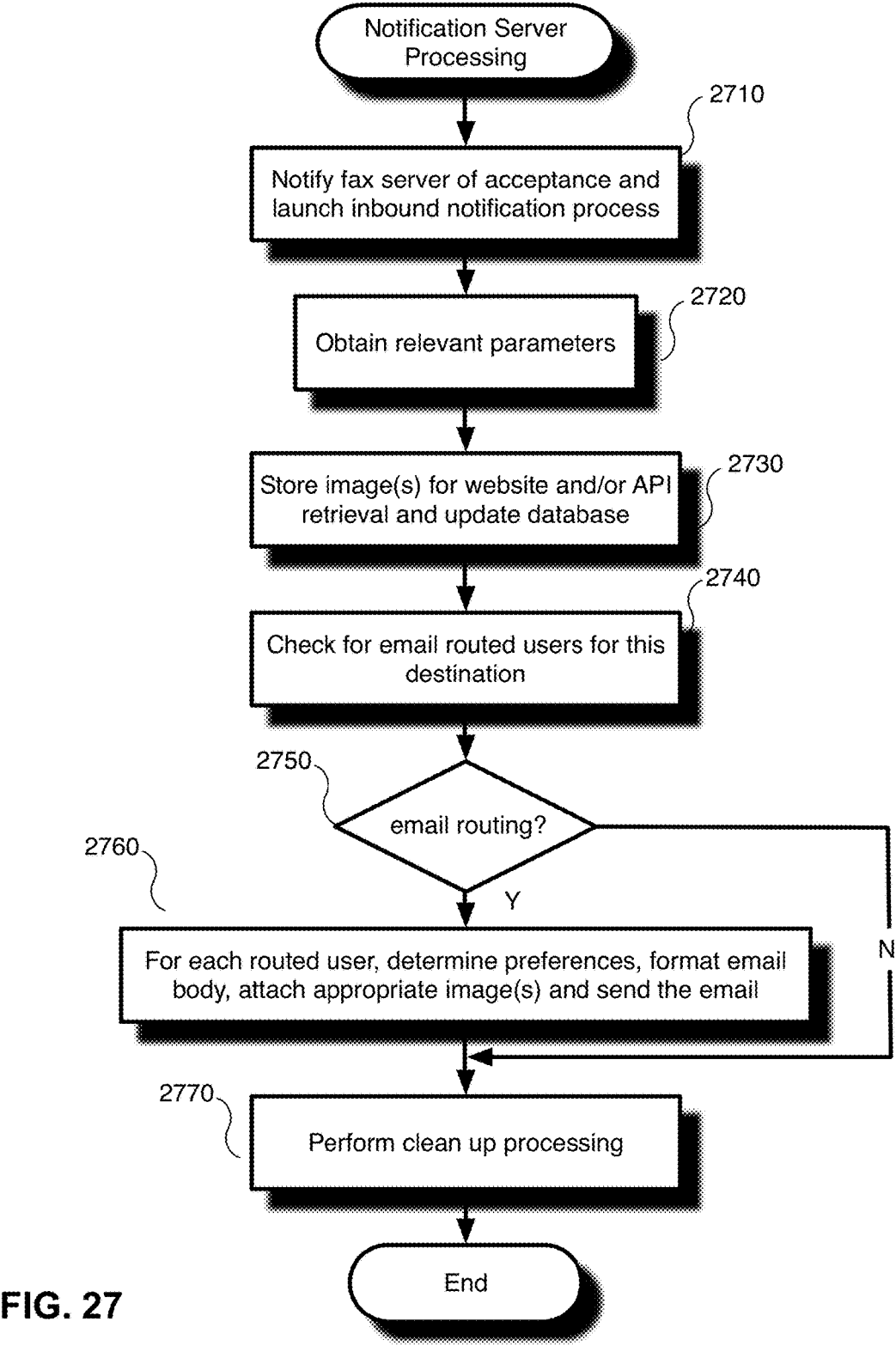
FIG. 27 is a flowchart illustrating notification server inbound fax processing in accordance with an embodiment of the present invention.

FIG. 27 is a flowchart illustrating notification server inbound fax processing in accordance with an embodiment of the present invention. Prior to block 2710, it is assumed that a fax server has issued a processing request to a notification server and the notification server has received the processing request. At block 2710, the notification server notifies the requesting fax server of its acceptance of the processing request and launches an inbound fax notification process. If communications between the fax server and notification server are by way of the database, the acceptance may be communicated to the fax server by updating the processing request to mark it as accepted. Alternatively, separate message queues may be maintained for each fax server within the centralized database and the notification server may place an accept message on the message queue of the requesting fax server. Further still, the notification server may run a web server or other network-accessible program/daemon with which the fax server communicates.

At block 2720, the notification server obtains relevant parameters/files/information to perform notification processing. In one embodiment, this includes gathering temporary fax files (e.g., TIFF, PDF, etc.), the logfile, source and destination of the fax from the database, pulling the fax call start time from the logfile and obtaining the subscriber's (organization's) preferred fax delivery format(s).

At block 2730, the appropriate fax files are stored for website and/or API retrieval based on the preferred fax delivery format(s) identified in block 2720. At this point, a fax received record may also be added to the database.

At block 2740, a check is made for the existence of email-routed users for the destination of the fax.

At decision block 2750, it is determined if any users are to receive this fax by email. If so, then processing continues with block 2760; otherwise, processing branches to block 2770.

At block 2760, for each email-routed user, email delivery preferences are determined, the email body is formatted, appropriate fax files are attached and the email is sent. According to one embodiment and as described above, email delivery preferences include, but are not limited to, delivery of an email notification with an embedded link from which the fax can be retrieved or delivery of the fax as an email attachment (with or without password protection or PGP encryption).

At block 2770, clean up processing is performed. According to one embodiment, this includes removing the temporary logfile and fax file copies and removing the processing request issued by the fax server from the database. At this point, notification server processing is complete for the processing request at issue.

Figure 28:
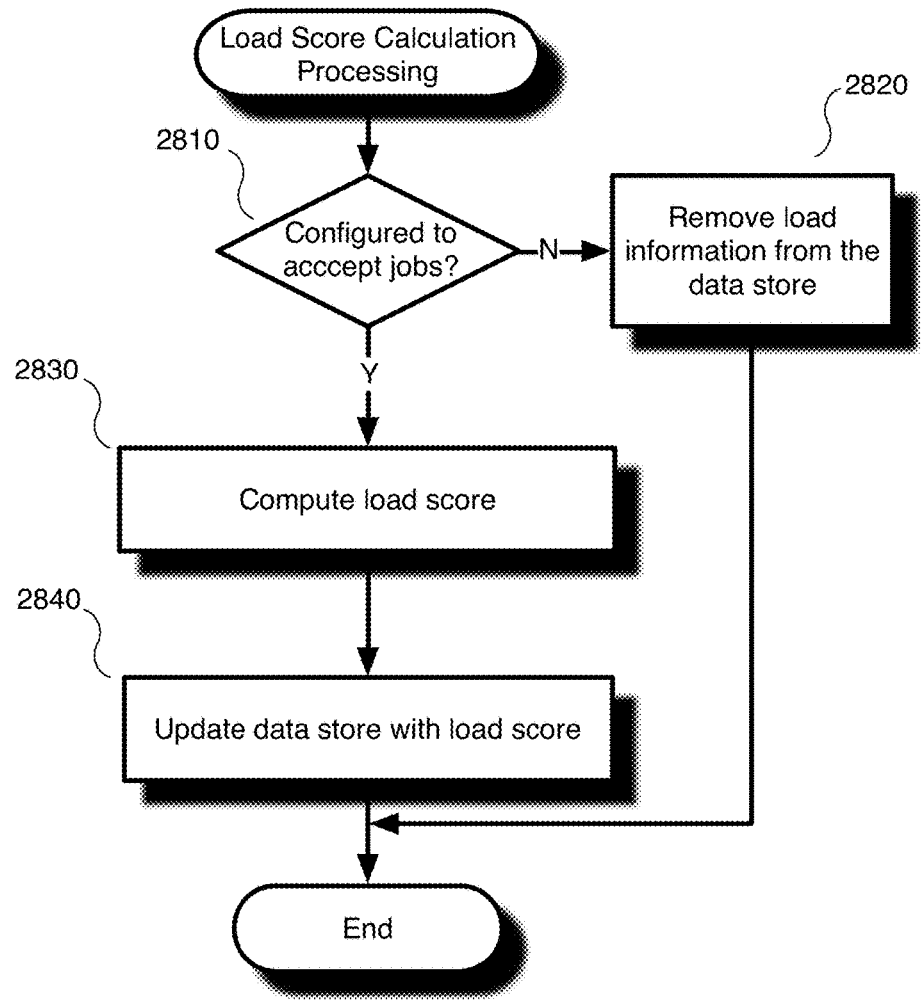
FIG. 28 is a flowchart illustrating load score calculation processing associated with inbound fax processing in accordance with an embodiment of the present invention.

FIG. 28 is a flowchart illustrating load score calculation processing in accordance with an embodiment of the present invention. For simplicity and sake of brevity, FIG. 28 illustrates one cycle of load score calculation processing performed by a single notification server in connection with load score calculation processing. It is to be understood that all notification servers may be concurrently performing such processing and that such processing may be periodically triggered as a result of expiration of a timer (e.g., every 5 to 10 seconds) or responsive to some other event in the Internet fax system (e.g., a request for load information from a fax server, completion of a notification process regarding a received fax or the like).

At decision block 2810, the notification server determines whether it is configured to accept processing requests from fax servers. This determination may be performed with reference to configuration information set by an administrator of the Internet fax system, for example. According to one embodiment, a notification server may be configured not to select jobs by creating a flag file (e.g., /tmp/oor) on the notification server to communicate to the notification server that it is out of rotation. If the notification server is currently configured to accept jobs, then the load score calculation processing continues with block 2830. If the notification server is not currently configured to accept jobs, then the load score calculation processing branches to block 2820.

At block 2820, this notification server is removed from consideration for processing requests by fax servers. In one embodiment, any existing load information for this notification server is removed from data store 265 to preclude selection of this notification server by a fax server for performing conversion and/or notification processing. Alternatively, the load score for this notification server may be set to a value, such as the highest load score, to indicate this notification server's unavailability to handle processing requests. Load score calculation processing is then terminated until the next load score calculation processing cycle is triggered.

At block 2830, the load score for this imaging system is calculated. In one embodiment, the load score is based on the number of jobs currently in-process on the imaging system, the current CPU load and the amount of memory currently in use. According to one embodiment, the load score is calculated in accordance with the following equation:

$$A \times (\text{number of currently active inbound notification processes}) + B \times (\text{CPU load}) + C \times (\text{megabytes of memory used})$$

where,

A is a constant value between 0.5 and 5 (e.g., 1).
B is a constant value between 5 and 20 (e.g., 10).
C is a constant value between 0 and 1 (e.g., 0.01).

Those skilled in the art will appreciate various alternative calculations can be used. For example, the constants A, B and/or C can be adjusted as appropriate to suit a particular implementation or imaging system configuration.

At block 2840, the notification server updates data store 265 with the newly calculated load score. Notably, while the present example is described assuming each notification server gathers load information (e.g., active inbound notification processes, CPU load and memory used), in alternative embodiments, a process external to the notification servers may be provided with access to load information and may perform the actual load score calculation processing and/or reporting to data store 265 on behalf of the notification servers.

Figure 29:
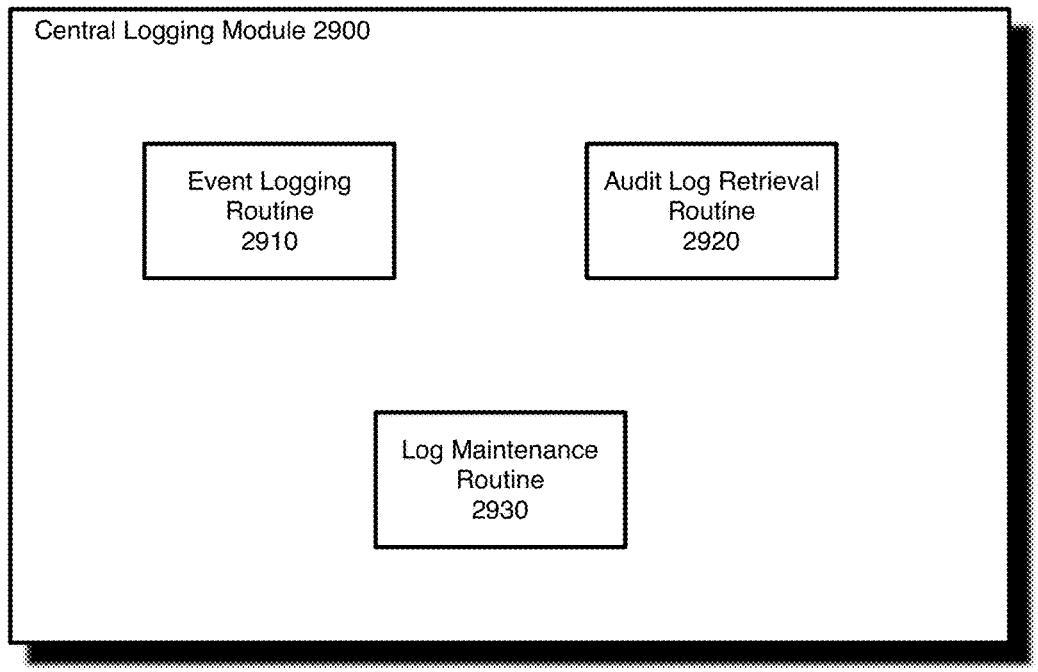
FIG. 29 is a block diagram illustrating various routines of a central logging module in accordance with an embodiment of the present invention.

FIG. 29 is a block diagram illustrating various routines of a central logging module 2900 in accordance with an embodiment of the present invention. In the context of the present example, central logging module 2900 is represented as three separate routines, an event logging routine 2910, an audit log retrieval routine 2920 and a log maintenance routine 2930. Collectively, these routines facilitate supplying of a complete and automated auditing system that logs all activities via the API, website or email interfaces. These routines may also maintain the logs in terms of retention time frames and allow for presentation of the logs in a user-friendly format.

According to one embodiment, event logging routine 2910 is responsible for writing event audit logs in a standardized format on behalf of the components of Internet fax system 200. In this manner, all the components of Internet fax system 200 that log auditable events may do so using the same centralized routine by feeding it their events to be logged. Events relating to the API, an example of which is documented in the attached Appendices, and web events are logged by web servers, system events are mainly focused on fax servers and image processing servers (e.g., back-end non-user-interactive systems), and email events are logged by email servers as they receive requests to be faxed. Further details regarding the functionality of event logging routine are described below with reference to FIG. 30.

In one embodiment, audit log retrieval routine 2920 is responsible for providing access to the event logs via an API interface, which is referred to as the "auditlog" API operation in the attached Appendices. By way of such an API operation, Internet fax system 200 allows for pulling of audit log entries meeting optionally specified criteria to allow for troubleshooting and/or security review purposes. In one embodiment the API interface that invokes audit log retrieval routine 2920 is one that provides the caller with search functionality in terms of a time range, date range, user range and/or event type. Alternatively or in addition to being called through the API interface, audit log retrieval module 2920 could be called through an interactive user interface (such as website 245) to provide on-demand reporting, using the same, fewer or more search parameters. Further details regarding the functionality of audit log retrieval logging routine are described below with reference to FIG. 31.

In one embodiment, log maintenance routine 2930 is responsible for both expiring old logs and archiving logs to an appropriate format for storing tabular data (e.g., a comma-separated values (CSV) format or another plain text format using an alternative delimiter to separate values) on a periodic basis (e.g., daily, nightly, weekly, etc.) and making the information available within web gateway 230 for user download in the form of a report. Those skilled in the art will appreciate CSV is a non-limiting example of a format in which archived log events/records may be stored and/or presented. Other non-limiting examples include HTML, eXtensible Markup Language (XML), JavaScript Object Notation (JSON) data, a Crystal Report and a PDF. Depending upon the particular implementation, log maintenance routine 2930 may run as a daemon on an administrative server of Internet fax system 200. Log maintenance routine could also be run as a scheduled taskthrough a system's task-scheduling architecture, on-demand by an operator or via a user-triggered event (e.g., a request via website 245 to "refresh logs" or "expire logs"). Further details regarding the functionality of audit log retrieval logging routine are described below with reference to FIG. 32.

Figure 30:
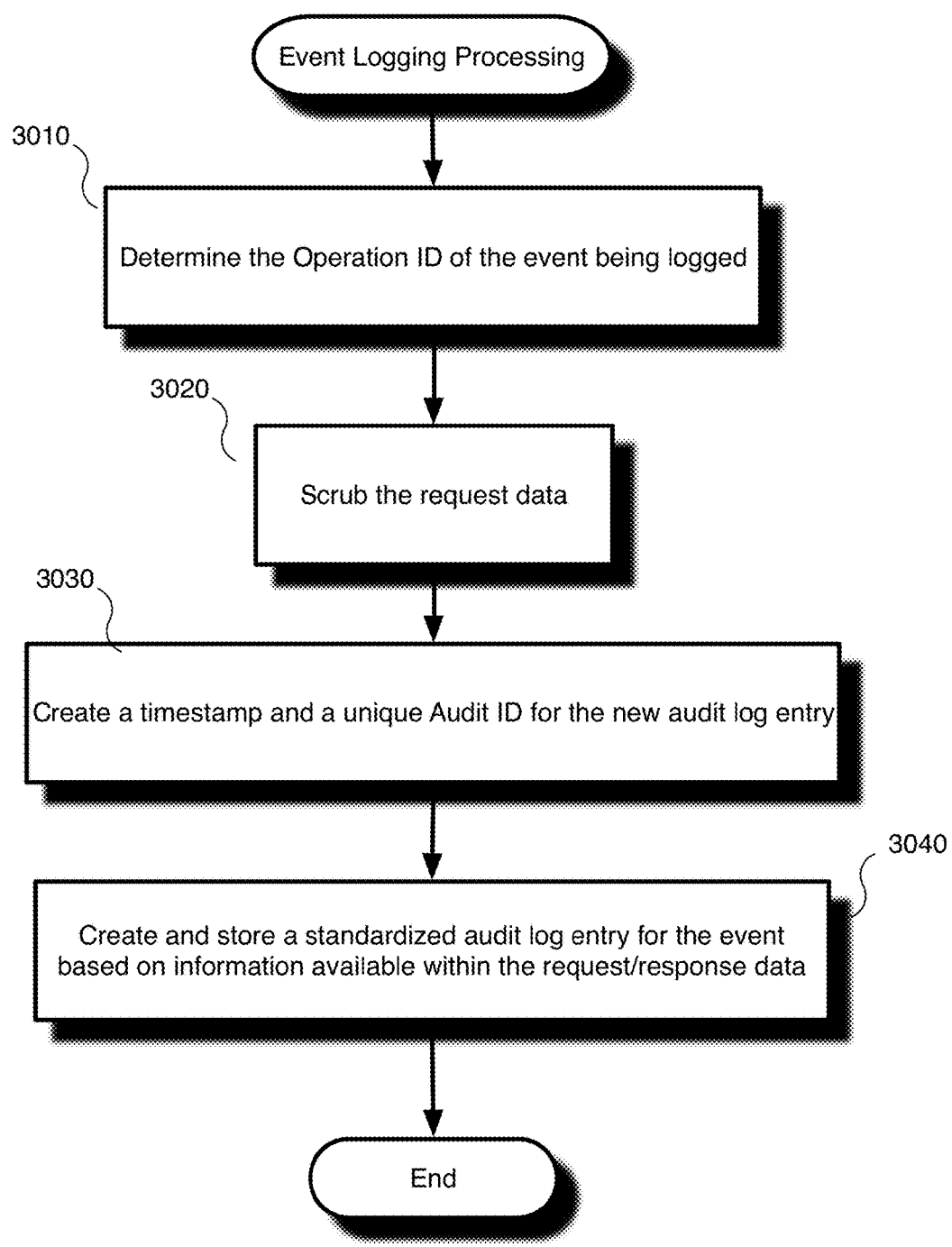
FIG. 30 is a flowchart illustrating event logging processing in accordance with an embodiment of the present invention.

FIG. 30 is a flowchart illustrating event logging processing in accordance with an embodiment of the present invention. In the context of the present example, it is assumed a component (e.g., a web server, an email servers, a fax server, an image processing server or a notification server) responsible for logging auditable events within Internet fax system 200 has invoked functionality of central logging module 255, for example, by loading and executing code from file store 260 representing event logging routine 2910. While the functionality of event logging routine 2910 may be different depending upon the interface (e.g., website interface, email interface, system interface and API interface) from which the auditable event is received, FIG. 30 attempts to represent the generic case for all auditable events.

At block 3010, event logging processing begins by determining the operation ID of the event being logged. In one embodiment, each operation within Internet fax system 200 may be represented by an integer value. Rather than storing a textual representation of an operation (e.g., "sendfax" passed as a parameter by the caller), in the present embodiment, the integer value (e.g., 1) corresponding to the operation is looked up and stored within the audit log entry. One advantage of this approach is that it allows for events to be redefined or renamed over time and aids in user presentation (as far as consistency if such a change is made).

At block 3020, request data supplied by the caller is scrubbed so that passwords and other security information are not logged. As such, even if the calling side makes a mistake and inserts a password or other security information into the request data passed to the event logging process, such sensitive information will be removed from the request data before being written into an audit log entry and stored.

At block 3030, a timestamp and unique audit ID are created for the new audit log entry. Creating both a timestamp and a unique audit ID allows for distinguishing among audit log entries that may have been created at the same time (e.g., within the same second, minute or whatever level of granularity may be provided by the timestamp being used). The timestamp can be obtained based on the system clock of the server running event logging routine 2910, for example. The process of generating unique audit IDs may involve storing some state that assures an ID is never repeated. In the trivial case, a simple counter may be used and the last value of the counter used as an audit ID may be persisted and incremented to produce the next audit ID. For example, the relational database management system may be used to generate audit IDs by way of an auto-increment column in the database table in which the audit log entries are stored. Those skilled in the art will appreciate various other approaches, both stateful and stateless are possible. For example, a random number generator that generates a number in the range of 0 and N can be used, with N so large that the probability of collisions for all practical purposes is irrelevant.

At block 3040, a standardized audit log entry is created and stored for the event at issue. In one embodiment, event logging processing can offload the various reporting entities by providing these reporting entities with a simple interface and making use of information (e.g., website session data, email address and job identifier (ID)) supplied by these reporting entities (e.g., in the form of request details and/or response details and/or global data associated with an API call) to retrieve additional information (e.g., user ID, organization ID, web session ID and Internet Protocol (IP) address) to fill in the necessary details of the standardized audit log entry format. According to one embodiment and for purposes of providing concrete examples below, the following represents a potential standardized audit log entry format for the exemplary set of 99 auditable operations described in the attached Appendices:

Audit ID (the unique numeric value of this audit log entry/record)
Timestamp (Date/Time of the event YYYY-MM-DD HH:MM:SS format)
User ID (the login/username associated with the operation/event at issue)
Organization ID (the organization ID associated with the operation/event)

IP Address (the IP address associated with the operation/event)
Interface (the interface associated with the operation/event—one of "web," "email," "api" or "system")
Operation Type (the numeric ID of the operation at issue or event that occurred)
Operation Result (a value indicating success or failure, indicating whether this is a log of a successful or a failed action)
Request Detail (details specific to the operation/event)
Response Detail (details about how Internet fax system 200 responded to the request)

According to one embodiment, for website interface auditable events, event logging processing performed in block 3040 further includes determining the user, the organization and web session ID from the calling website session's data. Additionally, the IP address from which the event originated (e.g., the end-user's IP address) may be determined. In this manner, the caller is relieved of the need to retrieve such information. For purposes of illustration and without limitations, the following represents a pseudo-code example of the results of calling event logging routine 2910 by a website caller:

Website Caller (changing a password for a user):
interface="web"
opdesc="changepass"
opresult="1"
opreqdetail="User→(username)"
oprespdetail="Password changed"
event_audit(interface, opdesc, opresult, opreqdetail, oprespdetail)

Audit logging module for the above generates and writes out:
Audit ID (unique, generated)
Organization ID (the organization ID of the calling user—i.e., the user changing another user's password—looked up from session data by event logging routine 2910)
User ID—(the user ID of the calling user—i.e., the user changing another user's password—looked up from session data by event logging routine 2910)
IP Address—(the IP address that the web session is logged in from, looked up from the web environment by event logging routine 2910)
Interface—(as passed by the calling function)
Web Session ID—(the session ID associated with this event, gathered from session data by event logging module 2910)
Operation type—(numeric ID mapped from the 'opdesc' passed by the caller)
Operation Result—(opresp as passed by the caller, '1' means success, '2' means failure audit)
Request Detail—(opreqdetail as passed by the caller)
Response Detail—(oprespdetail as passed by the caller)
Timestamp—(generated by the logging module)

According to one embodiment, for API interface auditable events, event logging processing performed in block 3040 further includes determining the user and organization from the API call's global data. Also, the request detail may be generated on behalf of the caller by unpacking POST variables in the original API call and thereby allowing the API to be free from supplying request data. For purposes of illustration and without limitations, the following represents a pseudo-code example of the results of calling event logging routine 2910 by an API caller:

API Caller:
interface="api"
opdesc="sendfax"
opresult="1"
oprespdetail="JOBID: 12345"
event_audit(interface, opdesc, opresult, oprespdetail)

Audit logging module for the above generates and writes out:
Audit ID (unique, generated)
Organization ID (the organization ID of the calling user, generated/looked-up by event logging routine 2910)
User ID (the user ID of the calling user, generated/looked-up by event logging routine 2910)
IP Address (the IP address that the API was called from)
Interface (as passed by the calling function)
Operation type (numeric ID mapped from the 'opdesc' passed by the caller)
Operation Result (opresp as passed by the caller, '1' means success, '2' means failure audit)
Request Detail (detailed POST data passed by the caller to the API, as generated by event logging routine 2910, scrubbing out passwords and other security information—e.g.: exact contents of files to be faxed)
Response Detail (as passed by the caller)
Timestamp (generated by the logging module)

According to one embodiment, for email interface auditable events, event logging processing performed in block 3040 further includes determining the user and organization based on the email address supplied (as opposed to needing to be called with these additional parameters). For purposes of illustration and without limitations, the following represents a pseudo-code example of the results of calling event logging routine 2910 by an email caller:

Email Caller:
interface="email"
opdesc="emailtofax"
opresult="1"
opreqdetail="test@example.com"
oprespdetail="To→8005551212~!!~File 1→Test.doc~!!~Asyncjob→12345"
event_audit(interface, opdesc, opresult, opreqdetail, oprespdetail)

Audit logging module for the above generates and writes out:
Audit ID (unique, generated)
Organization ID (the organization ID of the calling user, determined by event logging routine 2910 from email address passed in opreqdetail)
User ID (the user ID of the calling user, determined by event logging routine 2910 the same as Organization ID)
IP Address (always 127.0.0.1 for email)
Interface (as passed by the calling function)
Operation type (numeric ID mapped from the 'opdesc' passed by the caller)
Operation Result (opresp as passed by the caller, '1' means success, '2' means failure audit)
Request Detail (email address of sender)
Response Detail (as passed by the caller)
Timestamp (generated by event logging routine 2910)

According to one embodiment, for system auditable events, event logging processing performed in block 3040 further includes determining the user and organization associated with the source of the event in the event life cycle/milestone that lead to the system event being generated. For example, if a fax is received, it is received for a particular fax number, and the event logging routine 2910 would be responsible for looking up the user and organization associated with that fax number in order to tie the event of receiving a fax to the customer whose fax is being received. Another example, related to sending a fax, is that a request to send a fax has a unique Job ID within the Internet Fax System 200 and this ID would be used by the event logging module 2910 to look up the user and organization associated with the original request to send the fax when logging events related to converting the file(s) to be sent into a fax-able format, queuing the resulting fax job and completing the process of sending the fax. For purposes of illustration and without limitations, the following represents a pseudo-code example of the results of calling event logging for a fax that is received:

Fax Received Caller:
interface="system"
opdesc="faxreceived"
opresult="1"
opreqdetail="From→(source)~!!~To→(destination)
~!!~Pages→(page
count)"
oprespdetail="Fax received"
event_audit (interface, opdesc, opresult, opreqdetail,
oprespdetail)
Audit logging module for the above generates and writes out:
Audit ID (unique, generated)
Organization ID (the organization ID of the calling user looked up from the destination supplied in the opreqdetail by event logging routine 2910)
User ID—(the user ID of the calling user looked up from the destination supplied in the opreqdetail by event logging routine 2910)
IP Address—(fixed at '127.0.0.1' as this is an internal system event)
Interface—(as passed by the calling function)
Operation Type—(numeric ID mapped from the 'opdesc' passed by the caller)
Operation Result—(opresp as passed by the caller, '1' means success, '2' means failure audit)
Request Detail—(opreqdetail as passed by the caller)
Response Detail—(oprespdetail as passed by the caller)
Timestamp—(generated by the logging module)

Figure 31:
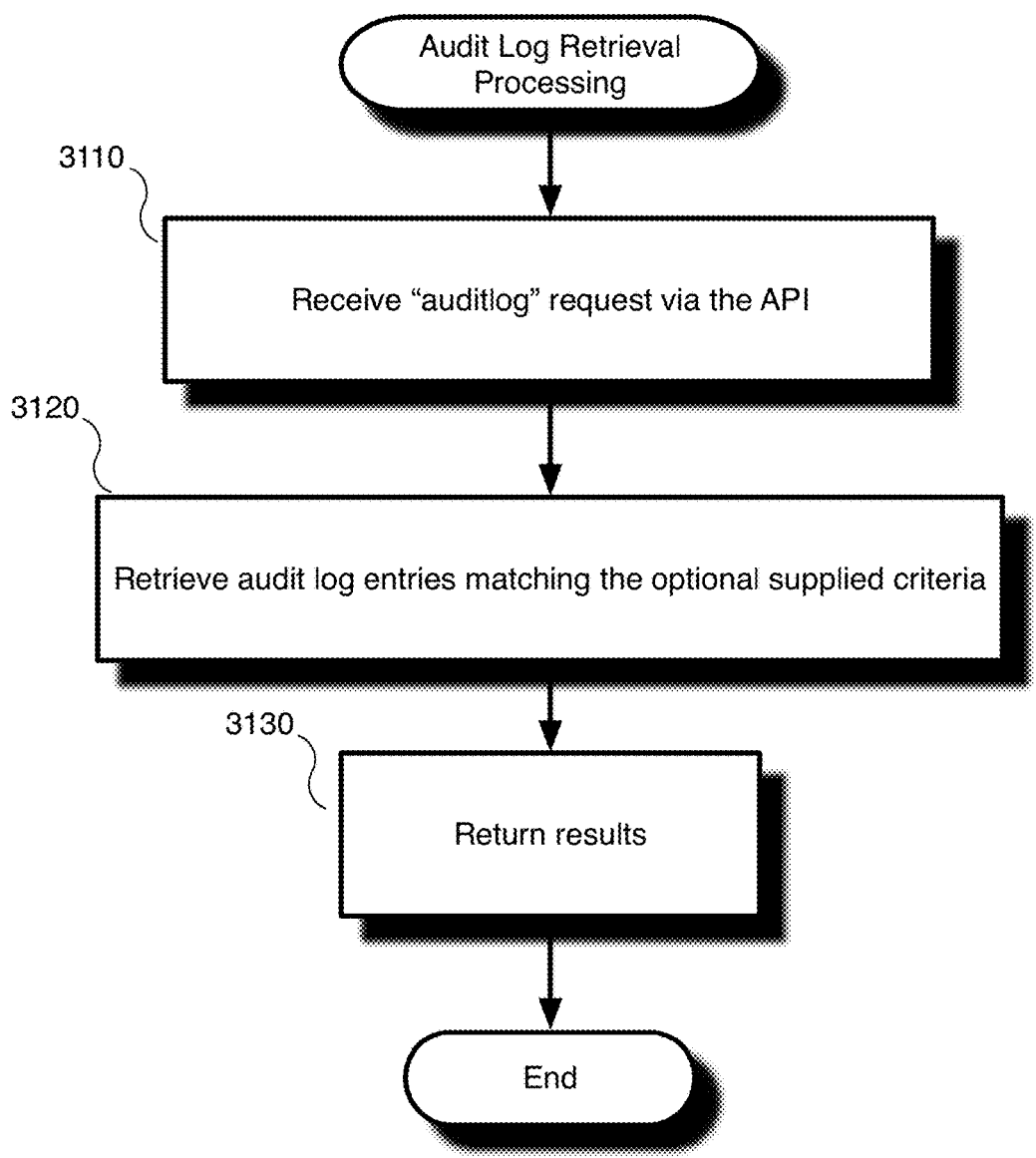
FIG. 31 is a flowchart illustrating audit log retrieval processing in accordance with an embodiment of the present invention.

FIG. 31 is a flowchart illustrating audit log retrieval processing in accordance with an embodiment of the present invention. In the context of the present example, the API implemented by Internet fax system 200 within web services interface/API gateway 240, for example, is assumed to be a representational state transfer (REST) style or RESTful API. HTTPS POST operations are sent to predefined URLs and include both required and optional POST variables. Those skilled in the art will appreciate various other types of APIs are equally applicable, including Simple Object Access Protocol (SOAP), XML-Remote Procedure Call (RPC) and JSON-RPC. Further details regarding an exemplary RESTful API are provided in the attached Appendices.

At block 3110, an "auditlog" request is received from a subscriber of Internet fax system 200 via the API, which invokes audit log retrieval routine 2920. Those skilled in the art will appreciate the name of the API call is unimportant, but is used as part of this example to correspond with the "auditlog" operation discussed in the attached Appendices. In one embodiment, the required POST variables associated with the auditlog operation include a username, a company credential, the corresponding password and the name of the operation, which is hardcoded to "auditlog" (without the quotes).

Depending upon the particular implementation, one or more optional POST variables may also be provided including a begin time, an end time, an audit ID, an operation, a user and an operation status indicator. The begin time and end time may be specified in YYYY-MM-DD HH:MM:SS format. When the begin time is specified, only audit log entries having a timestamp after the begin time will be returned by audit log retrieval routine 2920. When the end time is specified, only audit log entries having a timestamp before the end time will be returned. The audit ID variable can be used to request audit logs having an audit ID greater than the value of the audit ID variable. This is useful when audit IDs are assigned sequentially increasing values as the caller can request to see only audit log entries that are newer than that which the subscriber has already seen. The operation variable can be used to request audit log entries be returned for a specific auditable operation (e.g., "sendfax"). Similarly, user variable may specify a username for which audit log entries are to be returned. Finally, the operation status indicator variable may specify that audit log entries of only successful or failed operations be returned.

At block 3120, assuming the user is authorized, the supplied company credential and password are correct, audit log retrieval routine 2920 attempts to retrieve audit log entries matching the optional supplied criteria from the appropriate internal database (e.g., data store 265 and/or file store 260).

At block 3120, assuming audit log retrieval routine 2920 was able to successfully retrieve the requested audit log entries, they are returned to the caller in the form of new-line separated records, for example. Other non-limiting examples of the form in which the requested audit log entries may be returned include structured data formats, such as XML or JSON. In one embodiment, failure of the auditlog operation may be a result of one of three issues, a database connection failure, an incorrect login or a bad POST. When a failure occurs, a corresponding error code, a description of the error and/or the POST contents can be returned to the caller for debugging purposes.

As described below with reference to FIG. 32, some portion of audit log entries (e.g., those yet to be archived) may reside within data store 265, while the archived audit log entries may be stored in CSV format within file store 260. In such an implementation, requests that involve audit log entries that have yet to be archived may require application of the optional supplied criteria to the audit log entries in both data store 265 and file store 260.

At block 3130, a response is returned to the caller either providing one or more audit log entries or identifying a failure indication.

Figure 32:
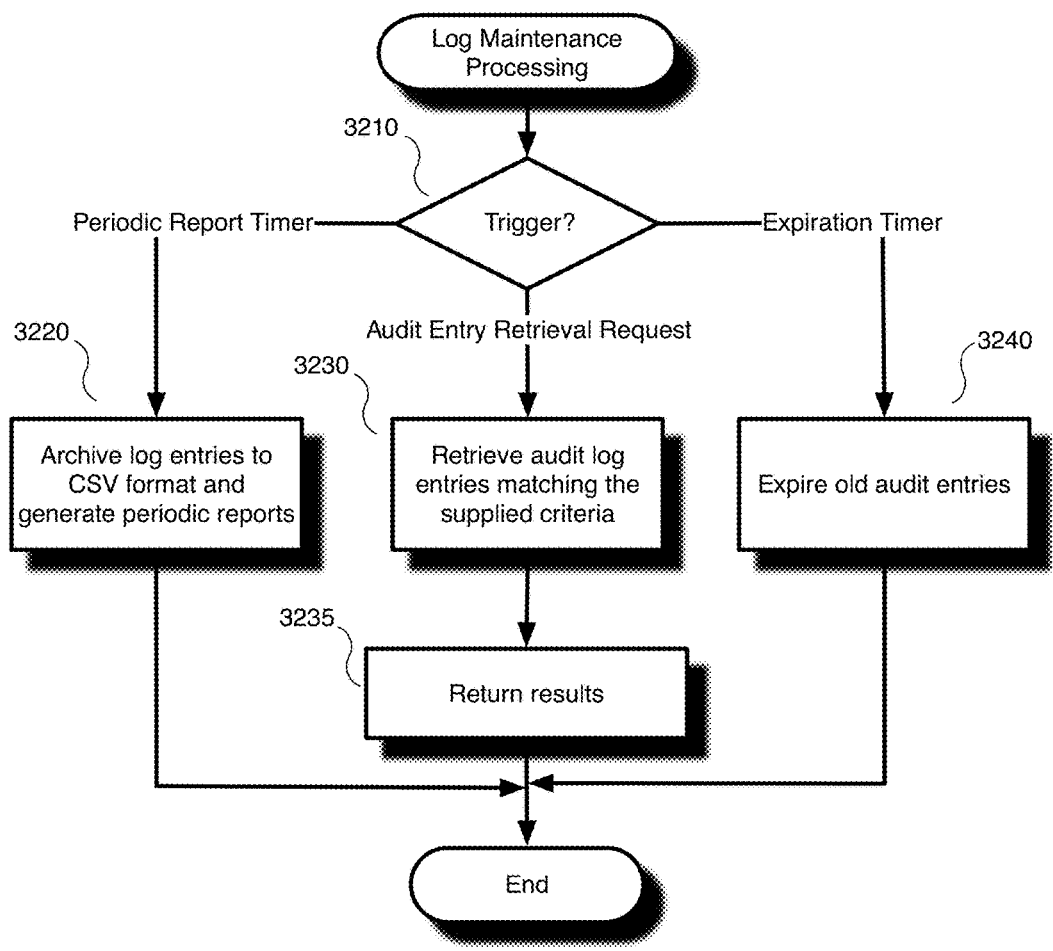
FIG. 32 is a flowchart illustrating log maintenance processing in accordance with an embodiment of the present invention.

FIG. 32 is a flowchart illustrating log maintenance processing in accordance with an embodiment of the present invention. In the context of the present example, it is assumed, audit log entries created during a particular timeframe, e.g., between 12:01 AM and 12:00 AM or another twenty-four hour timeframe, are temporarily stored within data store 265 and periodically archived in CSV format within file store 260. It is also assumed only a predetermined number of days (e.g., seven days) of audit log entries are maintained by Internet fax system 200. Those skilled in the art will appreciate such timeframes are mere matters of design choice and may be modified without impacting the overall structure of log maintenance processing described herein.

At decision block 3210, upon activation of a log maintenance routine (e.g., log maintenance routine 2930), a determination is made regarding what triggered the activation. When it is determined that the triggering event was expiration of a periodic report timer, then processing continues with block 3220. When it is determined that the triggering event represents receipt of an audit entry retrieval request, then processing continues with block 3230. When it is determined that a timer relating to expiration of old audit log entries triggered the activation of the log maintenance routine, them processing continues with block 3240.

At block 3220, a periodic report timer has triggered activation of the log maintenance routine. In one embodiment, audit log entries are temporarily stored within data store 265 and on a periodic basis (e.g., daily) are removed from the temporary data store and archived in CSV format within file store 260. At the same time, audit log reports, including information regarding all auditable events during the time period at issue, can also be generated and made accessible to subscribers via a web interface (e.g., web gateway 230).

At block 3230, the log maintenance retrieval routine attempts to retrieve audit log entries matching any supplied criteria from the appropriate temporary data storage (e.g., data store 265).

At block 3235, a response is returned to the caller (e.g., audit log retrieval routine 2920) either providing one or more audit log entries or identifying a failure indication.

At block 3240, a periodic expiration timer has triggered activation of the log maintenance routine. In one embodiment, audit log entries are maintained by Internet fax system 200 for a limited amount of time (e.g., seven days). As such, on a periodic basis, log maintenance routine is periodically activated to remove old audit log entries from file store 260 that have a timestamp outside of the range of those to be retained.

FIG. 33 is an example of an audit log report 3300 that may be obtained via an audit log API call in accordance with an embodiment of the present invention. In the present example, audit log report 3330 represents a scenario in which, during the reporting period, the system received a fax and notifying the "ports" login via email. A user named "robert" subsequently, logged in to Internet fax system 200 via a website interface (e.g., web gateway 230), establishing a session number 5692909, renamed a received fax, moved the renamed fax to a folder and logged out. As such, audit log report 3300 includes six audit log entries 3371-3376 documenting the above scenario. In one embodiment, audit log report 3330 is returned to the caller in the form of new-line separated records, for example, and includes for each audit log entry (3371-3376) an audit ID 3305, time 3310, user 3315, IP address 3320, interface 3325, web session ID 3330, operation 3335, result 3340, job/fax ID 3345, request detail 3355 and response detail 3360.

Figure 34:
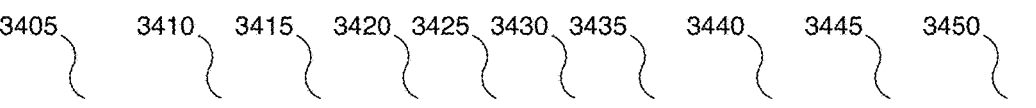
FIG. 34 is an example of an audit log presentation that may be viewed via a web interface in accordance with an embodiment of the present invention.

FIG. 34 is an example of an audit log presentation 3400 that may be viewed via a web interface in accordance with an embodiment of the present invention. In the present example, audit log presentation 3400 represents the same scenario described with reference to FIG. 33, but rather than retrieving the audit log entries via the API, in this case, the user is viewing audit log presentation 3400 via a web interface (e.g., web gateway 230). The information presented may be the same or a subset of that which is made available via audit log report 3300. In the current example, audit log presentation 3400 is displayed in tabular form and includes for each audit log entry an audit ID 3405, time 3410, user 3415, IP address 3420, interface 3425, web session ID 3430, operation 3435, result 3440 and job/fax ID 3450. In one embodiment, the user may request display of additional details (e.g., request detail associated with the operation and/or response detail associated with the operation) for a given audit log entry by selecting the corresponding arrow presented in column 3450.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
maintaining, by a central logging module associated with an Internet fax system, a chronological record of a sequence of events associated with a plurality of components of the Internet fax system in a form of an audit log, wherein the audit log stores a plurality of audit log entries for purposes of auditing security and compliance of the Internet fax system and wherein the plurality of components include a plurality of fax processing resources and an email server;
receiving an inbound fax call by an Internet fax system, including:
   receiving, at a telecommunications system of the Internet fax system, the inbound fax call, wherein the inbound fax call has associated therewith a source address, a destination address and a fax signal, wherein the destination address corresponds to a particular subscriber of the Internet fax system;
   switching, by the telecommunications system, the inbound fax call to a call mediation system of a plurality of call mediation systems within the Internet fax system;
   selecting, by the call mediation system, a fax processing resource of the plurality of fax processing resources to handle the inbound fax call; and
   switching, by the call mediation system, the inbound fax call to the selected fax processing resource;
translating, by the selected fax processing resource, the fax signal into a digital representation;
causing a first audit log entry of the plurality of audit log entries, separate and distinct from a record of the inbound fax call to be presented to the particular subscriber, to be created and stored within the audit log, by the selected fax processing resource, by providing the central logging module with information regarding the source address, the destination address, a number of pages of the digital representation and a result of said receiving an inbound fax call;
causing the digital representation to be delivered or otherwise made available to one or more users associated with the particular subscriber;
notifying, by the email server, the one or more users regarding receipt of an inbound fax; and
causing a second audit log entry of the plurality of audit log entries, separate and distinct from notification settings associated with the particular subscriber at a time of receipt of the inbound fax call, to be created and stored within the audit log, by the email server, by providing the central logging module with information regarding the one or more users and a result of said notifying.

2. The method of claim 1, wherein the central logging module comprises a daemon running within the Internet fax system.

3. The method of claim 1, wherein the central logging module comprises a remote cloud-based service available to the Internet fax system.

4. The method of claim 1, wherein said causing a first audit log entry of the plurality of audit log entries, separate and distinct from a record of the inbound fax call to be presented to the particular subscriber, to be created and stored within the audit log comprises:
  loading, by the selected fax processing resource, code representing an event logging routine of the central logging module, from a shared storage resource accessible to the plurality of fax processing resources and the email server; and
  executing, by the selected fax processing resource, the code.

5. The method of claim 4, further comprising responsive to receipt of the information regarding the source address, the destination address, the number of pages of the digital representation and the result of said receiving the inbound fax call:
  creating, by the central logging module, a timestamp and a unique audit identifier for the first audit log entry;
  utilizing, by the central logging module, the information regarding the destination address to determine one or more specific parameters within the Internet fax system to be logged;
  creating, by the central logging module, the first audit log entry in a standardized format and including within the first audit log entry the timestamp, the unique audit identifier, the source address, the destination address, the number of pages of the digital representation, the result of said receiving the inbound fax call and the one or more specific parameters; and
  storing, by the central logging module, the first audit log entry within the audit log.

6. The method of claim 5, wherein the one or more specific parameters include one or more of an organization identifier (ID) of a subscribing entity of the Internet fax system and a user ID of a user of the subscribing entity associated with the destination address.

7. The method of claim 1, wherein said causing a second audit log entry of the plurality of audit log entries, separate and distinct from a notification configuration associated with the particular subscriber at a time of receipt of the inbound fax call, to be created and stored within the audit log comprises:
  loading, by the email server, code representing an event logging routine of the central logging module, from a shared storage resource accessible to the plurality of fax processing resources and the email server; and
  executing, by the email server, the code.

8. The method of claim 7, wherein the information regarding the one or more users comprises an email address to which an email was sent by the email server.

9. The method of claim 8, further comprising responsive to receipt of the information regarding the one or more users the result of said notifying:
  creating, by the central logging module, a timestamp and a unique audit identifier for the second audit log entry;
  utilizing, by the central logging module, the email address to determine one or more specific parameters within the Internet fax system to be logged;
  creating, by the central logging module, the second audit log entry in a standardized format and including within the second audit log entry the timestamp, the unique audit identifier, the email address, the result of said notifying and the one or more specific parameters; and
  storing, by the central logging module, the second audit log entry within the audit log.

10. The method of claim 9, wherein the one or more specific parameters include one or more of an organization identifier (ID) of a subscribing entity of the Internet fax system and a user ID of a user of the subscribing entity associated with the email address.

11. The method of claim 1, further comprising:
  receiving, by an Application Programming Interface (API) of the Internet fax system, a request from an application of a subscriber for audit log entries from the audit log, wherein the request specifies one or more criteria according to which the audit log entries are to be evaluated; and
  returning, by the API, to the application one or more audit log entries from the audit log satisfying the one or more specified criteria.

12. The method of claim 11, wherein the one or more specified criteria are provided in a form of Hypertext Transfer Protocol (HTTP) or HTTP Secure (HTTPS) POST variables.

13. The method of claim 1, wherein the centralized logging module is tightly integrated with the Internet fax system and is aware of various sources of information, including objects, identifiers, data structures and databases used within the Internet fax system, thereby allowing the centralized logging module to offload from the plurality of components retrieval of additional information from the various sources of information to be stored within the plurality of audit log entries.

14. The method of claim 1, wherein the events include:
  receipt by the Internet fax system of a request to send an outgoing fax via email, a web interface of the Internet fax service or an Application Programming Interface of the Internet fax service;
  creation of a fax job within the Internet fax service corresponding to the request;
  success or failure of a fax conversion operation to convert a source document or documents associated with the request to a fax-able format;
  the outgoing fax has been queued for sending;
  success or failure of sending of the outgoing fax; and
  notification of a recipient or recipients of the outgoing fax has been completed.

15. The method of claim 1, wherein:
  said causing a first audit log entry of the plurality of audit log entries, separate and distinct from a record of the inbound fax call to be presented to the particular subscriber, to be created and stored within the audit log comprises:
  loading, by the selected fax processing resource, code representing an event logging routine of the central logging module, from a shared storage resource accessible to the plurality of fax processing resources and the email server; and
  executing, by the selected fax processing resource, the code; and
  said causing a second audit log entry of the plurality of audit log entries, separate and distinct from a notification configuration associated with the particular subscriber at a time of receipt of the inbound fax call, to be created and stored within the audit log comprises:
  loading, by the email server, the code representing the event logging routine from the shared storage resource; and
  executing, by the email server, the code.

* * * * *